United States Patent [19]
Tisdale et al.

[11] Patent Number: 6,035,039
[45] Date of Patent: *Mar. 7, 2000

[54] FRAUD DETECTION AND USER VALIDATION SYSTEM FOR MOBILE EARTH TERMINAL COMMUNICATION DEVICE

[76] Inventors: William R. Tisdale; Charles E. Sigler, both of AMSC, 10802 Parkridge Blvd., Reston, Va. 22091

[*] Notice: This patent is subject to a terminal disclaimer.

[21] Appl. No.: 09/024,256

[22] Filed: Feb. 17, 1998

Related U.S. Application Data

[62] Division of application No. 08/565,036, Nov. 30, 1995, Pat. No. 5,748,742.

[51] Int. Cl.[7] .............................. H04L 9/00; H04K 1/00; G06F 7/04; G07D 7/00
[52] U.S. Cl. ............................ 380/23; 380/25; 380/21; 380/49; 455/410; 455/411; 340/825.3; 340/825.34
[58] Field of Search ..................... 380/23, 25, 21, 380/49; 340/825.3, 825.34; 455/410, 411, 422

[56] References Cited

U.S. PATENT DOCUMENTS

| | | | |
|---|---|---|---|
| 5,153,919 | 10/1992 | Reeds, III et al. | 380/44 |
| 5,172,414 | 12/1992 | Reeds, III et al. | 380/45 |
| 5,204,902 | 4/1993 | Reeds, III et al. | 380/23 |
| 5,237,612 | 8/1993 | Raith | 380/23 |
| 5,390,245 | 2/1995 | Dent et al. | 380/23 |
| 5,420,908 | 5/1995 | Hodges et al. | 379/58 |
| 5,537,414 | 7/1996 | Takiyasu et al. | 370/95.1 |
| 5,541,977 | 7/1996 | Hodges et al. | 379/58 |
| 5,557,654 | 9/1996 | Maendaa | 379/58 |
| 5,559,886 | 9/1996 | Dent et al. | 380/23 |
| 5,625,888 | 4/1997 | Ruther et al. | 455/56.1 |
| 5,708,716 | 1/1998 | Tisdale et al. | 380/49 |
| 5,727,064 | 3/1998 | Reeds, III et al. | 380/49 |
| 5,835,858 | 11/1998 | Vaihoja et al. | 455/419 |

OTHER PUBLICATIONS

"Feederlink Earth Station to Provide Mobile Satellite Services in North America", Robert H. McCauley, et al., American Institute of Aeronautics and Astronautics, Jan./Feb. 1994, pp. 1–9.

"Radio Transmission in the American Mobile Satellite System", Charles Kittiver, American Institute of Aeronautics and Astronautics, Inc., pp. 280–294.

"Summary of the AMSC Mobile Telephone System", Gary A. Johanson, et al., American Institute of Aeronautics and Astronautics, Inc, pp. 280–294.

(List continued on next page.)

*Primary Examiner*—Gail O. Hayes
*Assistant Examiner*—Hrayr A. Sayadian
*Attorney, Agent, or Firm*—Irah H. Donner; Pepper Hamilton LLP

[57] ABSTRACT

In a mobile satellite system, a mobile communication system includes a fraud detection and user validation system and method for commissioning the mobile communication system in the mobile satellite system. The method includes the steps of generating a first input signal by the mobile communication system upon initialization, and transmitting the first input signal from the mobile communication system to the central controller. The method also includes the steps of generating a first security key in the central controller using the first input signal, and generating a second security key in the mobile communication system using the first input signal and transmitting the second security key to the central controller. The central controller verifies the mobile communication system that transmitted the first input signal to commission it in the mobile satellite system. The verification process is responsive to a comparison of the first security key with the second security key. When the mobile communication system has been verified, information is transmitted throughout the mobile satellite system to enable future access and use of the mobile satellite system by the mobile communication system.

16 Claims, 37 Drawing Sheets

OTHER PUBLICATIONS

"Implementation of a System to Provide Mobile Satellite Services in North America", Gary A. Johanson, et al., presented at International Mobile Satellite Conference '93, Jun. 16–18, 1993.

"The American Mobile Satellite Corporation Space Segment", David J. Whalen, et al., pp. 394–404.

"North American Mobile Satellite System Signaling Architecture", Lawrence White et al., American Institute of Aeronautics and Astronautics, Inc., pp. 427–439.

"The AMSC/TMI Mobil Satellite Services (MSS) System Ground Segment Architecture", J. Lunsford, et al., American Institute of Aeronautics and Astronautics, Inc., pp. 405–426.

"Call Control in the AMSC Mobile Satellite Service System", William R.H. Tisdale, et al., Pre–Publication Review Copy, American Institute of Aeronautics and Astronautics, Mar. 1, 1994, pp. 1–13.

"Westinghouse MSAT Mobile Terminal Channel Emulator", A. Fasulo et al., American Institute of Aeronautics and Astronautics, Inc., pp. 256–260.

"MSAT Network Communications Controller and Network Operations Center", Tony Harvey et al., American Institute of Aeronautics and Astronautics, Inc., pp. 1–11.

"MSAT and Cellular Hybrid Networking", Patrick W. Baranowsky II, Westinghouse Electric Corporation.

"MSAT Network Communications Controller and Network Operations Center", Tony Harvey et al., American Institute of Aeronautics and Astronautics, Inc., pp. 270–279.

"Summary of the AMSC Mobile Telephone System", Gary A. Johanson, et al., American Institue of Aeronautics and Astronautics, Inc., pp. 1–11.

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| MODES/FUNCTIONS | | |
|---|---|---|
| MODE | REGISTRATION | OPERATION |
| SATELLITE ONLY | POWER ON REGISTRATION IN MSS ONLY, IF AVAILABLE. SYSTEM MAY NOT RE-REGISTER IS PRIOR REGISTRATION WAS IN MSS. | MET USES MSS ONLY. IF SATELLITE COVERAGE IS UNAVAILABLE, SERVICE IS DISALLOWED. NO REQUIREMENT FOR HANDOFF. |
| AUTOMATIC ROAMING, SATELLITE PRIORITY | POWER ON REGISTRATION IN MSS, UNLESS UNAVAILABLE, IN WHICH CASE MET REGISTERS IN CMC SYSTEM. MOBILE WILL RETURN REGISTRATION TO MSS WHENEVER POSSIBLE. | MET USES MSS IF AVAILABLE. CELLULAR COMMUNICATION IS USED AS LAST RESORT. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| AUTOMATIC ROAMING, CELLULAR PRIORITY | POWER ON REGISTRATION IN CMC SYSTEM, EITHER HOMED OR AS VISITOR. IF CELLULAR COVERAGE IS UNAVAILABLE., MET WILL REGISTER IN MSS. MET WILL RETURN REGISTRATION TO CMC WHENEVER POSSIBLE. | MET USES CELLULAR CARRIER IF AVAILABLE. SATELLITE COMMUNICATION IS USED AS LAST RESORT. LIVE CALL HANDOFF FROM SERVING CMC IS TO ADJACENT CMC IS POSSIBLE, OTHERWISE TO MSS. HANDOFF FROM MSS TO CELLULAR IS NOT SUPPORTED |
| AUTOMATIC ROAMING, CELLULAR PRIORITY, HOME CMC ONLY | POWER ON REGISTRATION IN CMC SYSTEM, IF AVAILABLE. IF HOME CELLULAR COVERAGE IS UNAVAILABLE, MET WILL REGISTER AS A ROAMER IN MSS. MET WILL RETURN REGISTRATION TO HOME CMC WHENEVER POSSIBLE. | MET USES HOME CELLULAR CARRIER IF AVAILABLE, AND ROAMS ONLY TO MSS. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| CELLULAR ONLY | POWER ON REGISTRATION IN HOME CMC IF AVAILABLE, OR AS ROAMER IN VISITED CMC. REGISTRATION FOLLOWS NORMAL CELLULAR PROCEDURES. REGISTRATION AS ROAMER IN MSS IS DISALLOWED. | MET USES HOME CELLULAR CARRIER IF AVAILABLE, AND ROAMS ONLY TO OTHER CMCs. LIVE CALL HANDOFF FROM SERVING CMC IS TO ADJACENT CMC IF POSSIBLE. HANDOFF TO MSS IS DISALLOWED. |

FIG. 16

| PARAMETER | BITS | FUNCTION |
|---|---|---|
| PAGE NUMBER | 3 | PAGE NUMBER ASSOCIATED WITH THIS SU. |
| UPDATE NUMBER | 5 | INCREMENTED WHENEVER CONTENTS OF THIS PAGE ARE CHANGED |
| SU NUMBER | 8 | SEQUENCE NUMBER OF THIS SU IN THE PAGE. |
| RETRANSMISSION TIMEOUT | 8 | TIMEOUT VALUE FOR RETRANSMISSION MET-SR CHANNEL. SPECIFIED IN 100 ms INCREMENTS. NOMINALLY [10] |
| MAXIMUM RETRANSMISSIONS | 3 | MAXIMUM NUMBER OF RETRANSMISSIONS ALLOWED PER MESSAGE (0, 1, .. 7). NOMINALLY [4]. |
| RANDOMIZING INTERVAL | 5 | RANDOMIZATION INTERVAL USED FOR RETRANSMISSION. SPECIFIED IN 100 ms INCREMENTS. THIS INTERVAL IS DOUBLED FOR EVERY SUBSEQUENT RETRANSMISSION OF A SU. NOMINALLY [5]. |
| NUMBER OF REPEATS | 3 | NUMBER OF TIMES AN SU (COMMAND, RESPONSE) IS REPEATED TO IMPROVE CHANNEL ERROR PERFORMANCE. 0, 1, ... |
| RESPOND TO REPEAT COMMANDS | 1 | MET MUST RESPOND TO EACH REPEATED COMMAND SU. |
| REPEAT INTERVAL | 4 | INTERVAL BETWEEN REPEATS IN 100 MILLISECOND INCREMENTS. |
| CLIENT REF TIMEOUT | 4 | MGSP CLIENT REFERENCE TIMER VALUE IN SECONDS. |
| SERVER REF TIMEOUT | 4 | MGSP SERVER REFERENCE TIMER VALUE IN SECONDS. |
| ACCESS SECURITY FILL BITS | 24 | FILL BITS USED TO EXTEND THE PLAIN TEXT INPUT TO THE ACCESS SECURITY CHECK FIELD GENERATION PROCESS |

FIG. 31

| PARAMETER | BITS | FUNCTION |
|---|---|---|
| VIRTUAL NETWORK IDENTIFIER | 16 | IDENTIFIES THE VIRTUAL NETWORK ACCESSED |
| CALL IDENTIFIER | 24 | IDENTIFIES THE CALL |
| TRANSMIT FREQUENCY | 24 | TRANSMIT CHANNEL FREQUENCY |
| RECEIVE FREQUENCY | 24 | RECEIVE CHANNEL FREQUENCY |
| CHANNEL TYPE | 4 | IDENTIFIES MODULATION AND BANDWITH REQUIRED |
| EIRP | 4 | FES EIRP REQUIREMENT (REPRESENTED AS 2's COMPLEMENT BINARY WITH 1.0dB RESOLUTION) |
| SATELLITE ID | 3 | IDENTIFICATION OF SATELLITE |
| BEAM ID | 5 | IDENTIFICATION OF SATELLITE BEAM |
| CONTROL GROUP ID | 4 | INDICATES THE CONTROL GROUP ID |
| CHANNEL UNIT POOL (CUP) | 8 | INDICATES THE CONTROL UNIT POOL TO USE |
| MT SOFTWARE VERSION | 4 | INDICATES A SPECIFIC CCU SETUP ( e.g. VOCODER TYPE) |
| CALL TYPE | 4 | CALL TYPE ( e.g. VOICE, FAX, DATA)<br>000 - VOICE     0011 - 4800bps DATA<br>0001 - FAX       0100 - ALTERNATE VOICE/DATA<br>0010 - 2400 bps DATA |
| FFA VECTOR | 32 | FES FEATURE ACTIVATION VECTOR (A DETAILED DESCRIPTION AND FORMAT ARE PROVIDED IN SECTION A1-1.1.) |
| ACCESS SECURITY CHECK FIELD | 32 | USED TO VERIFY MET AUTHENTICITY |
| SECONDARY SECURITY CHECK FIELD | 32 | USED TO REVERIFY MET AUTHENTICITY |
| CALL COUNT VARIABLE CHECK FIELD | 16 | USED TO PROVIDE MET CCV AUTHENTICITY CHECK |
| AUTHENTICATION PROCEDURE DISABLE (APD) | 1 | USED TO DISABLE ACCESS SECURITY CHECK PROCEDURE<br>0 - PERFORM AUTHENTICATION PROCEDURE<br>1 - DO NOT PERFORM AUTHENTICATION PROCEDURE |
| CELLULAR ESN | 32 | USED BY GWS TO AUTHENTICATE MET |
| CALLED NUMBER OF DIGITS | 6 | INDICATES NUMBER OF DIGITS TO FELLOW |
| CALLED DIGIT n | 4 | HEXADECIMAL REPRESENTATION OF THE nth DIGIT IN THE CALLED NUMBER. |
| CALLING NUMBER OF DIGITS | 6 | INDICATES NUMBER OF DIGITS TO FOLLOW |
| CALLING DIGIT n | 4 | HEX REPRESENTATION OF THE nth DIGIT IN THE CALLED NUMBER. |

FIG. 34

| PARAMETER | BITS | FUNCTION |
|---|---|---|
| SCRAMBLING VECTOR | 16 | USED TO RESET THE SCRAMBLER. |
| ACCESS SECURITY CHECK FIELD | 32 | USED TO VERIFY MET AUTHENTICITY |
| BIT RATE | 4 | USED TO ESTABLISH END-TO-END BIT RATE FOR ASYNCHRONOUS DATA CALLS<br>0000 - 1200<br>0001 - 2400<br>0010 - 4800 |
| CHARACTER FORMAT | 4 | USED TO ESTABLISH CHARACTER FORMAT FOR ASYNCHRONOUS DATA CALLS<br>0000 - 1 START BIT, 7 DATA BITS, EVEN PARITY, 1 STOP BIT<br>0001 - 1 START BIT, 7 DATA BITS, ODD PARITY, 1 STOP BIT<br>0010 - 1 START BIT, 7 DATA BITS, NO PARITY, 2 STOP BITS<br>0011 - 1 START BIT, 7 DATA BITS, MARK, 1 STOP BIT<br>0100 - 1 START BIT, 7 DATA BITS, SPACE, 1 STOP BIT<br>0101 - 1 START BIT, 8 DATA BITS, NO PARITY, 1 STOP BIT |
| CALL COUNT VARIABLE (CCV) CHECK FIELD | 16 | USED TO PROVIDE MT CCV AUTHENTICATION CHECK |

FIG. 35

FRAUD DETECTION AND USER VALIDATION SYSTEM FOR MOBILE EARTH TERMINAL COMMUNICATION DEVICE

This application is a divisional application of U.S. application Ser. No. 08/565,036, filed Nov. 30, 1995, U.S. Pat. No. 5,748,742 the details of which are incorporated herein by reference.

TECHNICAL FIELD

The present invention relates generally to a fraud detection and user validation system, and more particularly, to a fraud detection and user validation system for a mobile earth terminal satellite communication device. The mobile earth terminal provides voice, data, and facsimile transmission between mobile earth terminals and feederlink earth stations (FESs) that act as gateways to public networks or base stations associated with private networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation. A single beam generally covers the service area.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. When the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular-system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information system within the Network Management System.

The satellite network system interfaces to, and performs transactions with, the external organizations described below:

Satellite Operations Center (SOC): The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC: The satellite network system interfaces with the satellites located therein via the NOC for a variety of operational reasons including message delivery and coordination.

Independent NOCs: The satellite network system interfaces with outside organizations which lease resources on satellite network satellites and which are responsible for managing and allocating these resources in a manner suited to their own needs.

Other System NOCs: This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System: This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering: This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering: This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC. The NOC manages and controls the resources of the satellite network system and carries out the administrative functions associated with the management of the total satellite network system. The NOC communicates with the various internal and external entities via a local area network (LAN)/wide area network (WAN) based satellite network Internetwork and dial-up lines.

NCC. The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES. The FES supports communications links between METs, the PSTN, private networks, and other METs. Once a channel is established with an MET, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET. The MET provides the mobile user access to the communications channels and services provided by the satellite network system. A range of terminal types has been defined for the satellite network system.

RMS. The RMS monitors L-band RF spectrum and transmission performance in specific L-band beams. An RMS is nominally located in each L-band beam. Each RMS interfaces with the NOC via either a satellite or terrestrial link.

STS. The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via specially equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, D.C. (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MET Access Security Key (ASK) storage equipment. The Processing Equipment consists of one or more digital processors that provide overall NCC control, NCS call processing, network access processing and internetwork communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MET ASK storage Equipment provides a physically secure facility for protecting and distributing MET Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

There is a general need for an integrated mobile telephone that can be used to transmit to, and receive from, a satellite in a satellite communication system in a secure manner. It is also desirable for the satellite communication system to be able to detect the presence of an unauthorized mobile telephone in an efficient manner. This will prevent unauthorized access to the satellite communication system and also prevent unauthorized access to a communication in progress. The principal issue is MET authorization for purposes of access and fraud control, not necessarily encryption.

It is desirable to provide a fraud detection and user validation system for mobile earth terminal satellite communication device that is of low cost, simple and reliable. It is also desirable to provide a fraud detection and user validation system for mobile earth terminal satellite communication device where it is presumed that a serious "hacker" will be in possession of a working MET, will be technically sophisticated, and will know and understand the fraud detection process. It is also desirable to provide a fraud detection and user validation system where keys are not transmitted "over the air" in the clear. It is also desirable to provide a fraud detection and user validation system where the keys are changeable at the MET, and a simple one-time entry/validation system is desirable.

It is also desirable to provide a fraud detection and user validation system where transmitted authorization/valtoation is variable with each call setup to preclude fraudulent reuse if a valid keystream is identified. It is also desirable to provide a fraud detection and user validation system where the authorization/validation process adds only insignificantly to the call setup process, and additional message exchanges are avoided. It is also desirable to provide a fraud detection and user validation system where the scheme utilized should be fully self-synchronizing on a call by call basis.

It is further desirable to provide a fraud detection and user validation system where single errors in unencrypted access lead to rejection of the attempt. It is also desirable to provide a fraud detection and user validation system where outbound calls do not generally need "access" security. It is also desirable to provide a fraud detection and user validation system where each MET must transmit an identifier in the clear, so that the GC can select the appropriate key. It is also desirable to provide a fraud detection and user validation system where a switch should be provided in the NCC to override the authorization system in case of failure or other problems. It is also desirable to provide a fraud detection and user validation system where the "Authorization Subsystem" is logically (and preferably physically as well) separate from the remainder of the NCC.

SUMMARY OF THE INVENTION

It is a feature and advantage of the satellite communication system to be able to detect the presence of an unauthorized mobile telephone in an efficient manner.

It is another feature and advantage of the satellite communication system to provide a fraud detection and user validation system for mobile earth terminal satellite communication device that is of low cost, simple and reliable. It is another feature and advantage of the satellite communication system to provide a fraud detection and user validation system for mobile earth terminal satellite communication device where it is presumed that a serious "hacker" will be in possession of a working MET, will be technically sophisticated, and will know and understand the fraud detection process. It is another feature and advantage of the satellite communication system to provide a fraud detection and user validation system where keys are not transmitted "over the air" in the clear. It is another feature and advantage of the satellite communication system to provide a fraud detection and user validation system where the keys are changeable at the MET, and a simple one-time entry/validation system.

It is another feature and advantage of the satellite communication system to provide a fraud detection and user validation system where transmitted authorization/validation is variable with each call setup to preclude fraudulent reuse if a valid keystream is identified. It is another feature and advantage of the satellite communication system to provide a fraud detection and user validation system where the authorization/validation process adds only insignificantly to the call setup process, and additional message exchanges are avoided. It is another feature and advantage of the satellite communication system to provide a fraud detection and user validation system where the scheme utilized is fully self-synchronizing on a call by call basis.

The present invention is based, in part, on the identification of the problem of potential fraudulent or unauthorized access to the satellite communication system. In accordance with the features of the present invention, controls are introduced to prevent such unauthorized access. To accomplish the above, we have discovered that the following factors/features must be considered/incorporated for a secure satellite communication system:

1. Low cost, simplicity and reliability are all highly important factors in authorization/validation scheme design. Note that since only a small number of bits need be coded/decoded, and that real time coding/decoding is not required, it has been discovered that a software implementation of even a complex algorithm is a viable possibility.
2. It must be presumed that a serious "hacker" will be in possession of a working MET, will be technically sophisticated, and will know and understand the algorithm.
3. Any key distribution system is acceptable as long as it is reasonably secure. However, keys should never be transmitted "over the air" in the clear.
4. Keys should be changeable at the MET. A simple one-time entry/validation system is desirable. However, it should not be possible to read keys from the MET. A scheme which requires the user to enter a code with each call setup is not generally desirable.
5. The system should be highly resistant to key attack.
6. Keys should be long enough (and sufficiently random in nature) to preclude practical random search and identification. Assume a target probability for random identification of no more than $1.0 \times 10^{-6}$. It must also be kept in mind that in a fully developed MTS there may be more than $1.0 \times 10^5$ METs, all of which will require individual authorization/access codes.
7. Transmitted authorization/validation should be variable with each call setup to preclude fraudulent reuse if a valid keystream is identified.
8. Transmitted authorization/validation should be essential to achieving useful operation.
9. Authorization/validation process should add only insignificantly to the call setup process (and particularly the call setup time). Additional message exchanges should be avoided.
10. It is not necessary to transmit an authorization code per se; encoding of some vital system parameter (variable) is just as effective.
11. Authorization/validation can generally work equally well in either direction, i.e., MET to GC or GC to MET.

12. The scheme utilized should be fully self-synchronizing on a "block by block"(i.e., call by call) basis.
13. Single errors in unencrypted access should lead to rejection of the attempt, since error detection methods do not identify with certainty the number of errors in a block.
14. The length of the cleartext vector to be coded (or the length of the code vector itself) must be considered in terms of the coding system/algorithm used. Data Encryption Standard (DES), for example, requires 64-bit blocks, or filler to make 64, plus transmission of the complete 64 bit ciphertext block.
15. Since all METs will require individual authorization codes, each MET transmits an identifier in the clear, so that the GC can select the appropriate key, for whichever direction the authentication process is performed over.
16. A "Clear Model" should be provided for system trouble shooting under real time Group Controller management. The ideal would be a mode in which either uncoded or valid coded access is accepted.
17. Examples of possible schemes are:
    (a) Encoding of destination telephone number (inbound).
    (b) Encoding of part of MET ID plus all or part of telephone number (inbound).
    (c) Encoding of frequency channel assignments (outbound).
    (d) Encoding of all or part of MET ID plus all or part of frequency assignments (outbound).
    (e) Encoding of telephone number plus CRC (inbound).
    (f) Encoding of channel assignments plus CRC (outbound).
18. A hardware or software switch (with suitable protection, i.e., physical key, password) should be provided in the NCC to override the authorization system in case of failure or other problems. It will be much better to continue to generate revenue and maintain subscriber good will at the cost of some fraudulent use, than it will be to shut the system down.
19. The "Authorization Subsystem" should be logically (and preferably physically as well) separate from the remainder of the NCC, and should have the following attributes:
    (a) The subsystem should communicate with the NCC only via a local bus or cable.
    (b) Operator access should be limited to system operators in possession of an eight character (minimum) password, using a local keyboard/display station. Use of a physical key to further control access is also desirable.
    (c) The authorization Subsystem should not be accessible via external communication lines (modem, LAN or remote workstation).
    (d) The authorization Subsystem should maintain the System MET Key File in encrypted storage, i.e., all MET keys should be encrypted using a "Key Encryption Key"(KEK), which should be stored only in volatile storage. Detection of an unauthorized access attempt (electronic or physical) or power loss should cause erasure of the KEK.
    (e) During normal system operation, the Authorization Subsystem must return only cleartext or ciphertext information. The Authorization Subsystem must not return MET Keys.
    (f) The Authorization Subsystem should provide an authorized operator with means for normal file update and maintenance procedures.

Additional features and advantages of the present invention include:
    NCC and MET independently generate random "authentication codes" for each call
    FES compares authentication codes—if authentication codes mismatch FES may terminate call or reroute to operator
    provision is made for individual and system-wide authentication bypass at NCC
    security key database and authorization code generation at NCC protected To achieve these and other features and advantages of the present invention, a fraud detection and user validation system for a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the is vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, diplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

In one embodiment of the invention, a method of preventing a mobile communication system from fraudulently commissioning in the satellite communication system is provided. The method comprises the steps of requesting, by a user, to become a subscriber in a communication system, and generating a first security key using a first data encryption algorithm having first and second input signals generated by respective first and second random number generating methods. In addition, the method includes the steps of generating a second security key using a second data encryption algorithm having third and fourth input signals, the third input signal comprising the first security key and the fourth input signal comprising data from at least one of the transmit and receive frequencies utilized by the mobile communication system. The method verifies that the mobile communication system is authorized to utilize the communication system using the second security key.

In another embodiment of the invention, a method of preventing a mobile communication system from fraudulently commissioning in the satellite-communication system is provided. The method comprises the steps of requesting, by a user, to become a subscriber in a communication system, generating a first input signal by the mobile communication system, transmitting the first input signal from the mobile communication system to the central controller, and generating a first security key in the central controller using a data encryption algorithm using the first input signal and a second input signal generated by a random number generator. In addition, the method includes the steps of generating a third input signal responsive to the first input signal confirming receipt of the first input signal by the central controller, transmitting the third input signal from the central controller to the mobile communication system responsive to the transmitting step, generating a second security key in the mobile communication system using the data encryption algorithm using the first and second input signals, and verifying by the central controller when the mobile communication system initiates a communication that the mobile communication system is authorized to utilize the communication system responsive to a comparison of first and second components of the first and second security keys respectively.

In another embodiment of the invention, a fraud prevention system is provided for preventing a mobile communication system from fraudulently commissioning in a communication system. The fraud prevention system includes the mobile communication system requesting to become a subscriber in a communication system. The mobile communication system includes a computer system that generates a first security key using a first data encryption algorithm having first and second input signals generated by respective first and second random number generating methods. The computer system also generates a second security key using a second data encryption algorithm having third and fourth input signals, the third input signal comprising the first security key and the fourth input signal comprising data from at least one of the transmit and receive frequencies utilized by the mobile communication system. The central controller of the communication system verifies that the mobile communication system is authorized to utilize the communication system using the second security key.

In another embodiment of the invention, a fraud prevention system is provided for preventing a mobile communication system from fraudulently commissioning in the satellite communication system. The fraud preventions system comprises a mobile communication system requesting for a user to become a subscriber in a communication system, generating a first input signal by the mobile communication system, and transmitting the first input signal, and a central controller for the communication system responsively connected to the mobile communication system. The central controller receives the first input signal from the mobile communication system, generates a first security key using a data encryption algorithm using the first input signal and a second input signal generated by a random number generator, generates a third input signal responsive to the first input signal confirming receipt of the first input signal, and transmits the third input signal to the mobile communication system. The mobile communication system receives the third input signal from the central controller, generates a second security key using the data encryption algorithm using the first and second input signals. The central controller verifies that the mobile communication system is authorized to utilize the communication system responsive to a comparison of first and second components of the first and-second security keys respectively.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 16 is a diagram of the multiple operating modes of the mobile earth terminal;

FIG. 31 is a diagram of a bulletin board in the satellite communication system;

FIG. 34 is a diagram of a CHA message; and

FIG. 35 is a diagram of a scrambling vector SU that is sent by the MET to initialize the descrambler at the FES and for call security.

BEST MODE FOR CARRYING OUT THE INVENTION

Figure 1:
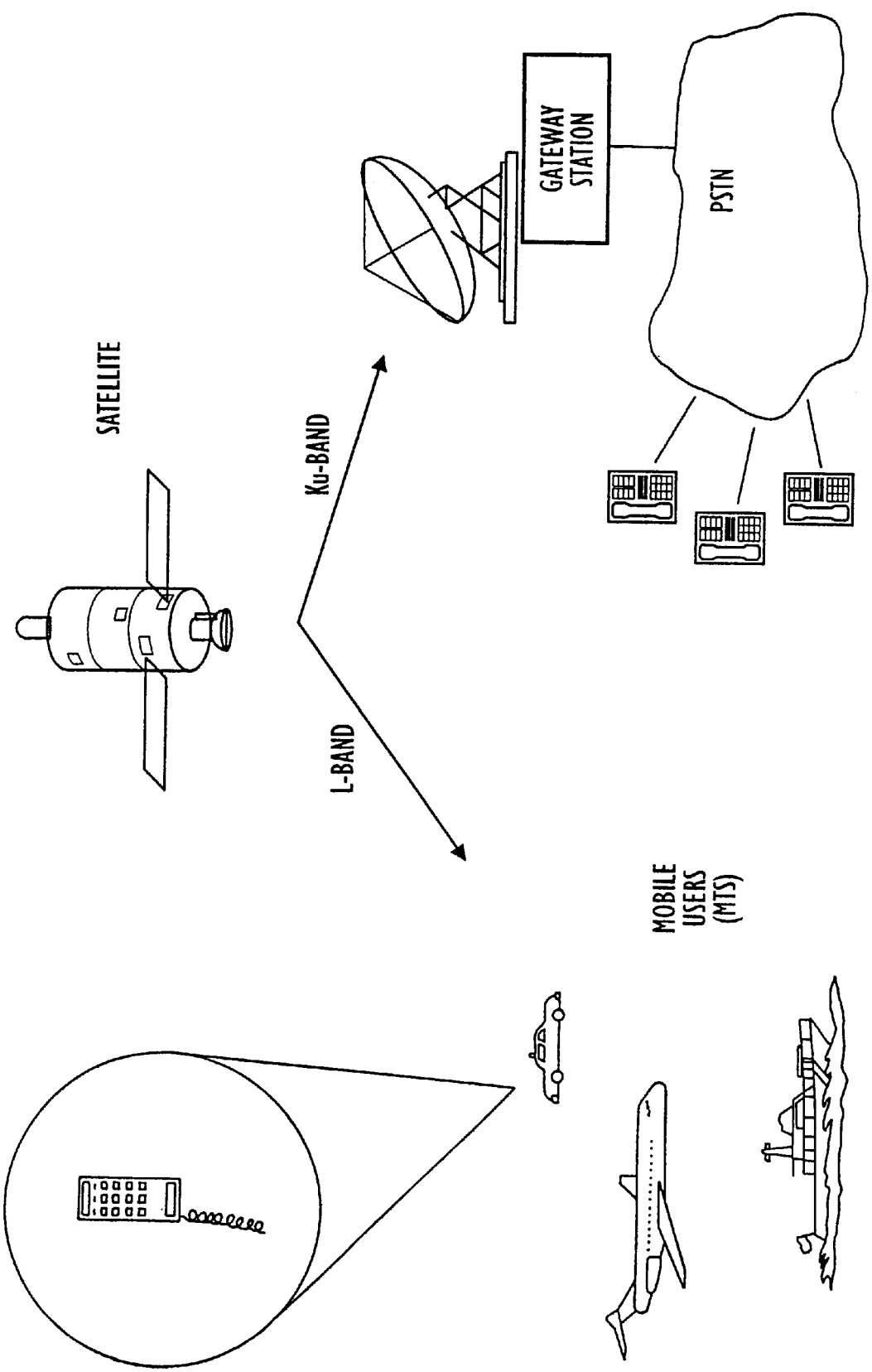
FIG. 1 is a diagram illustrating an overview of the satellite network system.
Figure 3:
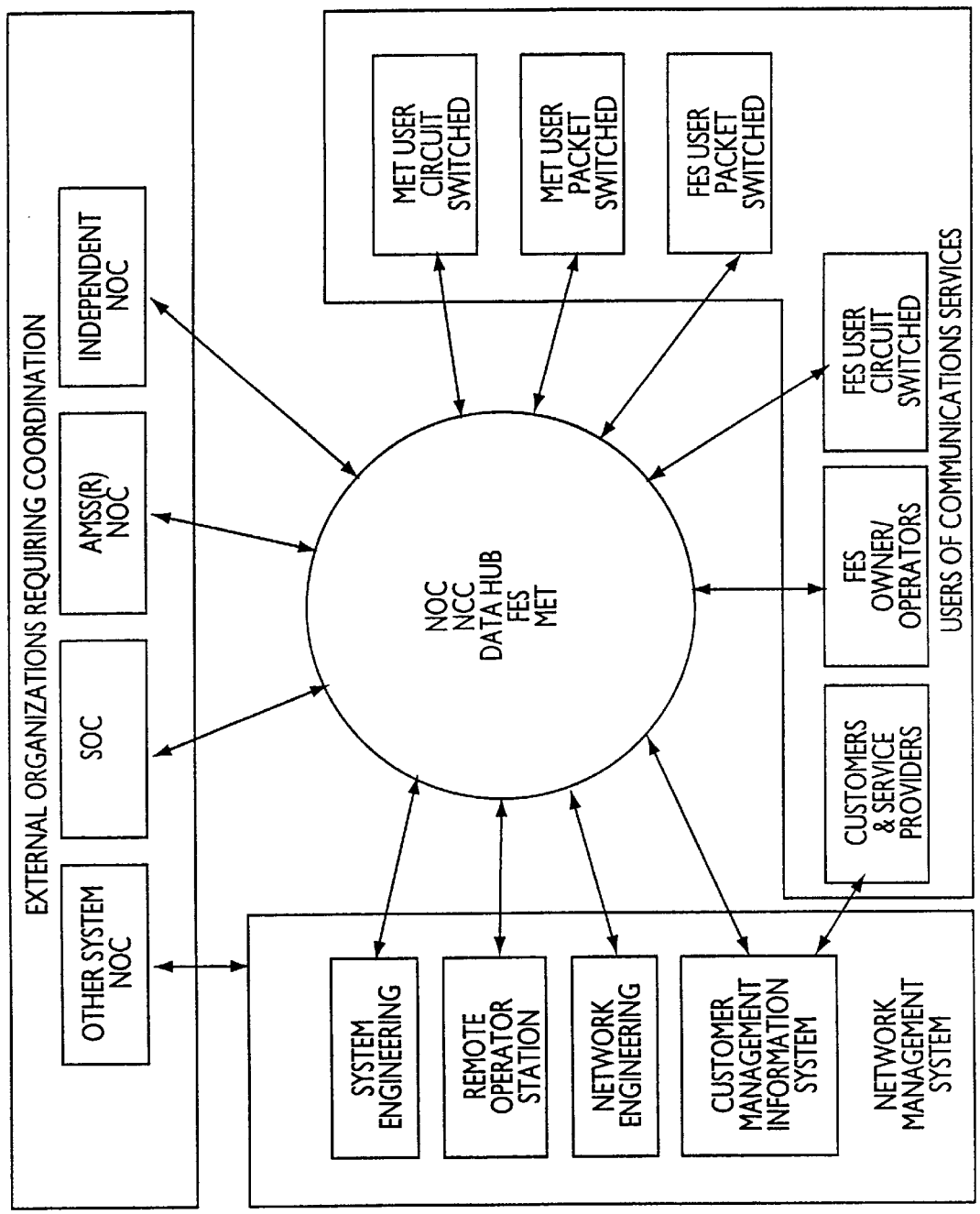
FIG. 3 is a diagram of the satellite network system illustrating components and respective interfaces.
Figure 4:
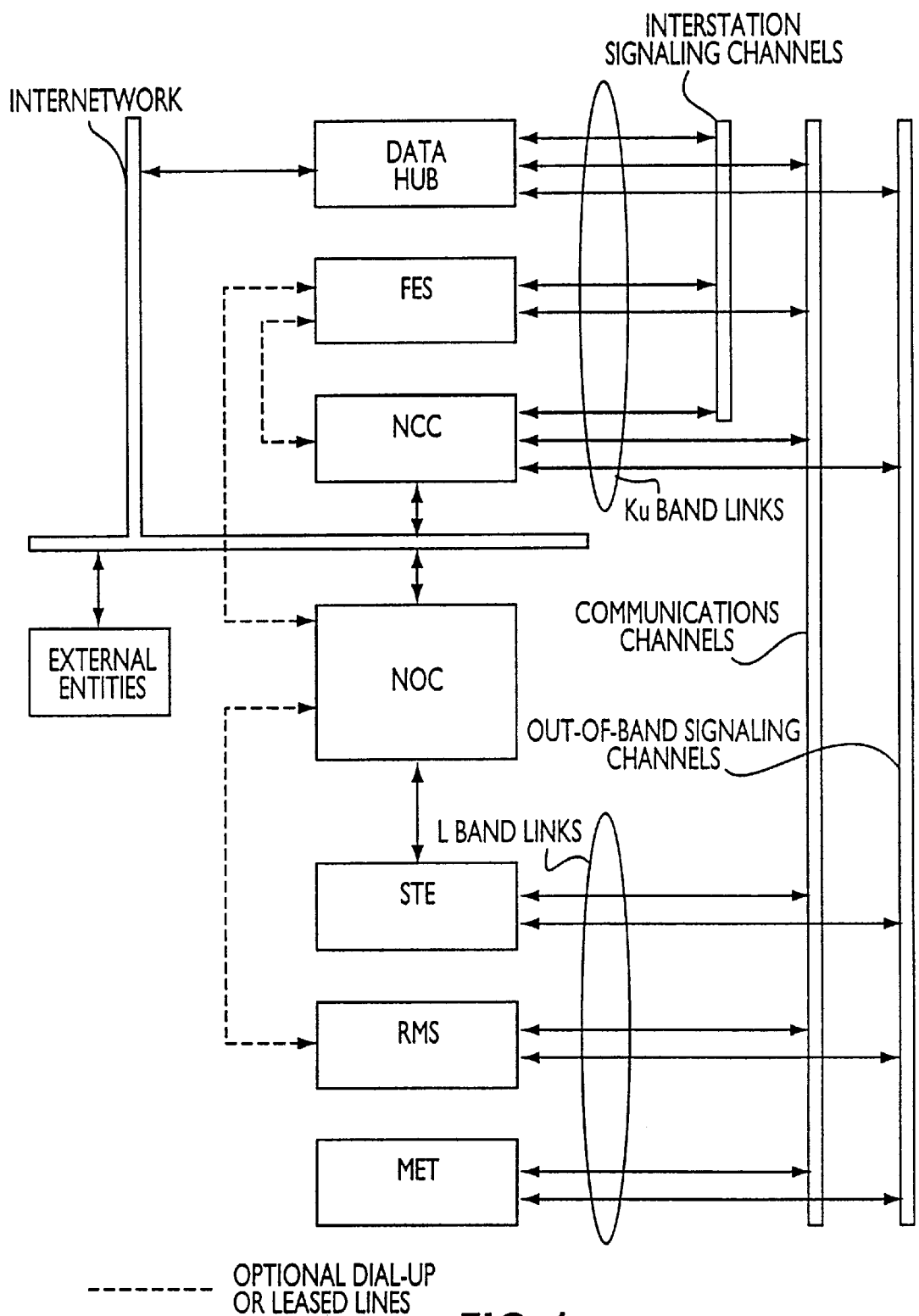
FIG. 4 is a diagram of a satellite network system illustrating a number of system elements and their interconnecting communications links.
Figure 5:
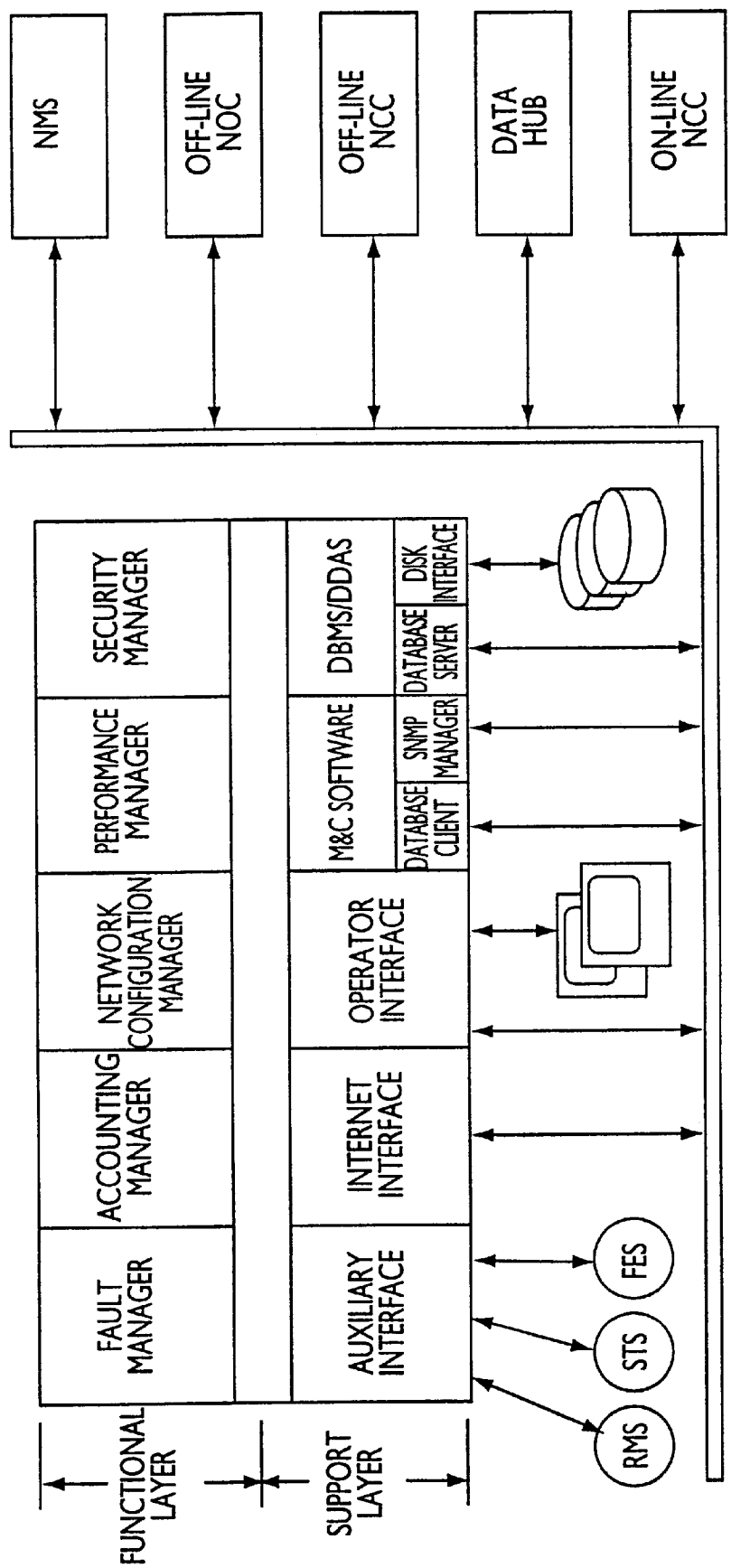
FIG. 5 is a basic block diagram of the NOC and its interfaces.
Figure 6:
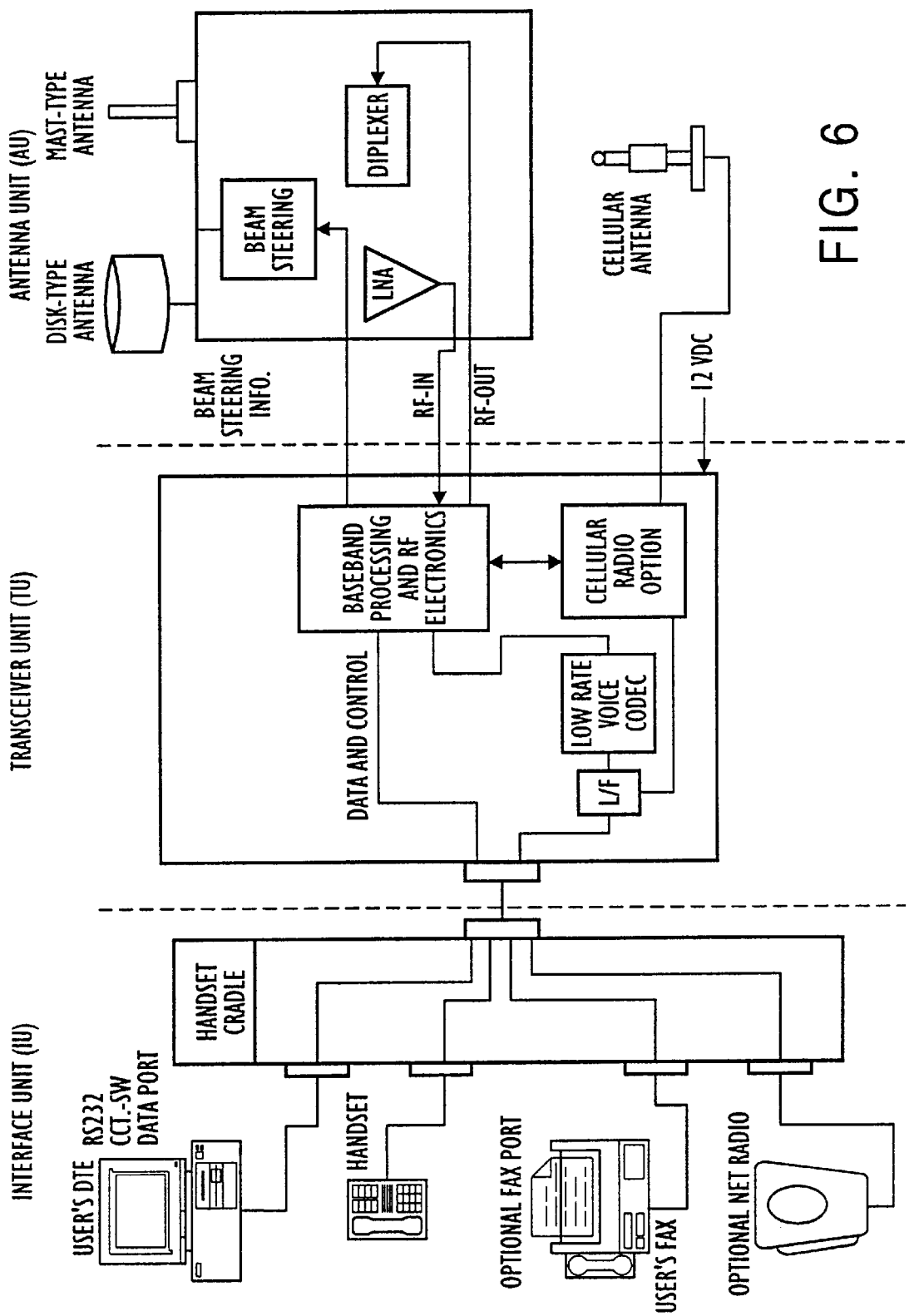
FIG. 6 is a basic block diagram of the physical architecture of the mobile earth terminal.
Figure 7:
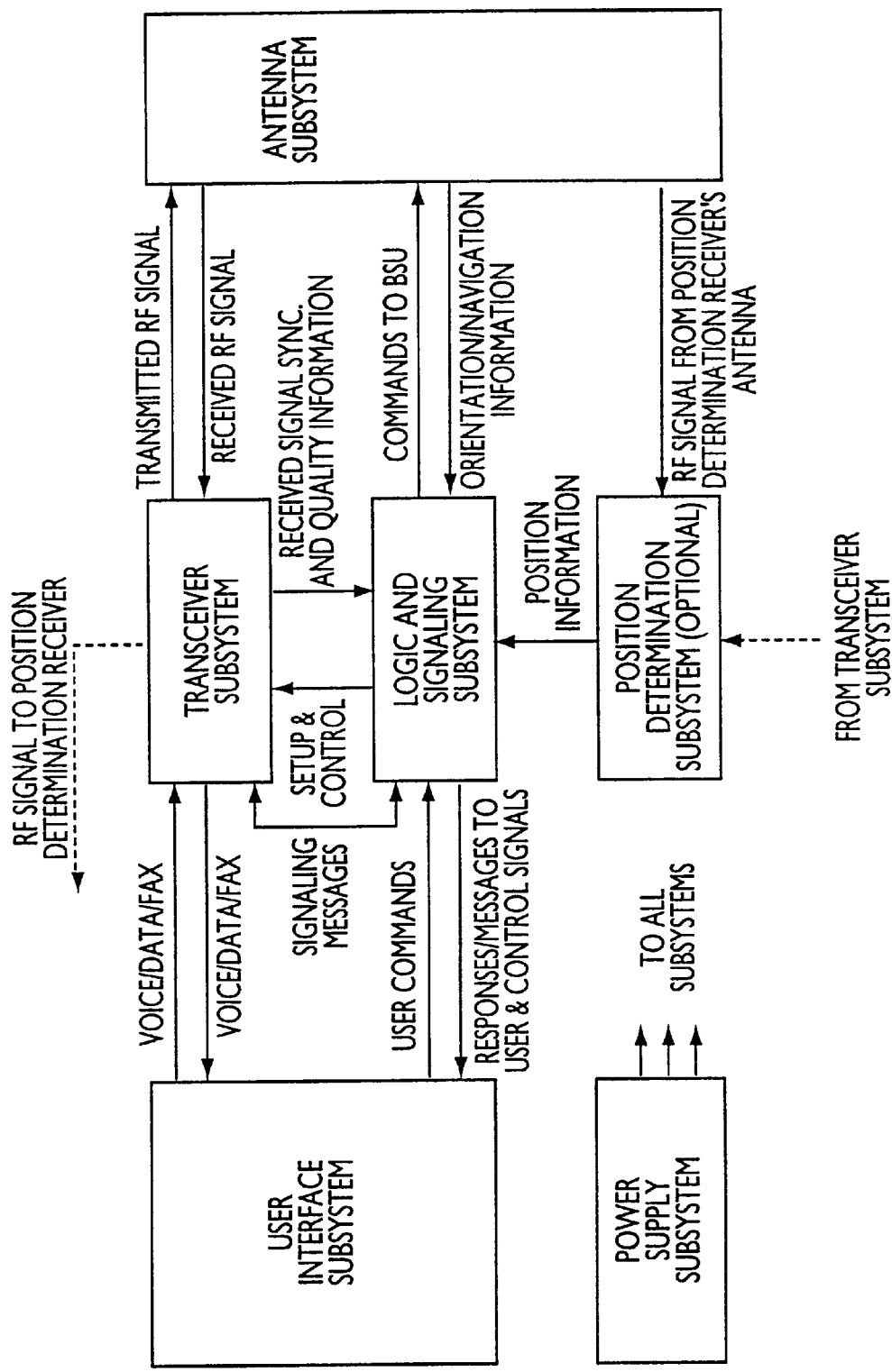
FIG. 7 is a basic block diagram of the functions of the mobile earth terminal.

The MET includes all of the communication and control functions necessary to support communications from a vehicle or fixed remote site using the resources of the satellite network system. FIGS. 6 and 7 are basic block diagrams of the physical architecture and functions of the mobile earth terminal. The basic functional diagram of FIG. 7 is implemented by baseband processing and RF electronics of FIG. 6. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed below. Advantageously, the mobile earth terminal is functional with antennas that are either steerable or nonsteerable.

The functional subsystems comprising the MET are shown in FIG. 7 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 8A:
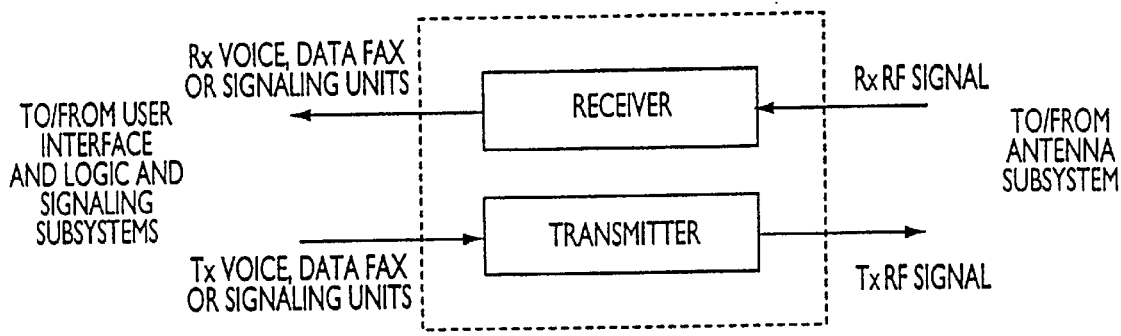
FIGS. 8a–8c are diagrams of different transceiver configurations.
Figure 8B:
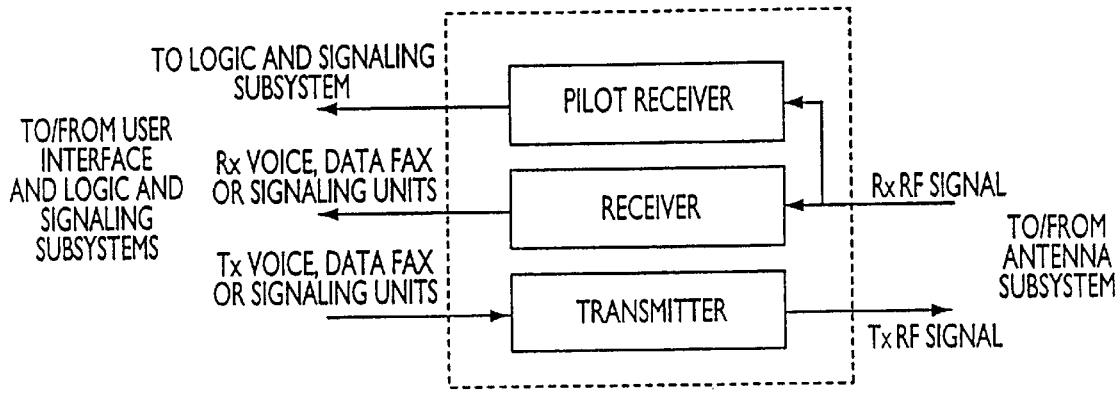
Figure 8C:
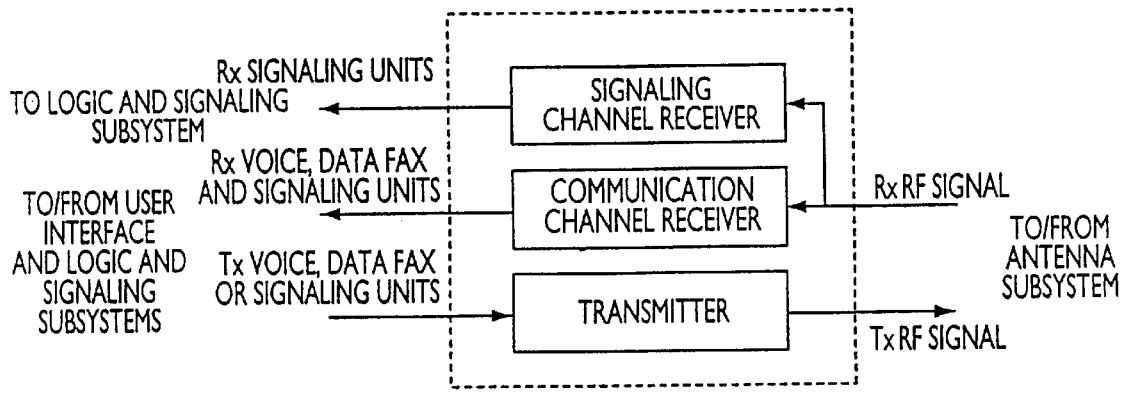

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 8(a)–8(c).

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundancy Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any)

in the antenna subsystem, and monitors and tests all the other subsystems. In case of fault detection, it informs the user about the failure and take the appropriate measures needed to prevent harmful interference to the satellite network or other system.

The power supply subsystem provides power to all other subsystems. The external voltage source to which this subsystem interfaces depends on the type of vehicle on which the MET is mounted (e.g. 12/24 Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B.

The MSS signaling system provides the communications capability between network elements required to set up and release communications circuits, provide additional enhanced services, and support certain network management functions. The network elements discussed above include group controllers (GCs), feederlink earth stations (FESs), and mobile earth terminals (METs). The seven different channel types are:

| | |
|---|---|
| GC-S | Outbound TDM signaling channel from the GC to the METs |
| MET-ST | Inbound TDMA signaling channel from the MET to the GC. |
| MET-SR | Inbound random access signaling channel from the MET to the GC. |
| FES-C | Outbound communications and inband signaling channel from a FES to a MET. |
| MET-C | Inbound communications and inband signaling channel from a MET to a FES. |
| GC-I | Interstation signaling channel from the GC to an FES. |
| FES-I | Interstation signaling channel from an FES to the GC. |

Figure 9:
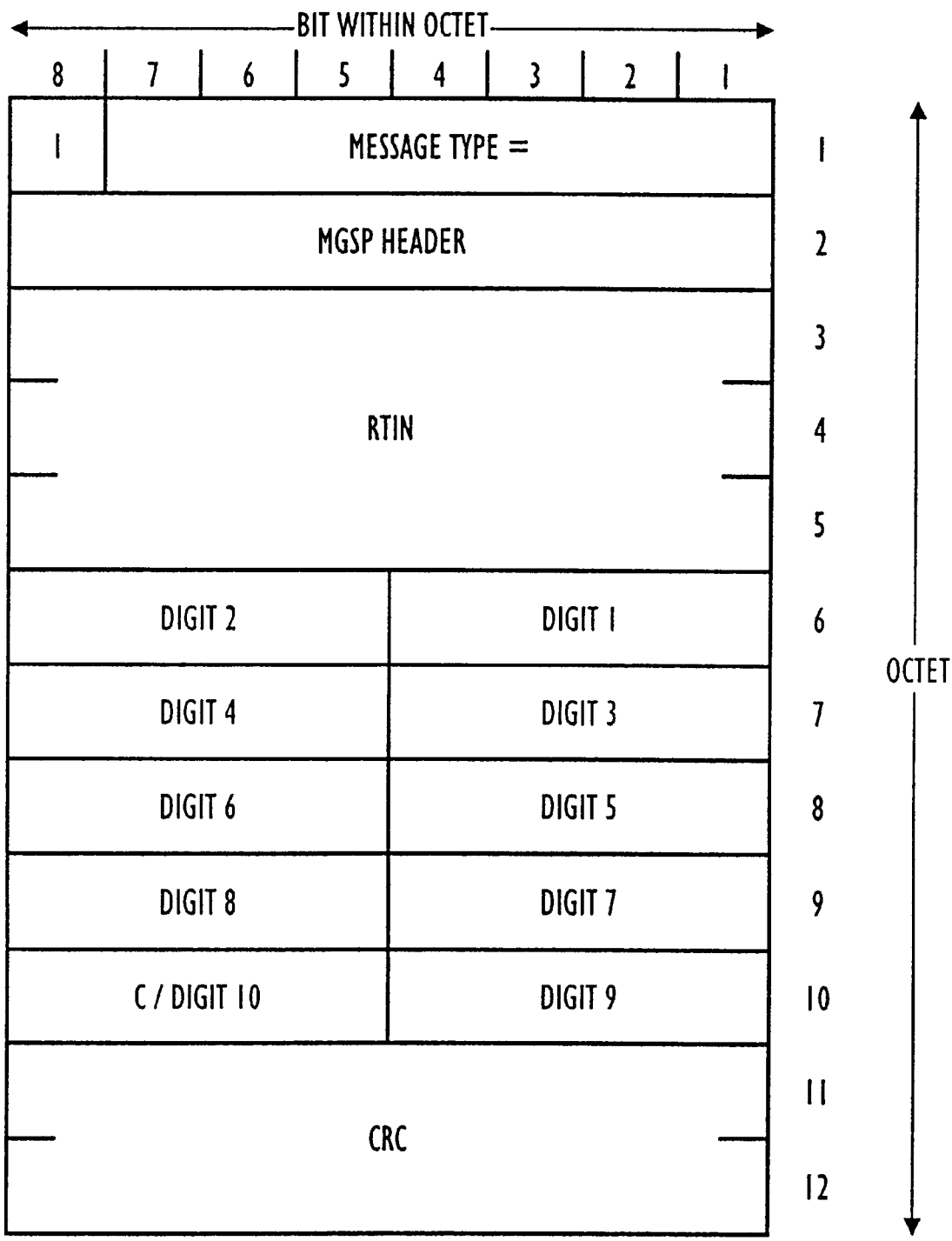
FIG. 9 is a diagram of the format of a typical signalling unit.
Figure 9A:
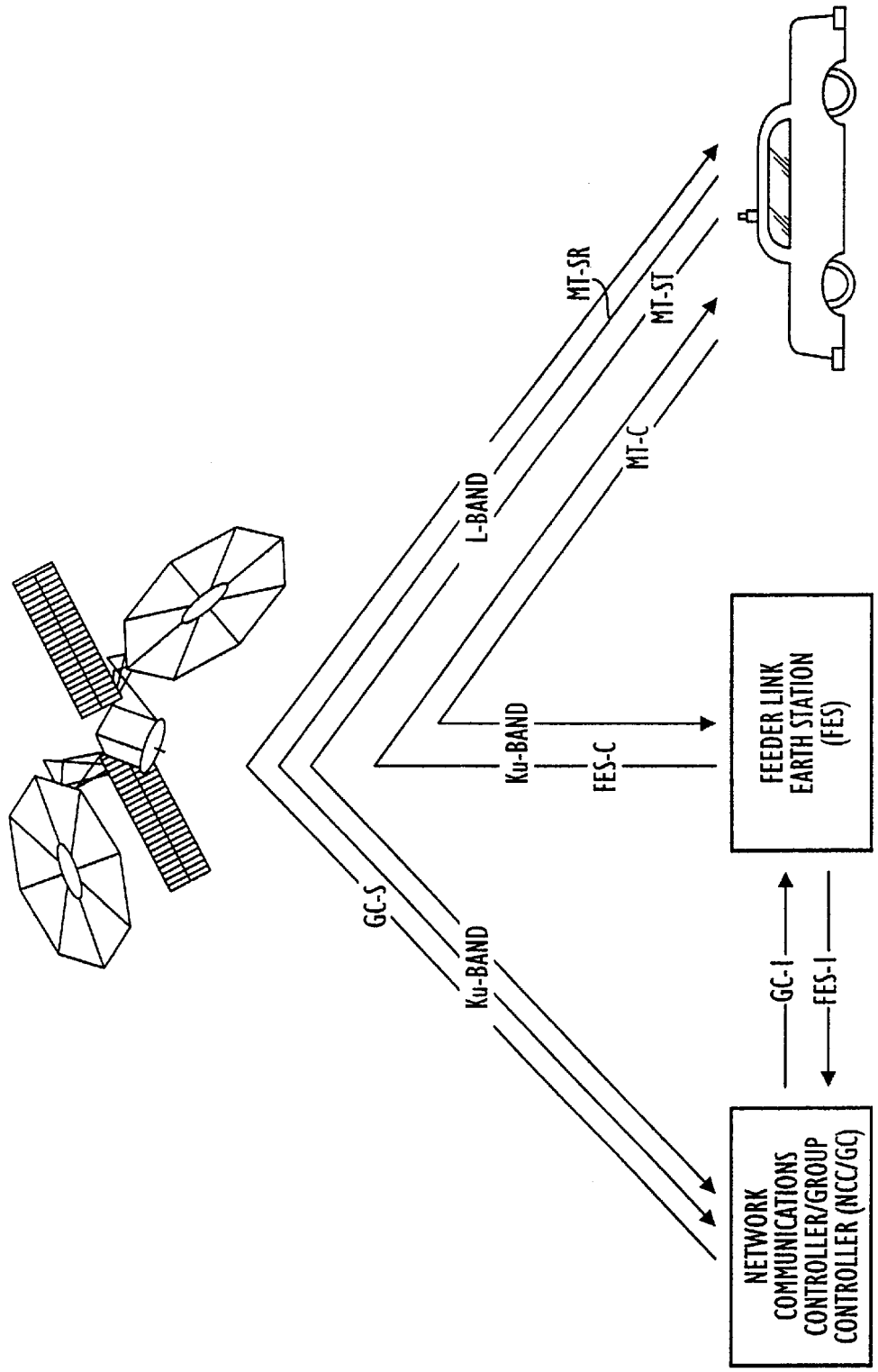
FIG. 9a illustrates the basic signalling architecture in the satellite communication system.

FIG. 9a illustrates the basic signalling architecture in the satellite communication system.

The basic element of communication for signaling and control for the MSS signaling system is the Signaling Unit (SU). The SU consists of 96 bits organized in 12 octets of 8 bits each. The first 80 bits comprise the message, and the last 16 a parity check, computed using the CCITT CRC-16 algorithm. The SU itself may take a variety of forms, depending on its use. The format of a typical SU, in this case a MET request for access, is shown in FIG. 9. For transmission, the SU is convolutionally encoded at either rate ¾ or ½, adding an additional 32 or 96 bits respectively.

For the example given in FIG. 9, the meanings of the various fields are as follows:

Message type: A 7 bit code which identifies the meaning of the SU; in this case a request for access to the MSS system for call placement.

MET-GC Signaling Protocol (MGSP) Header: A 8 bit field comprised of several sub-fields giving particular information related to the protocol: message type (command, response, message), message reference identification, and the number of times the message has been retransmitted.

RTIN: Reverse Terminal Identification Number—the MET's Electronic Serial Number, by which it identifies itself in transmissions on the MET-SR channel.

Digits 1–10: The first 10 digits of the addressed telephone number in the PSTN or private network, in hexadecimal. If the 10th digit is set to "C", an address of greater than 10 digits is indicated.

CRC: The 16-bit error detection code (Cyclic Redundancy Code).

The frame formats used in the GC-S, MET-SR and MET-ST channels are closely related, and are based on a common 360 millisecond superframe established on the GC-S channel. The frame formats and relationships of the out of band signaling channels are shown in FIG. 10.

Figure 10:
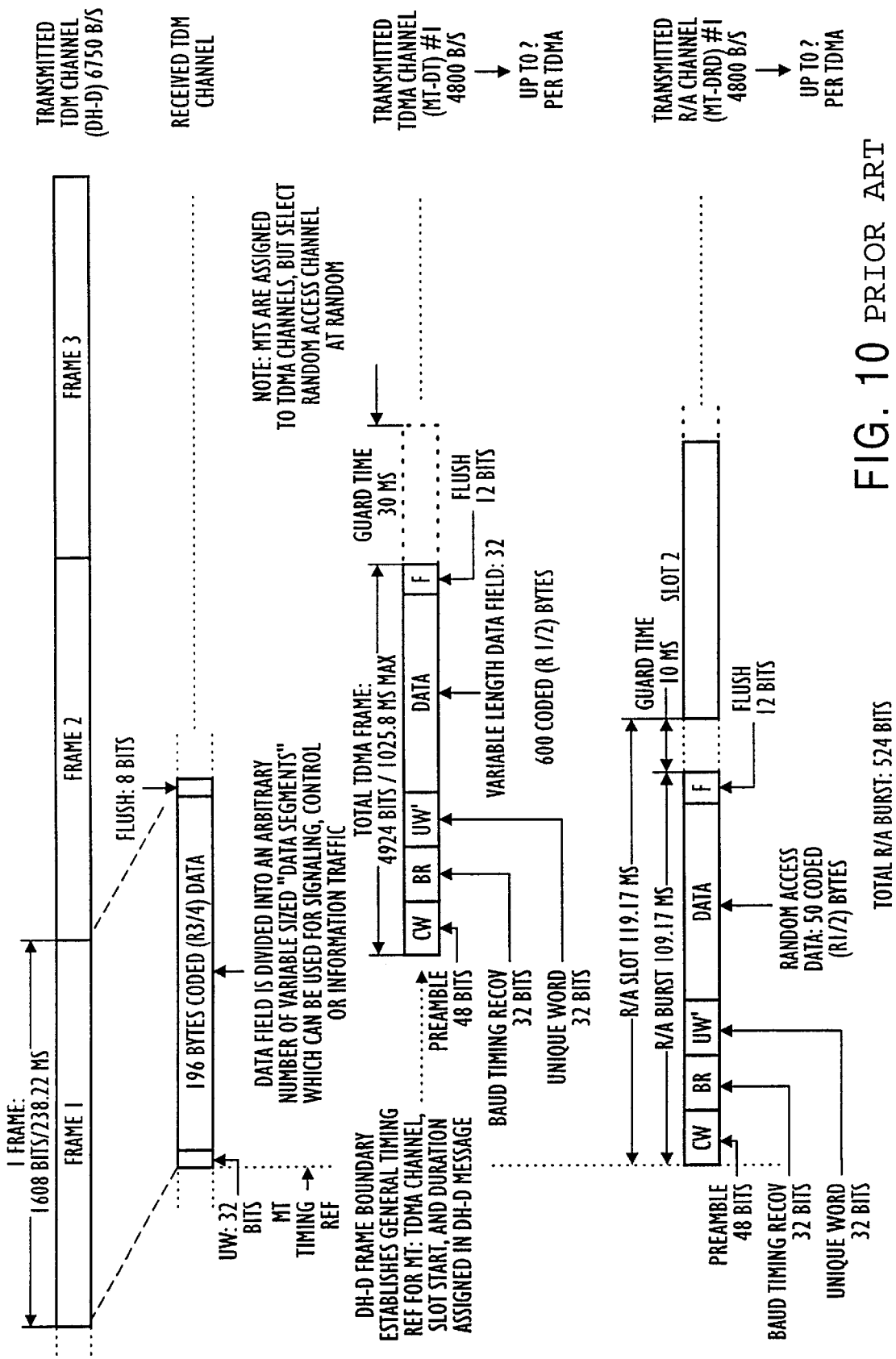
FIG. 10 is a diagram of the frame formats and relationships of the out of band signaling channels.

In FIG. 10, all timing relationships in the MSS system signaling scheme are determined from the GC-S frame structure. The GC-S is operated in the QPSK mode at an aggregate rate of 6750 b/s. The stream is divided into superframes of 360 ms, comprising three 120 ms frames. Each frame is in turn comprised of a 24-bit unique word (UW), six SUs, eight flush bits and 10 unused bits, for a total of 810 bits and 120 ms. The first frame of a superframe is identified by inversion of the UW.

Mobile terminals throughout the area covered by any beam receive GC-S channels with a total uncertainty of approximately 32 ms, primarily due to their geographical locations. The received superframe boundary establishes the four 90 ms "slots" in the MET-SR random access channels, which operate in the BPSK mode at 3375 b/s. The actual random access burst is comprised of a 24-bit preamble, a 32-bit UW, a 128-bit SU (96 bits rate ¾ coded), and eight flush bits, for a total of 192 bits in 56.9 ms. This allows a 33.1 ms guard time between bursts. Mobile Terminals select a MET-SR channel and slot at random from among the permitted choices.

The MET-ST TDMA channels, which also operate in the BPSK mode at 3375 b/s, are comprised of bursts which are equal in length to the GC-S frame, and which are also timed on the received frame boundary. The TDMA burst is made up of a 24-bit preamble, a 32-bit UW, a 192-bit SU (96 bits rate ½ coded), and eight flush bits. The total length of the TDMA burst is 256 bits in 75.9 ms, which allows a guard time of 44.1 ms. Mobile Terminals always respond to commands received on the GC-S on a MET-ST channel which corresponds in number to the position of the command SU in the TDM frame. For example, the MET will respond to a command in SU slot 2 on MET-ST channel 2, and so forth. The response is always transmitted in the second frame time after receipt of the command, so that there is a minimum of 120 ms in which the MET can prepare its response.

The initial phase of establishing a call is handled by out-of-band signaling on the GC-S, MET-SR and MET-ST channels. This phase culminates in assignment of a pair of communication channels to the MET and FES. When these elements receive and tune to the communication channels, further signaling and control functions are accomplished using inband signaling. The communication channels, FES-C and MET-C, use a variety of related TDM formats which are determined by the intended use of the link, i.e., voice, data, or facsimile and one of three possible primary modes: call setup (entirely signaling), communication (no signaling), or in-band signaling (an occasional subframe of 128 bits is used for signaling/control).

Figure 11:
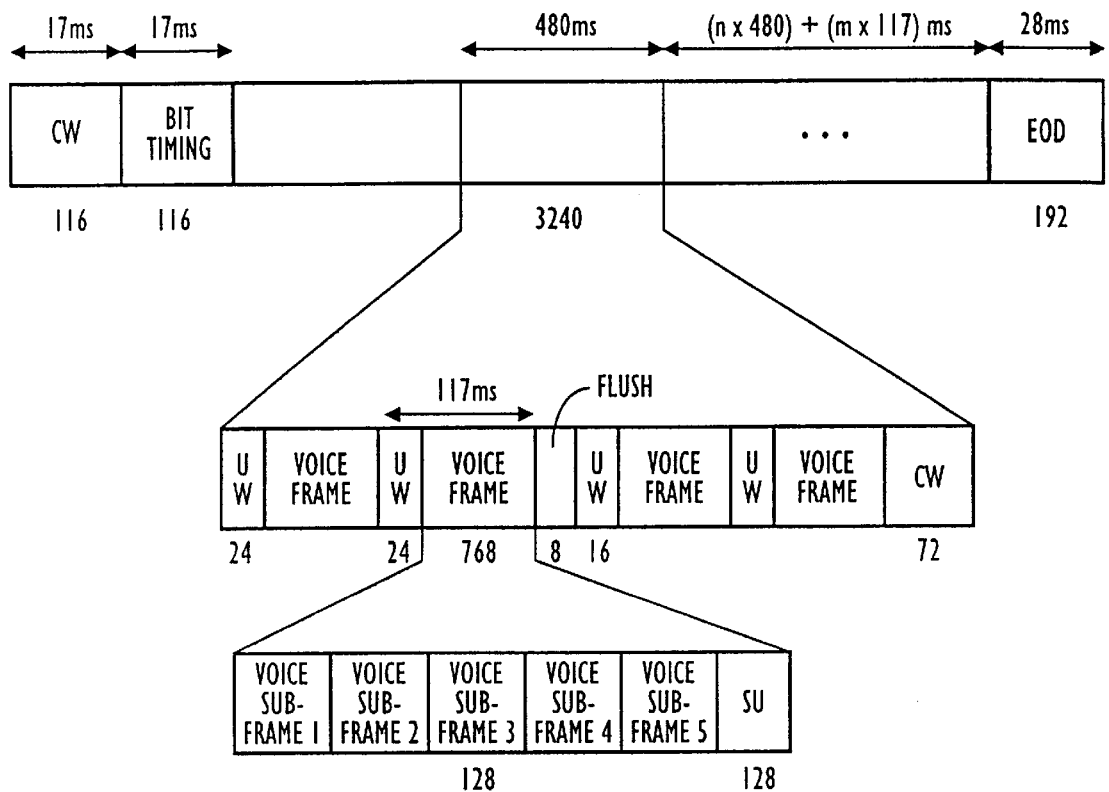
FIG. 11 is a diagram of a typical example of a communication channel format, in this case voice mode in-band signaling.

The same 96-bit SU described above is used to accomplish in-band signaling. A typical example of a communication channel format, in this case voice mode in-band signaling is shown in FIG. 11.

The outbound TDM, inbound TDMA, and inbound random access channels provide signaling between the GC and each of the METS in the associated control group. All communications on these channels will be passed in the form of 96 bit (12 octet) messages known as signaling units. Each signaling unit will begin with a 1-octet messages type field and end with a two-octet cyclic redundancy check. The MET to GC Signaling Protocol (MGSP) serves as the layer two protocol for these channels.

Communications from the group controller (GC) to the mobile terminals is provided by the Outbound TDM or GC-S channel. The primary function of this channel is to carry frequency assignments from the GC to individual METs. In addition, the Outbound TDM channel carries network status information which is received by all METs in a particular beam and control group. The outbound TDM channel operates at a rate of 6750 bits/s with rate ¾ FEC. QPSK modulation and nominally 6.5 kHz channel spacing (other spacings are under investigation) is employed. These parameters are identical to those of the communications channel and were chosen to reduce MET complexity.

Inbound TDMA (MET-ST) channels are used by the MET to respond to actions initiated by the GC, such as responding to the call announcement issued by the GC to check a MET's availability to receive a PSTN originated or MET to MET call. The Inbound Random Access (MET-SR) channels are used by METs to request frequency assignments and for other MET initiated actions. The inbound random access and TDMA channels each operate at a rate of 2400 bits/s with rate ¾ FEC. DPS modulation and nominally 7.5 kHz channel spacing is employed. This modulation scheme has been selected because of its robust performance in the presence of frequency offset and timing errors. It also exhibits superior performance relative to conventional BPSK in the presence of band-limiting and hard-limiting. Each control group has associated with it a number of L-band beams over which it operates. In each of these L-band beams a control group has associated with it a distinct set of outbound TDM, inbound TDMA, and inbound random access channels. The number of signaling channels of each type in each set is determined based on the level of signaling traffic flowing between the GC and the METs in that-control group in that L-band beam. As signaling traffic levels change, new signaling channels of each type are allocated to or deallocated from a particular set of channels. The frequencies used for outbound TDM, inbound TDMA, and inbound random access channels are included in the status information carrier in the bulletin board signaling units transmitted on the outbound TDM channel.

Each MET is assigned to one of the outbound TDM channels in the control group and beam to which it belongs. Each control group supports up to 16 outbound TDM channels in each beam. Each outbound TDM channel has associated with it up to 6 inbound TDMA channels. An inbound TDMA channel will only carry messages that are responses to messages received on the outbound TDM channel with which it is associated inbound random access channels will not associated with a particular outbound TDM channel. A MET chooses a inbound random access channel at random from among those associated with its control group and beam each time a message is to be transmitted. Each control group can support up to 64 inbound random access channels in each beam. Up to 64 of these channels may be used system wide to meet the signaling requirements of a fully loaded system supporting 5000 circuits.

Inband signaling channels (FES-C and MET-C) are provided between the FES and the MET. These channels are used to provide signaling for call setup and call release, and also provide the capability to pass other signaling information while a call is in progress. The FES-C and MET-C channels are operated in two separate modes in "call setup mode" only signaling messages are carried by the channel. In voice mode voice frames are carried by the channel, but the capability to inject signaling messages by occasionally dropping voice subframes exists. Frames containing inband signaling messages employ a unique word different from that used for frames containing only voice subframes.

Interstation signaling channels (GC-I and FES-I) are used to pass signaling information between the GC and each of the FESs. These channels operate at a rate of 9.6 to 64 kbit/s and are implemented using either the available 5 MHz Ku-band satellite capacity or terrestrial links. The LAP-F protocol will be employed on those links to ensure reliable transfer of variable length signaling and network management messages.

When a MET is idle (powered on and ready to receive a call) it will continuously receive an Outbound TDM channel in order to receive call announcements associated with incoming calls and obtain status information from bulletin board signaling units. Each MET will be capable of transmitting signaling information to the GC on any of the inbound random access channels or on any of the inbound TDMA channels associated with the outbound TDM channel that it is receiving. During a call a MET will receive and transmit all signaling information via the In-Band signaling channels. No signaling information will be sent to a MET via the outbound TDM channel during a call. Any signaling messages from the GC to the MET will be sent to the MET via the FES through the GC-I and FES-C channels.

Each group controller supports at least one outbound TDM channel in each of its associated L-band beams. Each outbound TDM signaling channel is continuously transmitted and carries frequency assignments and networks status information from the GC to the METs. The outbound TDM channels are also used to poll idle METs to see if they can accept incoming calls. As this channel is the only way to signal information to a MET not engaged in communications, it must be as robust as possible under harsh fading and shadowing conditions.

Another key element in the MSS system is the need for the METs to be as inexpensive as possible. Towards this end, the outbound TDM channel will have the same rate and modulation as the communications channels. This will maximize the commonality of the receive chain of the MET for communications and signaling. Note that as the demodulation process is much more complex than the modulation process, the inbound random access and inbound TDMA channels do not really require this level of commonality with the communications channel.

The number of outbound TDM channels assigned to each set of signaling channels is determined by the traffic supported by the group controller in that L-band beam. Assignment of METs to outbound TDM channels is made based on a special identifier assigned to each MET as commissioning. This identifier is called the GC-S Selector Identifier code (GSI). The MET selects the outbound TDM channel to be used by dividing the GSI by the total number of outbound TDM channels available in the given beam. The number of TDM channels available is given in the BB of each TDM channel. The remainder of the four bit binary division process will form the number of the channel to be used. Each MET will receive only the outbound TDM channel assigned to it. This method allows METs in the same logical grouping to be assigned to the same outbound TDM channel as is needed for the Net Radio Service provided by the MSS System. It also allows the load on the outbound TDM channels to be redistributed quickly if a channel fails or a new channel is added.

The 120 ms frame length was chosen because it would support 6 messages per frame and correspond to the slot size requirement (>120 ms) of the inbound TDMA channel. This allows a direct correspondence between outbound TDM frames and inbound TDMA slots for the purposes of TDMA synchronization and scheduling responses to outbound messages. Eight flush bits are included at the end of each frame to allow the decoder to reset to a known state at the beginning of each frame. This allows more rapid reacquisition following channel fade events. The modulation scheme and transmission rate for this channel will be the same as for the transmission channel, namely QPSK modulation at a transmission rate of 6750 bps. Signaling units within each frame will be coded with a rate ¾ constraint length K=7 convolutional code.

The outbound TDM superframe has a duration of 360 ms is and is made up of three outbound TDM frames. The superframe duration is the basic time interval over which message repetitions are done. Repetitions are used to increase the reliability of outbound TDM signaling units. Messages can be repeated in consecutive superframes. Studies by AUSSAT have shown that L-band fade events typically have durations ranging between 10 ms and 100 ms (2). Because the 120 ms frame would not provide adequate separation between message repetitions, the 360 ms superframe is used to reduce the chance of losing two copies of a message during the same L-band fade event. This repetition method is similar to that used in the AUSSAT system. Different numbers of repetitions may be used for different message types to provide different levels of reliability. The number of repetitions used for a particular message type will be a part of the signaling protocols and can be varied by the system operator. In addition to message repetitions, interleaving will be used to protect against burst errors. The interleaving is provided over a TDM frame and provides improved performance in the presence of short burst errors.

The bulletin board is a set of signaling unit (SUs) that are periodically transmitted by the MCC on all outbound TDM channels. The bulletin board contains global information such as current network status, signaling channel frequencies and inbound random access channel congestion control parameters. Every MET processes the information in the bulletin board METs, on startup, and acquires the entire bulletin board before attempting to use the MSS system. At least one bulletin board SU is transmitted in every outbound TDM frame. Bulletin board SUs are also sent as "filler" SUs, i.e., sent when there are no other SUs pending on the outbound TDM channels. Bulletin board SUs do not occupy any fixed position in the outbound TDM frame.

Bulletin board SUs are grouped into pages of related SUs. Each Bulletin Board page has an update number associated with it, which will be sent with each SU of that page. This number will be incremented by the NCC whenever the information in that page is updated. METs are required to build a local data structure that contains the contents of the bulletin board. Whenever a change in update number is detected for any page, the MET will update the entire data structure for that page with the contents of the bulletin board SUs that follow.

The inbound TDMA channel is used by the METs to transmit responses to call announcement messages and for responses to other messages received on the outboard TDM channel. Each of the inbound TDMA channels is assigned to a particular outbound TDM channel. The number of inbound TDMA channel assigned to a particular outbound TDM channel depends on the traffic supported by that outbound TDM channel and is selectable by the network operator. The TDMA channel is divided into slots of 120 ms duration. Inbound messages consist of 96 bits before coding and 128 bits after rate ¾ convolutional coding. The resulting burst will occupy 80 ms of the slot, allowing 40 ms of guard time.

This guard time arises due to the uncertainty in round trip transmission time between the satellite and a mobile terminal. Mobile terminals derive their inbound frame timing (for both the TDMA and random access channels) from the outbound TDM frames. Inbound TDMA slots have the same duration as an outbound TDM frame. At a MET each TDMA slot boundary occurs at an outbound TDM frame boundary. If MET A is nearer to the satellite than MET B, MET A will receive the outbound TDM channel $\Delta t$ sooner than MET B, where $\Delta t$ corresponds to the difference in propagation times to the satellite for the two terminals. As a result, if both METs synchronize their transmit timing to their reception of the outbound TDM channel, MET B's responses to messages will take $2\Delta t$ longer to reach the satellite than MET A's responses. As additional guard time of 1 symbol time also must be included to account for the $\pm\frac{1}{2}$ symbol synchronization uncertainty in the MET. This results in a total guard time requirement of $2\Delta t+1$ symbol time.

TDMA scheduling is done using a fixed relationship between outbound TDM channel time slots and inbound TDMA channels and slots. The response to a message received in the nth slot of the outbound TDM frame is transmitted on the nth TDMA channel assigned to that outbound TDM channel. The frequencies of the assigned inbound TDMA channels are contained in one of the bulletin board signaling units periodically transmitted in the outbound TDM channel. The response to an outbound message is transmitted in the TDMA time slot that begins 120 ms after the end of the TDM frame in which the outbound message was received. This should provide adequate time for message processing in the MET.

The inbound random access channel is used by the METs to transmit call requests to the GC. It is also used to carry other inbound messages for MET originated actions. The number of inbound random access channels assigned to a particular control group in a particular L-band beam depends on the traffic supported by that control group in that beam and is selectable by the network operator. To provide reasonable call setup times and call loss probabilities these channels are typically be operated at a throughput of approximately 25% or less. As the random access channel is operating at a relatively low efficiency, one of the prime goals in its design is that it be bandwidth efficient.

The frequencies used for the random access channels are transmitted in the bulletin board signal units. For each transmission, METs choose at random among the inbound signaling channels assigned to their control group. After transmitting a message, the MET waits a given amount of time for a response. If no response is received within this amount of time, the MET retransmits in a slot selected at random over some given number of slots. This procedure is repeated until either a response is received or a maximum number of transmissions is reached. The bursts on the random access channel are identical to those on the TDMA channel (i.e., modulation, coding, preamble, etc.).

The MET-GC Signaling Protocol (MGSP) procedures send signaling units between GCs and METs via the GC-S, MET-ST and MET-SR channels. This protocol encapsulates functions such as channel selection, channel access, slot timing, error recovery and congestion control. Higher layer functions, such as call processing, use the protocol for communicating among themselves between the METs and GCs.

Figure 12:
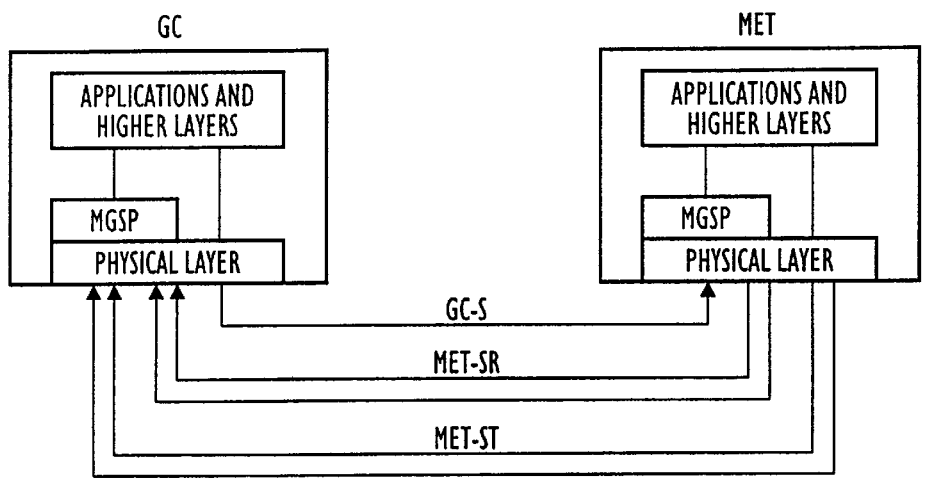
FIG. 12 is a diagram of the relationship of MGSP to other signaling layers in the GC and the MET.

The relationship of MGSP to other signaling layers in the GC and the MET is shown in FIG. 12. A transaction consists of a command message that is sent from an originating application to a destination application, to which the destination application replies with a response message. Each command and response consists of a signaling unit. The MGSP performs functions such as channel selection, error recovery using retransmission, and repetition of SUs to improve channel reliability. The MGSP at a MET also implements congestion control procedures for the MET-SR channels. Only one outstanding transaction exists between a MET and a GC in a given direction. However, two simultaneous transactions, one in each direction, are supported between a GC and a MET. MGSP also provides a only-way message service, that does not require a response from the receiver.

Figure 13:
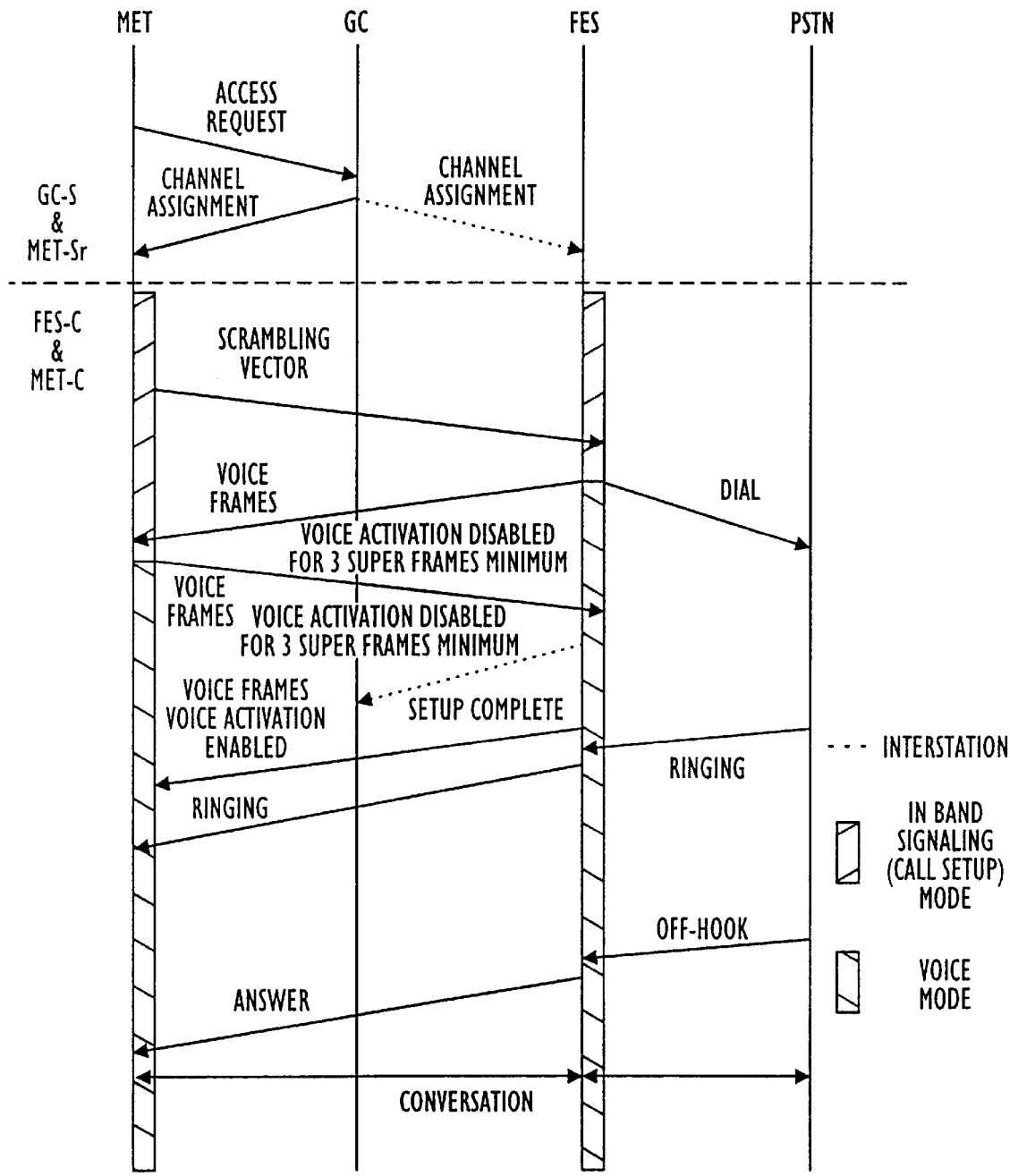
FIG. 13 is a diagram of the improved call setup protocol used to establish a MET originated voice call.

The improved call setup protocol used to establish a MET originated voice call is shown in FIG. 13. When a MET user initiates a call, the MET formats and transmits an access request message via a random access channel. This message includes the call type and the destination phone number. The group controller chooses an FES to handle the call and sends frequency assignments to the MET via the TDM channel and to the FES via the interstation signaling channel. The FES frequency assignment also includes the call type, the destination phone number to allow the FES to complete the call, and an access security check field used to verify the METs identity. The access security check field is generated by the group controller using the MET frequency assignment and the MET key which is known only to the MET and the group controller.

After the MET receives the frequency assignment, it transmits a scrambling vector message to the FES. This message contains the initial vector to be preloaded into the FES scrambler at the beginning of each voice channel frame. Letting the MET randomly pick this vector provides some degree of privacy on the Ku to L-band link. The scrambling vector message also contains an access security check field generated by the MET using its frequency assignment and its key. The FES compares this field with that received from the group controller to verify the identity of the MET. After receiving the scrambling vector message, the FES and the MET switch from call setup mode to voice frame mode and the FES completes the call to the terrestrial network user.

Figure 14:
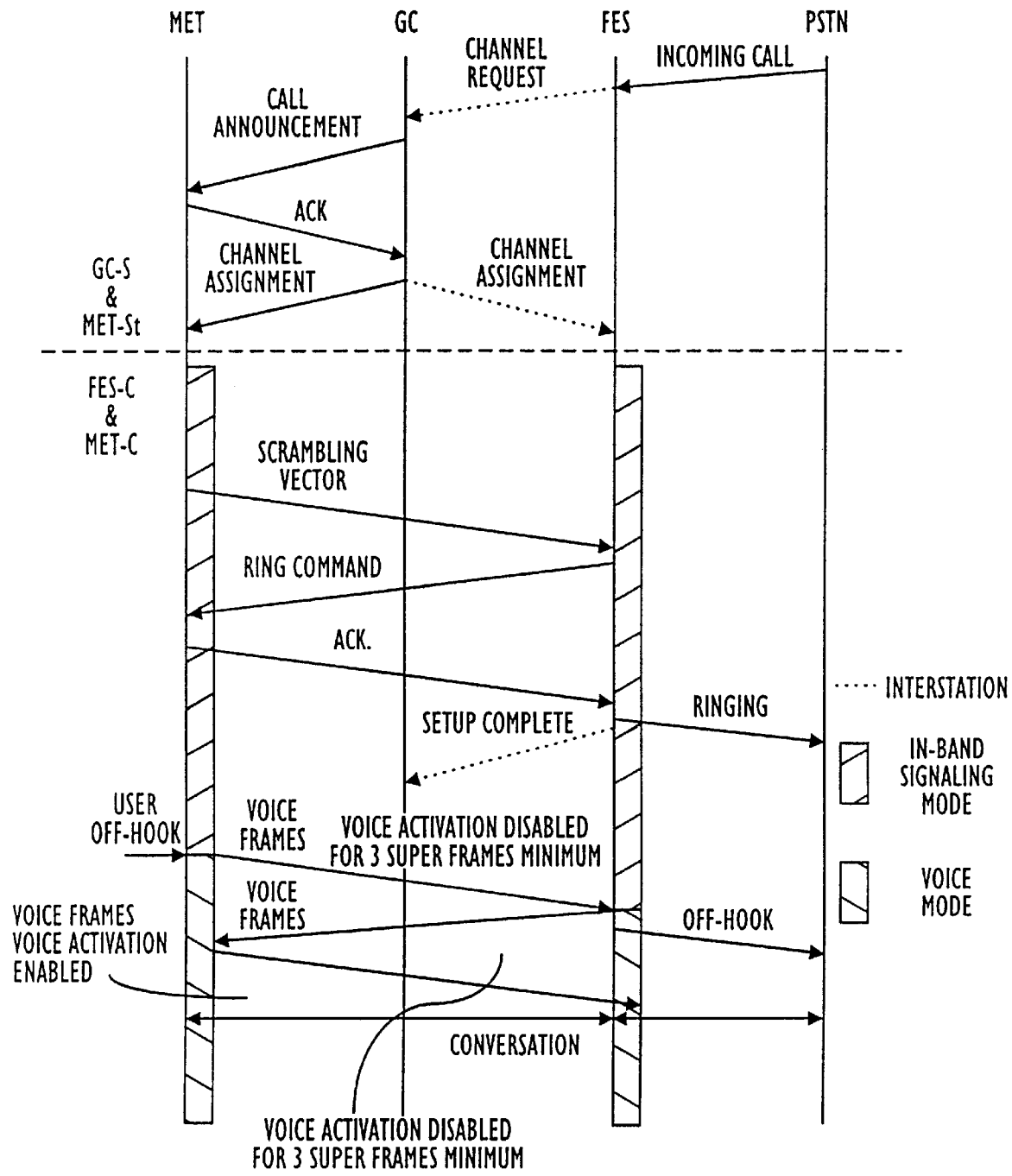
FIG. 14 is a diagram of the improved protocol used for PSTN originated calls.

The improved protocol used for PSTN originated calls is shown in FIG. 14. When a call from a terrestrial network user arrives at an FES, the FES makes a channel request using interstation signaling. This request contains the phone number received from the terrestrial network user. The group controller determines the MET identity based on the phone number and transmits a call announcement via the TDM channel. The MET acknowledges this announcement via the TDMA channel. This exchange allows the group controller to verify that the MET is available before assigning bandwidth to the call. Frequency assignments are then made and the scrambling vector is transmitted by the MET. The call is then completed to the MET user.

MET to MET calls are set up using a double hop connection through an FES. These calls are set up by the group controller and the FES as a MET to PSTN call setup concatenated with a PSTN to MET call setup. As a result the METs require no additional call processing for MET to MET calls.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station - Land Station Compatibility Standard"; EIA/TIA-557; EIA/IS-54B.

Met Roaming

Figure 15:
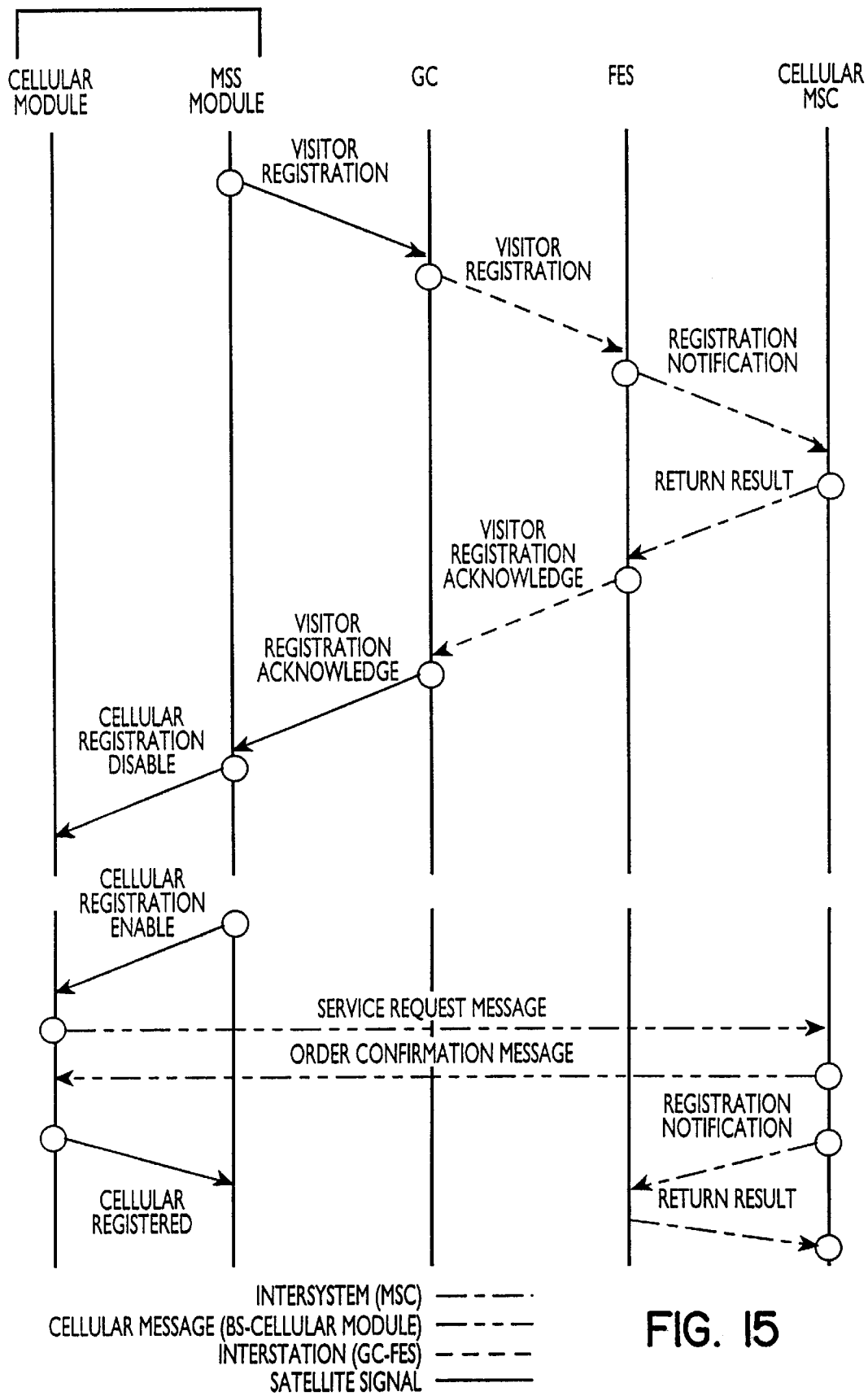
FIG. 15 is a diagram of a visitor registration sequence of the MET.

The Mobile Telephone Cellular Roaming Service (MTCR) supplements cellular service, providing access where there is no cellular coverage. The "home" Mobile Switching Center (MSC) of the multimode MET, as defined in EIA/IS-41B, is either the terrestrial cellular mobile carrier (CMC) system or the satellite network system. The MET registers as a "visitor" in either the satellite MSC or a terrestrial cellular system MSC per the requirements of EIA/IS-41B. The visitor registration sequence is provided in FIG. 15. The gateway provides automatic roaming for METs outside the range of terrestrial cellular coverage in accordance with EIA/IS-41B. METs are identified with the same 10-digit telephone number in the terrestrial cellular and satellite networks.

In the idle state, a mobile unit monitors the cellular and satellite signaling channels. The normal cellular procedure is used for terrestrial calls as defined in EIA/TIA 557. Each MET uses the cellular terminal ESN (electronic serial number) and the telephone number for the purposes of identification and registration on the CMC. Upon power up, the MET registers per the requirements of FIG. 16. If unsuccessful, it registers in accordance with the secondary selection, if applicable. If the mobile is in the coverage area of selected preferential service, the MET will not attempt to register as a roamer in another system until the MET detects the absence of preferential coverage. At that time, the MET attempts to register on the secondary coverage system as a roamer.

If the MET is registered in a secondary coverage system as a roamer, and detects the availability of preferential coverage, it attempts to register (reregister) with the preferential system. However, once a call is established on the satellite system, it remains on the satellite system until completion. Reregistration only occurs after a suitable time delay at the MET to avoid constantly switching between networks. For all reregistrations, a suitable time delay is defined as follows. The MET, upon the loss of a primary service (satellite or cellular) waits, for example, a nominal 6 seconds before attempting to register in the alternate service (cellular or satellite). If the primary service is recovered prior to the expiration of the 6 second delay, the mobile will not attempt reregistration. When registered on the alternate service, the MET will wait a nominal 6 seconds, and will then continuously monitor the availability of the primary service. When the primary service becomes satisfactorily available, the MET will attempt to return the registration to the primary service.

If the primary service is subsequently lost again, the MET will wait a nominal 15 seconds before attempting to register in the alternate service. If the primary service is recovered prior to the expiration of the 15 seconds delay, the mobile will not attempt reregistration. When registered on the alternate service, the MET will wait a nominal 15 seconds, and will continuously monitor the availability of the primary service. When the primary service becomes satisfactorily available, the MET will attempt to return the registration to the primary service. If the primary service is subsequently lost again (a third or more times), the MET will wait a nominal 30 seconds before attempting to register in the alternate service. If the primary service is recovered prior to the expiration of the 30 second delay, the mobile will not attempt reregistration. When registered on the alternate service, the MET will wait a nominal 30 seconds and will then continuously monitor the availability of the primary service. When the primary service becomes satisfactorily available, the MET will attempt to return the registration to the primary service.

Once the MET has invoked any reregistration, a 5 minute timer will be started. The timer will be reset to 5 minutes for each reregistration. If the 5 minute timer expires, the reregistration delay will be set to a nominal 6 seconds and the cycle will start over again. If both services are lost, the MET will continuously monitor both services, and will attempt to register (reregister) on whichever service becomes satisfactorily available.

Met Data Call

Figure 17A:
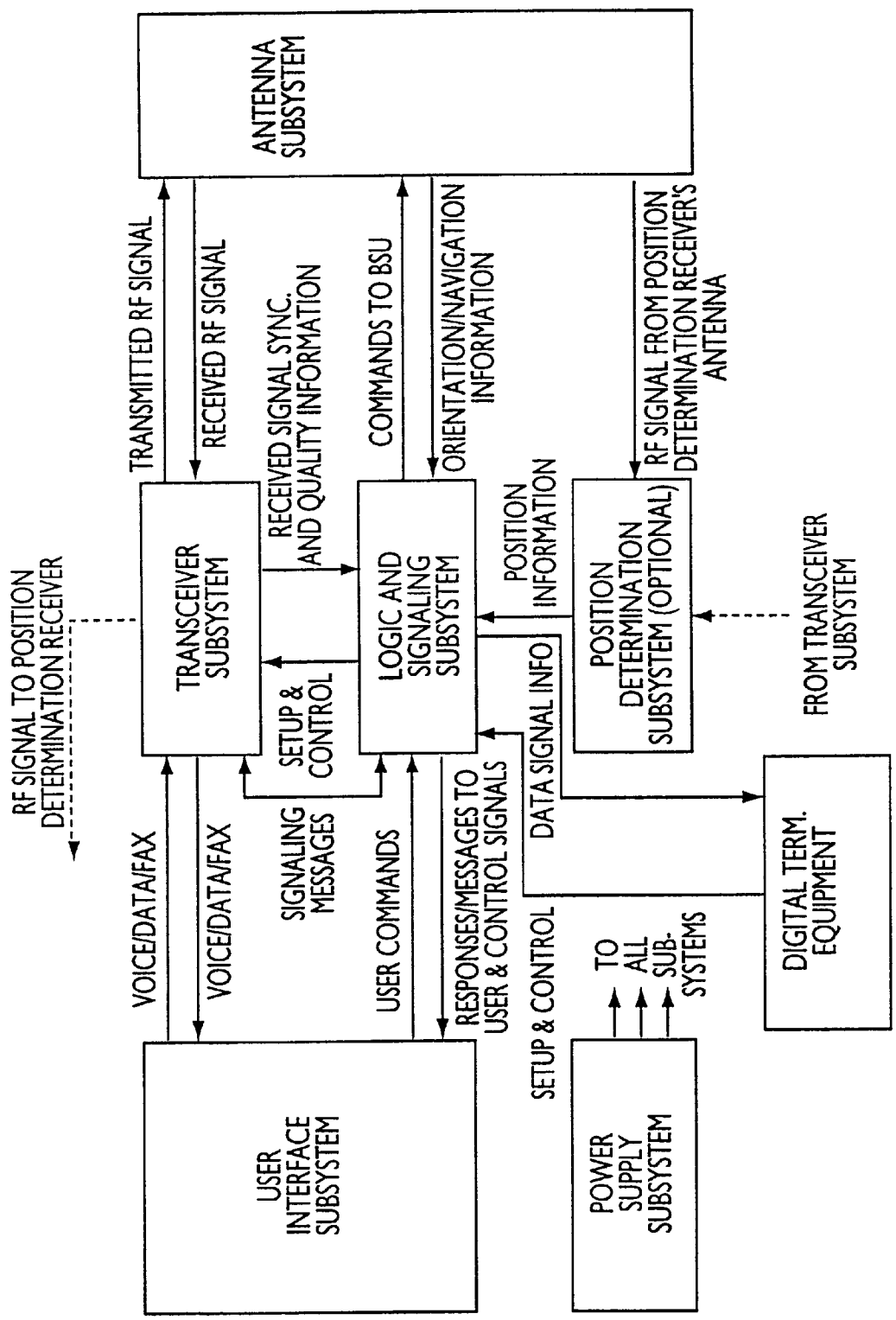
FIG. 17a is a basic block diagram of the functions of the mobile earth terminal including the digital equipment terminal functions.

FIG. 17a is a basic block diagram of the functions of the mobile earth terminal including the digital terminal equipment functions. The calling procedures for MET initiated data calls permit standard data terminal equipments (DTEs) connected to METs to place 2400 bps and 4800 bps data calls to appropriately equipped subscribers of the PSTN or members of private networks, similar to a data call by a standard modem. As discussed below, however, additional functions are required to effectuate the data call in the MET environment. The 2400 bps mode has a fall back rate of 1200 bps. The frame and data field formats for 1200 bps is identical to that for 2400 bps.

Figure 17B:
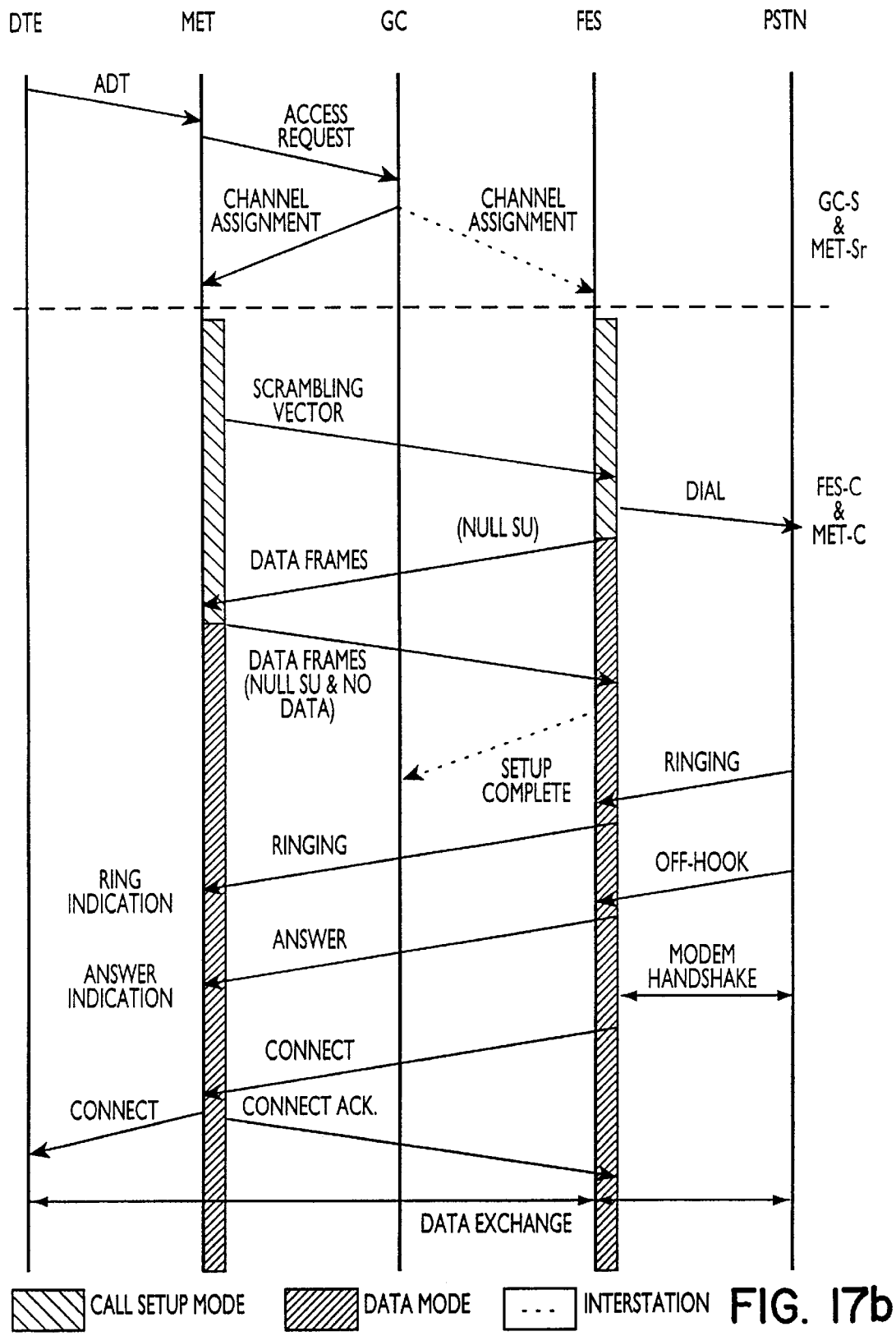
FIG. 17b is a diagram of a data call setup sequence between the MET and a PSTN.
Figure 18:
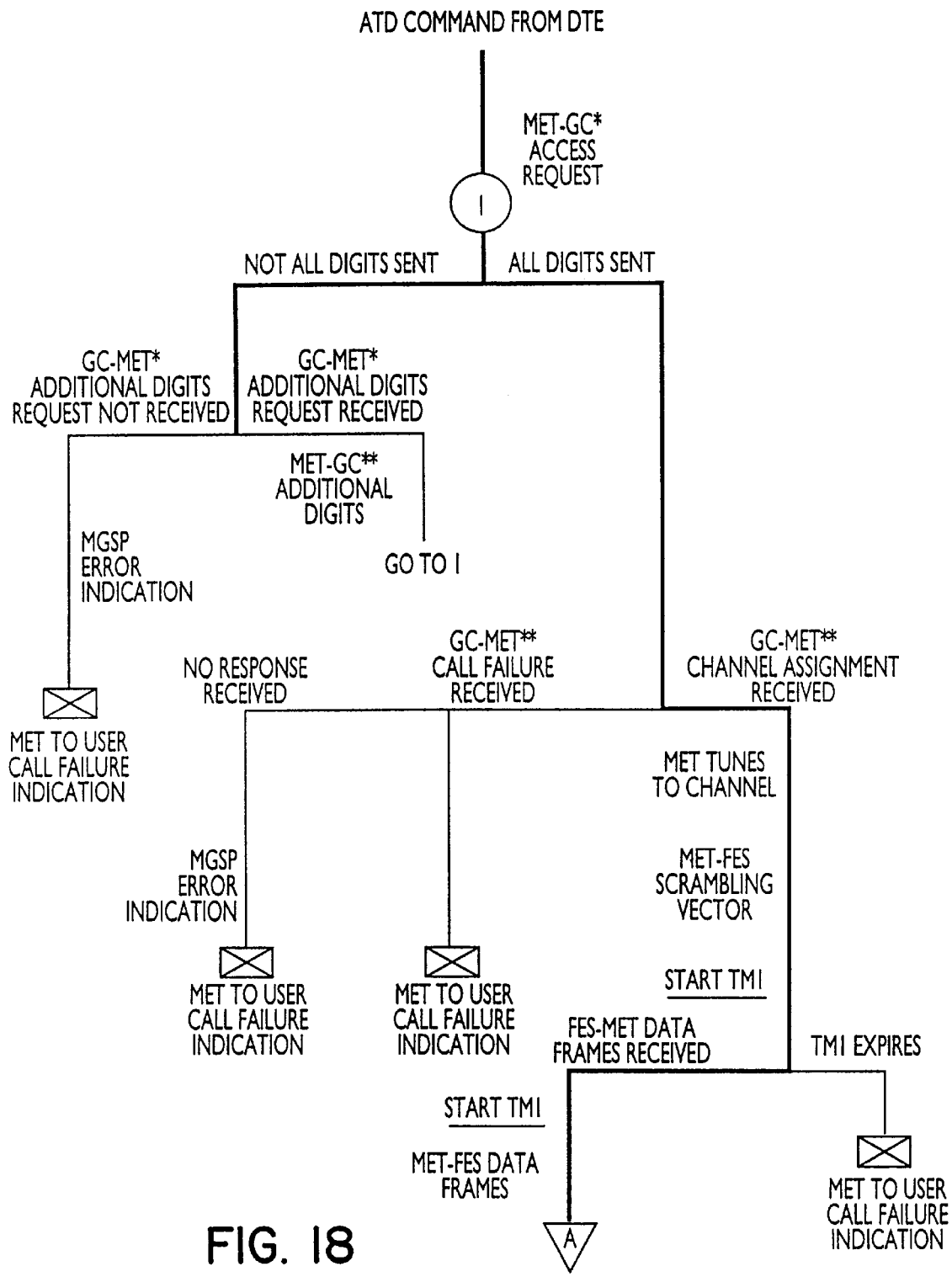
FIGS. 18–19 are event tree diagrams of a call setup sequence between the MET and a PSTN.
Figure 19:
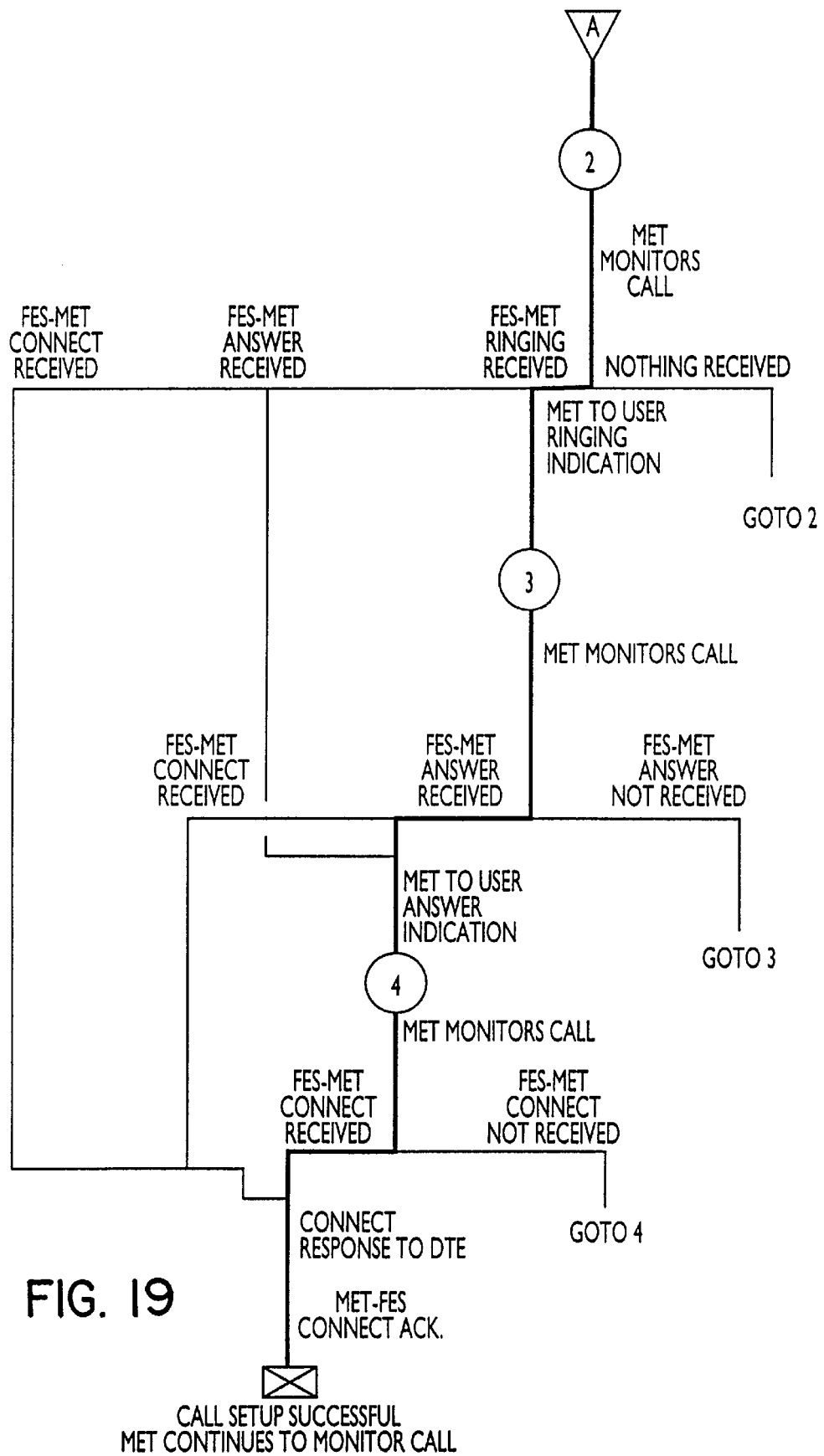

The AT command set is a set of commands commonly used for exchange of control information between DTEs and dial up modems. DTEs connected to the MET use a subset of the AT command set to send commands to the MET and receive responses from the MET. The message sequence shown in FIG. 17b used to establish MET originated data calls. The protocol employed is specified in the event tree given in FIGS. 18–19. A data call is initiated by the transmission of an ATD command from the DTE to the MET. The ATD command contains the telephone number of the destination modem/DTE. The ATD command also contains the desired transmissions speed and the character format to be used.

The message type field of the access request SU indicates that the call is a data call. Upon reception of the MET channel assignment SU, the MET transmits a scrambling vector SU to the FES via the MET-C channel. This message is continuously repeated until data frames are received from the FES. If no response is received after 5 seconds the MET ceases transmission and signals call failure to the user. The scrambling vector SU contains the initial scrambling vector to be used by the FES on the FES-C channel, the access security check field generated by the MET, and the desired character format and line speed for the connection.

Upon successful reception of the scrambling vector SUs, the FES will compare the access security check fields received from the GC and the MET and initiate call release if the fields are not identical. If the access security check fields are identical, the FES will seize a circuit into the PSTN and initiate establishment of the terrestrial portion of the connection. The FES will also switch to data mode and begin transmitting data frames to the MET. Upon reception of the data frames from the FES the MET switches from the call setup frame mode to the data frame mode and continuously transmits data frames to the FES with NULL SUs in the in-band signaling frames until a "connect" SU is received from the FES. For 1200/2400 bps data calls, the MET and FES transmit null SUs in the SU field.

Upon receiving data frames from the MET, the FES will begin transmitting ringing SUs to the MET in the in-band signaling field of the data frames. Upon detection of the PSTN going off-hook, the FES will stop sending ringing SUs and will begin transmitting answer SUs to the MET in the in-band signaling field of the data frames. Upon completion of the handshake and bit rate selection procedures between the FES terrestrial modem and the PSTN user modem, the FES will stop transmitting answer SUs and will begin transmitting "Connect" SUs to the MET. Upon receiving a "Connect" SU from the FES, the MET continuously transmits "Connect Acknowledgment" SUs. Upon receiving a "Connect Acknowledgment" SU from the MET, the FES will cease transmitting connect SUs to the MET.

Figure 20:
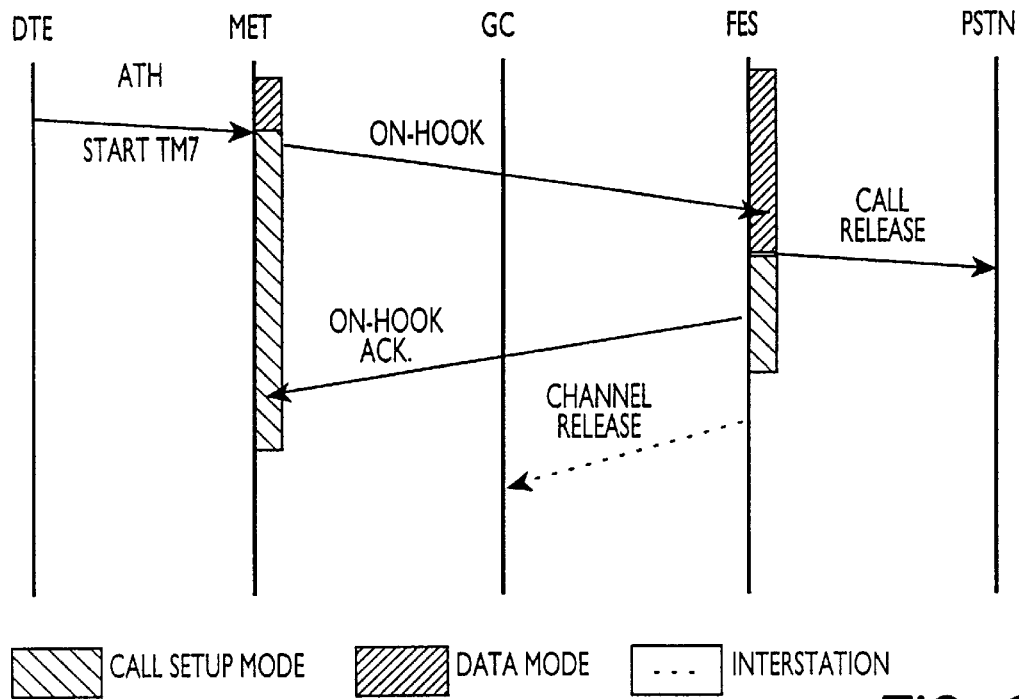
FIG. 20 is a diagram of a call release sequence initiated by the MET.
Figure 21:
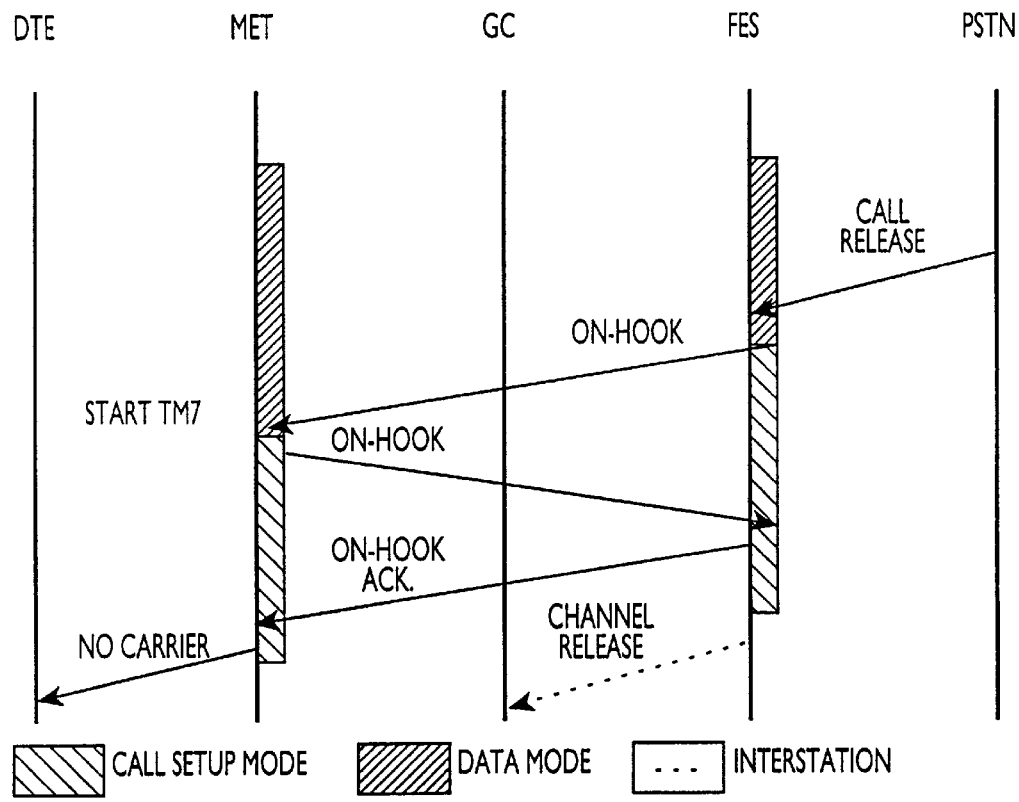
FIG. 21 is a diagram of a call release sequence initiated by the PSTN.

For data calls the DTE must be involved in the call release procedure. In all other respects the call release procedures for both MET and PSTN initiated data call release is the same as those specified for MET initiated calls. MET originated call release occurs when the DTE issues an ATH command to the MET. When PSTN initiated call release occurs the MET issues a NO CARRIER indication to the DTE. The sequences for MET and PSTN initiated data call release are shown in FIGS. 20–21. The MET continuously transmits "On Hook" SUs until it receives an "On-Hook Acknowledgment" SU or until timers TM5 or TM7 expire.

Figure 22:
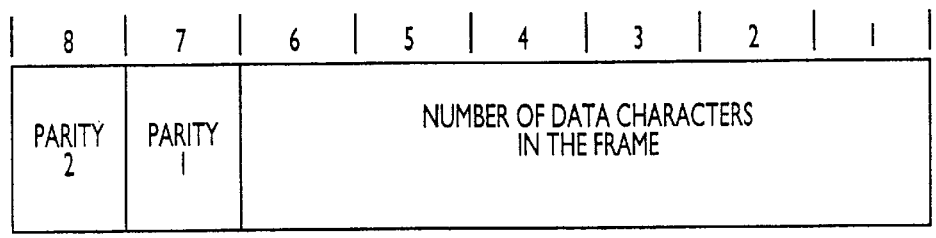
FIG. 22 is a diagram of a data field format.

The data field portion of the data call is used to transport asynchronous data characters as shown in FIG. 22. Each data character byte shall consist of either a 7-bit data character representation with a parity bit or an 8-bit character representation. All data characters are transmitted least significant bit first. If a 7-bit data character representation with a parity bits used, the least significant bit shall contain the parity bit. If a 7-bit data character representation without a variety bits used, the least significant bit contains a 0 bit. Valid data characters are transported in the first L data character bytes of the frame, where L is the value of the length parameter contained in the length indicator bytes. All other data character bytes preferably contain a 10101010 pattern.

Figure 23:
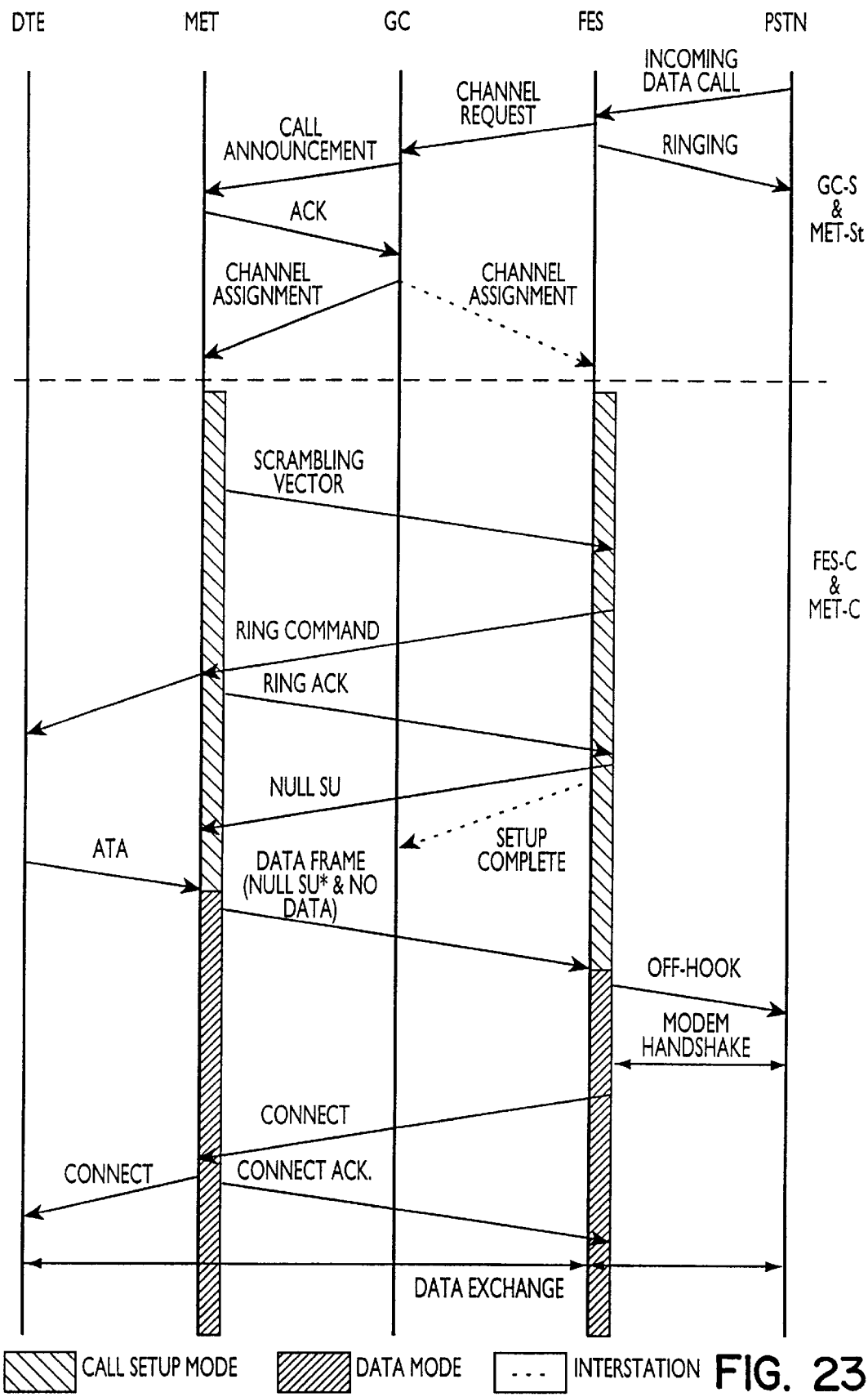
FIG. 23 is a diagram of a call setup sequence between the PSTN and MET.
Figure 24:
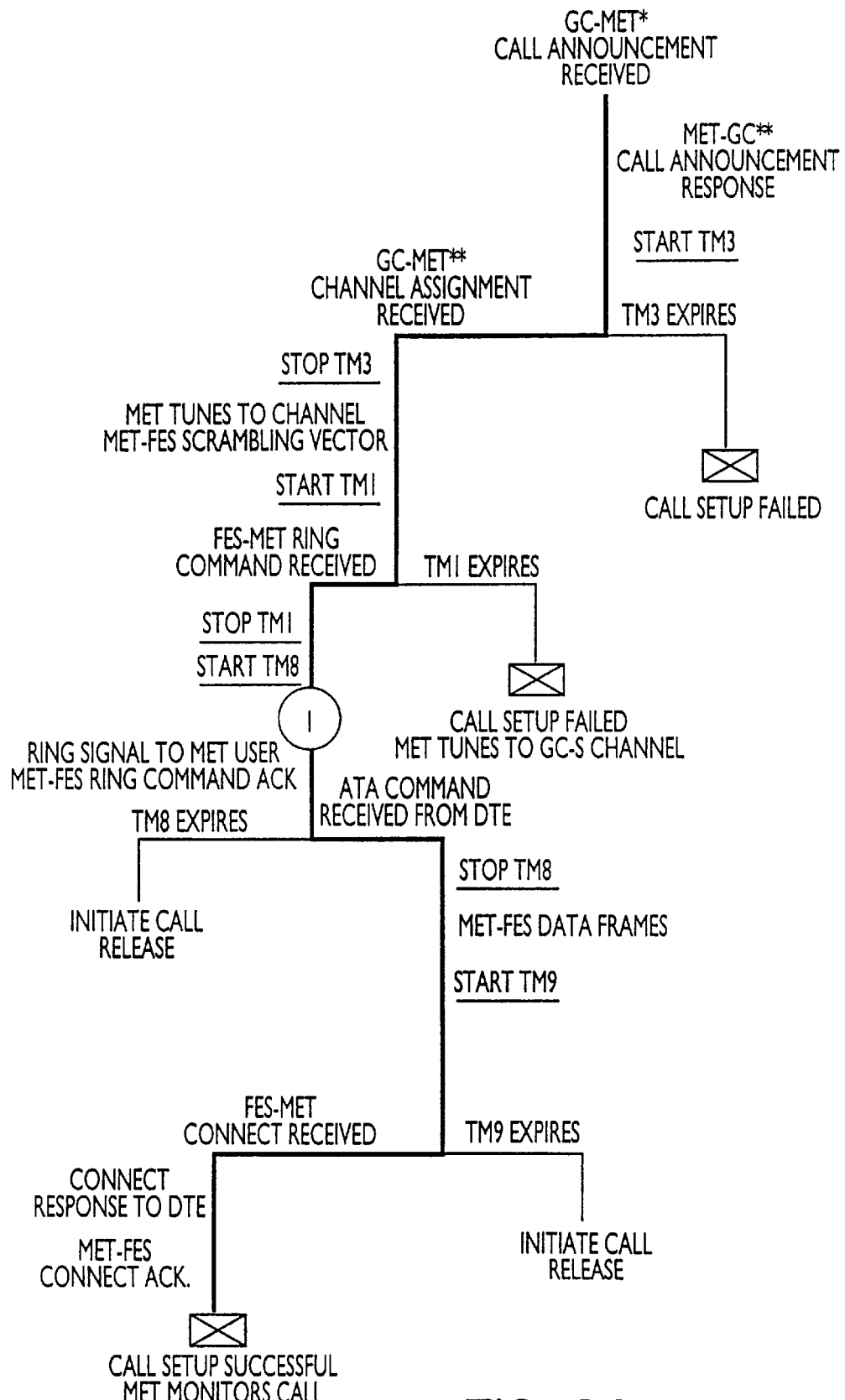
FIG. 24 is an event tree diagram of a call setup sequence between the PSTN and MET.

The format of the length indicator bytes shall be as shown in FIG. 23. The length indicator bytes each contain a 6 bit length parameter that indicates the number of valid data character in the total frame. In addition the length indicator byte contains 2 parity bits used for error detection. The order of transmission of the bits in the length indicator byte is also as indicated in FIG. 24.

For PSTN-originated data calls, channel assignment is as specified for PSTN originated voice calls. The GC will determine that the call is a data call and will indicate this in the call type field of the call announcement and MET channel assignment.

Upon reception of the MET channel assignment SU the MET transmits a scrambling vector SU to the FES via the MET-C channel. This message is continuously repeated until a response is received from the FES. If no response is received after 5 seconds the MET ceases transmission and signal call failure to the user. Upon successful reception of the scrambling vector SUs, the FES will compare the access security check fields received from the GC and the MET and will initiate call release if the fields are not identical. If the access security check fields are identical, the FES will begin transmitting the ring command SU to the MET. Upon reception of the ring command SU from the FES, the MET signals the MET user either by generating an audible ringing sound or by sending a RING response to the DTE, sets Tm8 to 12 seconds and also transmits the ring command acknowledgment SU until the ATA command is issued by the MET DTE, or upon expiration of timer Tm8. Upon receiving the ring command acknowledgment from the MET, the FES will transmit a call setup complete SU to the GC to notify it that the channel has successfully been established, and will begin transmitting null signal units to the MET. If timer TM8 expires, the MET initiates a call release.

When the MET DTE issues the ATA command the MET switches to the data frame mode, stop Tm8, and set timer Tm9 to 20 seconds. Upon detection of the MET switching to data frame mode, the FES will switch to data frame mode and will signal off-hook to the PSTN. The FES will then complete the modem bit rate selection and handshake procedures with the PSTN user modem based on CCITT Recommendation V.22bis. Upon completion of the modem bit rate selection and handshake procedures, the FES will begin continuously transmitting a connect SU to the MET. The FES continues sending the connect SU until a connect acknowledge SU is received from the MET. Upon receiving the connect acknowledge SU, the FES ceases transmitting connect SUs.

Upon receiving the connect SU from the FES, the MET stops timer Tm9 and sends the connect acknowledge SU to the FES. The MET ceases transmitting connect acknowledgement SUs within 2 seconds of the time at which receipt of connect SUs ceases. If timer Tm9 expires, the MET initiates a call release.

Met Facsimile Call

Figure 25:
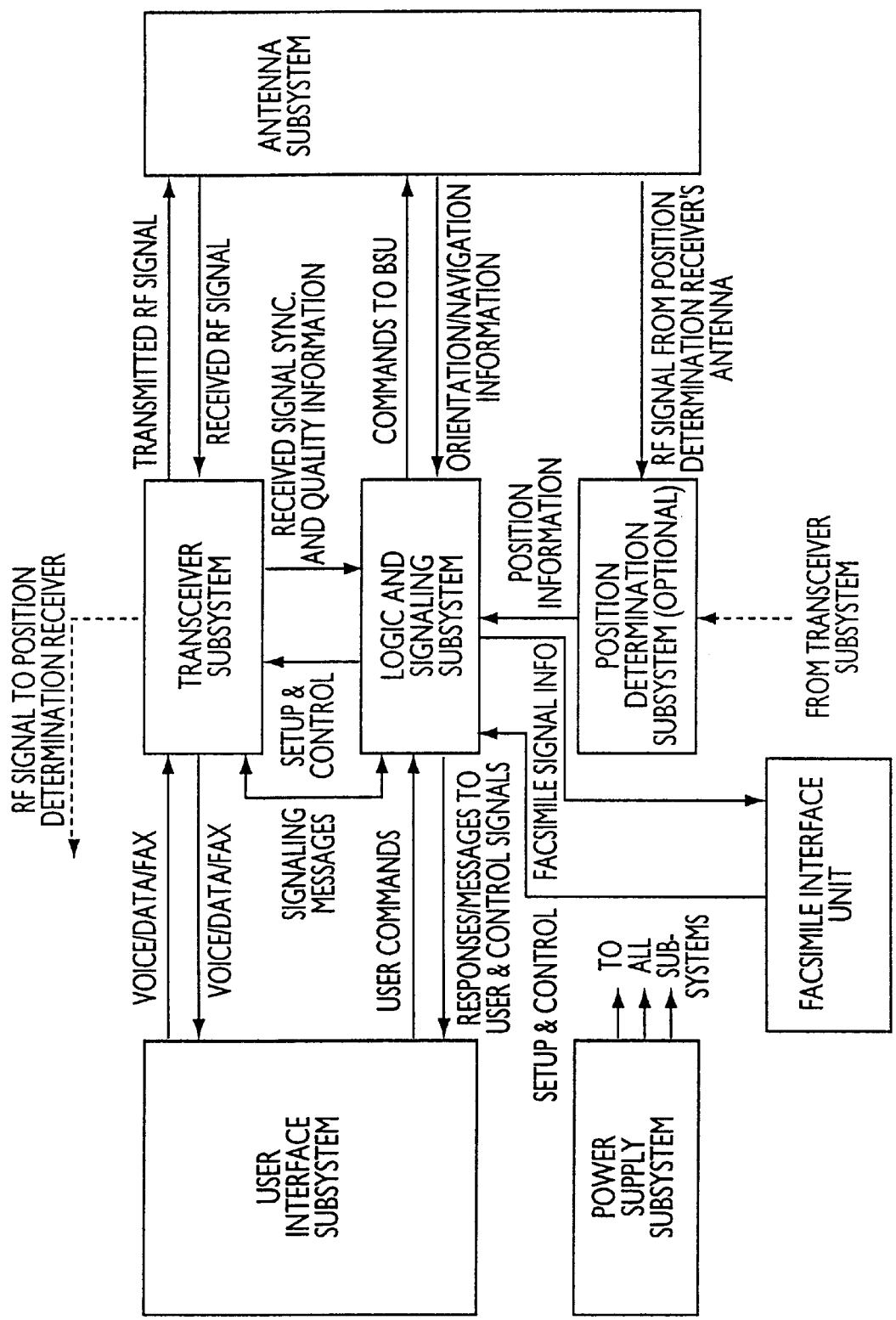
FIG. 25 is a basic block diagram of the functions of the mobile earth terminal including the facsimile interface unit functions.

FIG. 25 is a basic block diagram of the functions of the mobile earth terminal including the facsimile interface unit functions. Facsimile interface units (FIU) are installed in the Feeder Link Earth Stations (FES) and in the MET which communicate with each other by a digital communications channel established in the facsimile data mode. These units enable a terrestrial user's CCITT Group 3 facsimile terminal equipment (FTE) to be interconnected with a MET user's CCITT Group 3 FTE (or between two MET users) via the digital satellite system.

The FIUs perform two basic functions. First, they demodulate the facsimile voiceband signals in the FTE-to-satellite direction (and remodulate the baseband digital signals in the satellite-to-FTE direction). Second, they perform protocol conversions so that the facsimile protocols become compatible with the transport channel constrains of the basic service configuration. To perform these functions, the FIUs consist of several standard elements including Telephone Tone Generators and Detectors; a CCITT V.21 Modulator and Demodulator; and Control Logic for baseband message formatting, facsimile process control, facsimile protocol conversation, call establishment, call control, and call clearing.

The physical interface is preferably characterized using an RJ-11 connector, a 600 ohms signal impedance, a Line Supervision (Detection of Off-Hook and On-Hook), a Minus 24 volt, 30 ma nominal DC source for loop (supervisory) current. The interface preferably provides ringing voltage of 86 Vrms and support up to 5 ring loads, or provides a source over the linear range from 64 Vrms at 50 ms down to a minimum of 40 Vrms at 100 ma. The required generated signaling tones are:

| | |
|---|---|
| Congestion | [480 + 620 Hz (0.25 sec's on and 0.25 sec's off)] |
| Busy | [480 + 620 Hz (0.5 sec's on and 0.5 sec's off)] |
| Ring-back | [440 + 480 Hz (1 sec on and 1 sec off)] |
| Dial | [Reference CCITT E.180:350 + 440 Hz (continuous) - 10 Dbm0 nominally] |

Figure 26:
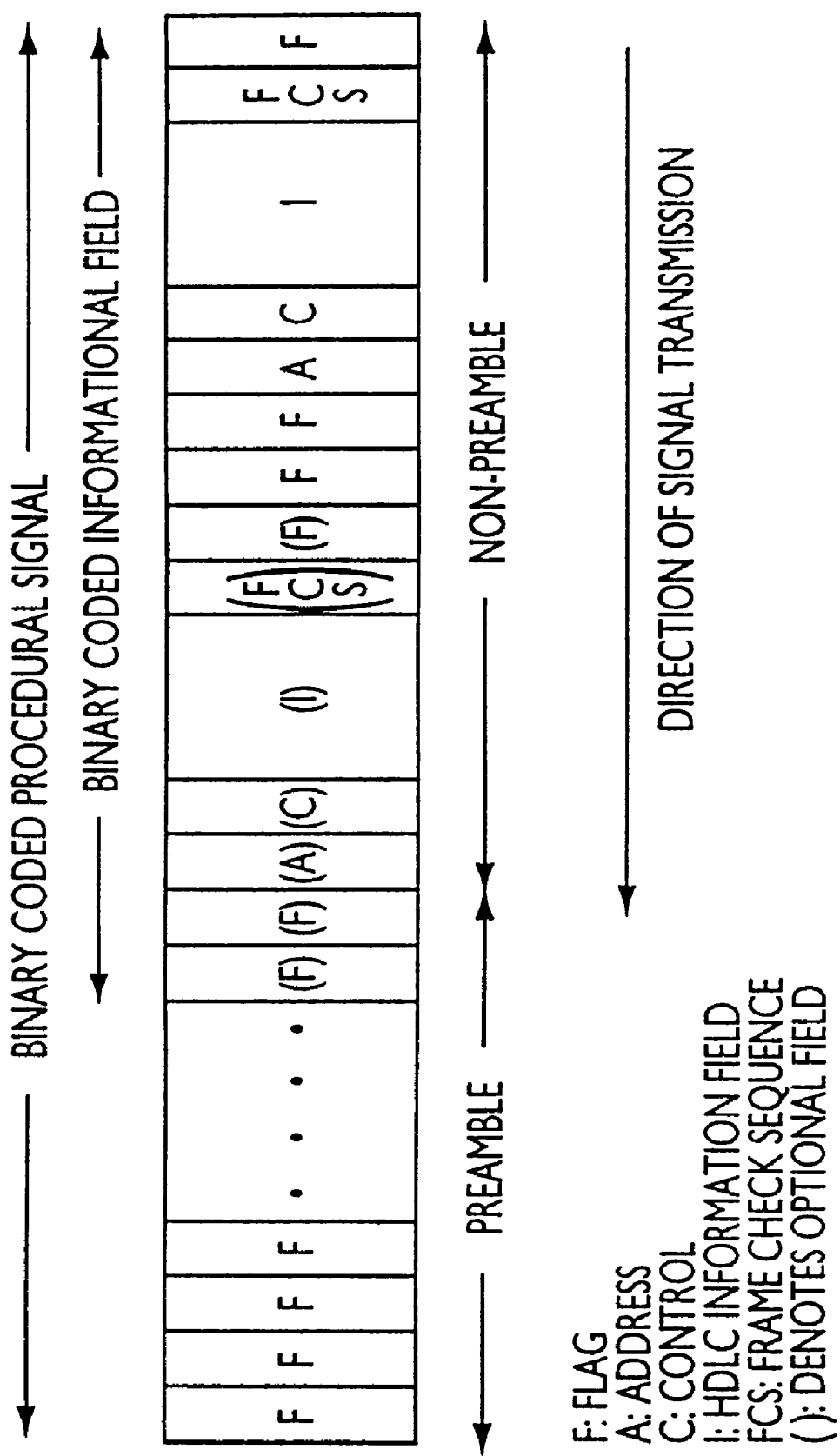
FIG. 26 is a diagram of a binary coded procedural signal.

The FIUs transmit and receive digital signals to an from the satellite 2.4 kbit/ss Data channel in blocks of 288 bits as shown in FIG. 26, which illustrates the sub-field structure of the data channel. In addition, the FIU internally partitions each of the 288-bit data-field into 36, 8-bit data cells. The Digital Facsimile Protocol provides line-state indication by means of the following messages, carried as "line control packets", which are transmitted at full rate (i.e., 2.4 kbit/s) over the data channel. The coding is described below:

| Code | Line state |
|---|---|
| 0001 | Idle |
| 0010 | CED Connection |
| 0100 | Spare |
| 0111 | Binary Coded Signal Connection |
| 1000 | FIU Capabilities Control Packet |
| 1011 | Synchronizing Signal Connection |
| 1101 | Preamble Connection |
| 1110 | Message Connection |

The coding is associated with the voiceband signal states as shown below:

| Indication | Line State |
| --- | --- |
| Idle | No signal on the telephone circuit |
| CED Connection | 2100 Hz Called Station Identification (CED) signal on the telephone circuit |
| Binary Coded Sig. Connection | 300 bit/s (non-permeable) binary coded procedural signal on the telephone circuit |
| Synch. Signal Connection | Modem synchronizing (or training signal on telephone circuit) |
| Preamble Connection | 300 bit/s binary coded preamble signal on the telephone circuit |
| Message Connection | Facsimile message on the telephone circuit |

The special line state "FIU Capabilities Control Packet" is not associated with an analog line state but with in-band signaling between FIUs.

Line control packets are generated whenever a line state transition occurs, and generally always precede the transmission of information (associated with the new line state) over the digital channel. The indication in the line control packet applies to all associated 8-bit data cells of the satellite channel that immediately follow it until a new line control packet is generated. Hence, these line control packets are used a headers of new information. All non-preamble signals of the 300 bit/s binary coded procedural signalling, which are specified in CCITT Recommendation T.30, are transferred to the re-modulating (distant) FIU in the form of a demodulated baseband digital data stream. A re-modulating (or modulating) FIU is defined as the FIU which is receiving data from the satellite channel for modulation and transmission to the customer FTE. A demodulating FIU is defined as the FIU which is receiving data from the customer FTE for demodulation and transmission to the satellite channel. During a call, an FIU will perform both modulating and demodulating functions, as the signal direction between the end-customer FTEs will change several times.

The facsimile message signal (including the TCF signal) is also transferred to the re-modulating FIU in the form of a demodulated digital data stream. Reception of the modem synchronizing signal on the telephone circuit is indicated by the demodulating FIU to the re-modulating FTU by transmitting the "Synchronizing Signal Connection" line control packet. The FIU at the modulating end generates a modem synchronizing signal according to this indication. Detection of the CED signal on the telephone circuit is indicated by the demodulating FIU to the re-modulating FIU by transmitting the "CED Connection" line control packet. (The actual CED signal cannot be transferred to the re-modulating FIU since it is not digital by nature.)

The tonal signalling procedures defined in CCITT Recommendation T.30 are not generally accommodated by the Digital Facsimile Protocol. The Group 3 procedures recommended by CCITT are generally supported by the FIU. Therefore, the FIU is not required to detect the use of tonal signalling procedures. Eventually a Group 1 or Group 2 FTE should clear the call on the analog circuit when it does not receive proper responses from the FIU.

Line control packets are generated whenever a line state transition occurs, and generally always precede the transmission of information (associated with the new line state) over the digital channel. Because these packets are transmitted in-band over the 2.4 kbit/s data channel, they are generated by the demodulating FIU in the FTE-to-satellite direction and removed by the remodulating FIU in the satellite-to-FTE direction. The first bit of the line control packet must be coincident with a data cell boundary. When generating line control packets these are constructed by utilization of 18 data calls as follows:

The first 9 data calls (72 bits) are comprised of nine repetitions of the "11111111" binary octet and are used as a line control preamble to indicated that the following 9 data cells contain line state transition information. The next 8 data cells (64 bits) are comprised of 16 repetitions of the appropriate 4-bit code for the new line state. The final data cell (8 bits) comprises the unique binary word "11000011" which is used to precisely align the user data associated with the new line state. The new line state indicated by a received line control packet does not become effective until the last bit of the line control packet has been received on the satellite channel. Consequently, since line control packets are 18 data cells long, a line control packet inserted into the satellite data stream effectively adds 60 ms to the length of the previous line state.

This is true for receipt of all line control packets except an "Idle" packet when it has been preceded by either a "Binary Coded Signal Connection" packet or a "Message Connection" packet. In either of those two cases, the "Idle" line control packet must be immediately processed (removed from the satellite data stream) when the first, rather than the last bit of the packet is received, thus avoiding a situation where 60 ms of invalid data would be modulated at either the V.21 or V.27ter mode. To accomplish this "early line control packet detection," the FIU must incorporate a look-ahead buffer between the satellite channel and the FIU software in which it can look ahead 60 ms into the received satellite data stream and identify a valid "Idle" line control packet while in the "Binary Coded Signal Connection" or "Message Connection" line state.

Since, in the special situations, the "Idle" line control packet is removed all at once (instead of removing it over the course of 18 data cell times), the look-ahead buffer will shrink in size as "Idle" line control packets are detected and removed. When the FIU switches from its "modulating" role to its "demodulating" role, the look-ahead buffer may be empty due to the removal of "Idle" line control packets. The buffer must already be filled with satellite data by the time an FIU switches from the "demodulating" role to the "modulating" role. This filling can take place when the FIU is likely to be receiving idle fill over the satellite when it is in the "demodulating" role.

Furthermore, the look-ahead buffer must accommodate two line control packets since, at most, there will be two transitions from "Binary Coded Signal Connection" or "Message Connection" line state to "Idle" line state during a single line turnaround of the half-duplex T.30 facsimile protocol. That is, the buffer must be about 288 bits in size. This will add, at most, 120 ms to the overall delay through the FIU.

The facsimile interface unit (FIU) interworks with a user's CCITT Group 3 facsimile terminal equipment (FTE) through a telephone circuits in accordance with CCITT Recommendation T.30, and with the FIU at the distant end through the satellite channel in accordance with the Digital Facsimile Protocol. To accomplish this, the FIU shall comprise the following standard circuit elements:

CCITT Recommend. V.27 ter [R-27] voice-band data modem;
CCITT Recommendation V.21 [R-28] voice-band data modem;
2100 Hz tone generator and detractor;
1100 Hz interrupted tone generator and detector;
processor/controller; and elastic buffer, multiplexer/demultiplexer, and interface with the satellite channel unit.

After the FIUs have been switched-in by the FES or the MET in a remote-originated mode (FTE at the opposite FIU has originated the call), the FIU generates the CNG signal (a 1100 Hz interrupted tone) and transmits it to the called user. The CNG signal is terminated following the detection of either the CED signal or a 300 bit/s binary coded procedural signal on the incoming telephone circuit in accordance with the procedures defined in CCITT Recommendation V.25 [R-29]. The characteristics of the CNG signal comply with the relevant requirements specified in CCITT Recommendation T.30.

The called FTE may transmit the CED signal following the connection of the telephone circuit at the called end. The called FIU shall detect the onset and termination of the CED signal on the telephone circuit and shall inform the calling FIU of this e vent by inserting the "CED Connection" line control packet in the satellite channel. The CED signal detector response threshold and times shall be in accordance to CCITT Recommendations T.4, T.30, and V.25 [R.29]. The insertion of the "CED Connection" line control packet in the data channel occurs in the first data-cell to be transmitted after the CED detector output has changed from OFF to ON.

The "CED Connection" line state is changed to "Idle" by transmissions of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). It is the responsibility of the FIU to be aware of the (possibly different) on-to-off and off-to-on signal detect times for CED and V.21 Preamble and adjust the generated satellite line control packets accordingly so as to insure a 75±20 ms idle time between different signals.

The called FTE transmits the CED signal following the connection of the telephone circuit at the called end. The called FIU detects the onset and termination of the CED signal on the telephone circuit and informs the calling FIU of this event by inserting the "CED Connection" line control packet in the satellite channel. The CED signal detector response threshold and times are in accordance to CCITT Recommendations T.4, T.30, and V.25 [R-29]. The insertion of the "CED Connection" line control packet in the data channel occurs in the first data-cell to be transmitted after the CED detector output has changed from OFF to ON.

The "CED Connection" line state shall be changed to "Idle" by transmission of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). The FIU detects the (possibly different) on-to-off and off-to-on signal detect times for CED and V.21 Preamble and adjusts the generated satellite line control packets accordingly so as to insure a 75±20 ms idle time between different signals.

A CED signal is generated by the called FTE after the telephone circuit has been connected between the called FIU and the called FTE. The onset and termination of the CED signal on the telephone circuit are detected by the called (demodulating) FIU and signalled to the calling (re-modulating) FIU by means of line control packets. The calling FIU shall generate a CED signal (2100 Hz tone) and shall transmit it to the calling FTE when the line control packet indicates "CED Connection". The OFF-to-ON instruction to the tone generator shall occur only after the entire "CED Connection" line control packet has been received.

The ON-to-OFF instruction to the tone generator occurs when a new line control packet has been detected by the called FIU. Ideally, the "Idle" line control packet will be received following the "CED Connection" packet, but errors on the satellite channel may corrupt the "Idle" packet so that the "Preamble Connection" packet may be the next one detected. The characteristics of the generated 2100 Hz tone shall comply with the relevant requirements for the CED signal specified in CCITT Recommendations T.30, T.4, and V.25.

The FIU receives and demodulates the binary coded procedural signals which are defined in CCITT Recommendation T.30 and which appear on the incoming telephone circuit. The binary coded procedural signals (except the TCF signal) are modulated at 300 bit/s in accordance with the CCITT Recommendation V.21 modulation system and are preceded by the preamble (sequence of repeated flags) specified in CCITT Recommendation T.30. The TCF signal is modulated at 2.4 kbit/s in accordance with CCITT Recommendation V.27 ter and is preceded by the modem synchronizing signal. The data is transmitted over the satellite channel in the same order as received over the telephone circuit (i.e., the first bit received over the telephone circuit by the demodulating FIU is the first bit to be sent over the satellite channel to the re-modulating FIU).

Figure 27:
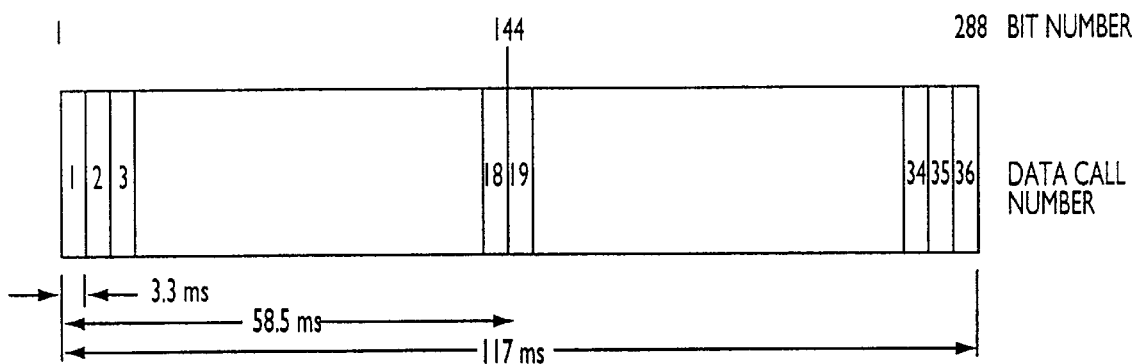
FIG. 27 is a diagram of a data field format at 2400 bit/s.

The non-preamble portion of the V.21 modulated 300 bit/s binary coded procedural signal is defined as the portion of this signal which begins with the first non-Flag octet and ends with the last Flag received after the last HDLC frame. The preamble portion of the 300 bit/s binary coded procedural signal is defined as the portion of the V.21 modulated signal which begins with the first Flag and ends with the last Flag preceding the non-preamble portion (i.e. ends with the Flag preceding the first non-Flag octet of the binary coded information field). This definition is illustrated in FIG. 27.

The demodulated data stream of the non-preamble portion of the 300 bit/s binary coded procedural signal is transmitted to the re-modulating FIU regardless of the error state of the signal. The binary coded Address, Control, and HDLC information fields of the demodulated data (with the exception of the NEF, DIS, and DTC signals) are not generally manipulated by the demodulation process and the FCS field indicates an error condition, the regenerated FCS sequence must be such that it will result in an error condition being detected by the distant FTE, assuming subsequent error-free transmission. Transmission of the data shall be immediately preceded by the transmission of the "Binary Coded Signal Connection" line control packet.

When the demodulating FIU manipulates the DIS, DTC and DCS signals in the manner described in the preceding paragraphs, a new Frame Checking Sequence (FCS) must be computed. However, if the original (prior to manipulation)

signal indicates an FCS error, the sequence computed must be such that it will result in an error condition being detected by the distant FTE assuming subsequent error-free transmission. The demodulated, non-preamble data stream of the 300 bit/s signal is transmitted to the re-modulating FIU over the satellite channel, preceded by the "Binary Coded Sequence Connection" line control packet. The line control packet is delayed by the same amount as that introduced in the preamble in paragraph 10 above and is further aligned to make the first bit of the line control packet coincident with the first bit of a data cell. When reception of the 300 bit/s signal ceases, an "Idle" line control packet shall be inserted in the satellite channel starting at the next available data cell. The response time for the Synchronizing/TCF signal detection is in accordance to CCITT Recommendations T.4, and V.27ter.

The onset of the synchronizing portion of the synchronizing/TCF signal is signalled to the distant FIU by transmitting the "Synchronizing Signal Connection" line control packet. The transmission of the "Synchronizing Signal Connection" line control packet, signifying the transition from the "Idle" to the "Synchronizing Signal Connection" line state, occurs in the first data cell of the satellite data channel after a period of 75±20 ms of idle activity has been transmitted over the satellite channel following the end of the previous (DCS) signal which was originally encoded according to the V.21 modulation scheme. That is, there must be at least one data cell between the "Idle" line control packet and the subsequent "Synchronizing Signal Connection" line control packet (since transmission of the "Synchronizing Signal Connection" packet contributes 60 ms to the length of the "Idle" line state. The FIU detects the (possibly different) on-to-off and off-to-on signal detect times for V.27 ter and V.21 and adjusts the generated satellite line control packets accordingly so as to insure a 75±20 ms idle time between different signals.

When the line control packet indicate "Synchronizing Signal Connection", the data stream sent to the distant FIU includes a binary all "zero" sequence irrespective of the demodulated sequence. The "Synchronizing Signal Connection" line state continues until local V.27ter modem training is complete and the first bit of TCF data is demodulated by the local V.27ter modem. The signal activity detector does not detect Segment 2 of the V.27ter training sequence ("No transmitted energy") as the end of the modem Turn-On sequence. Thus, the Synchronizing Signal Connection line state will apply for at least 225 ms (regardless of the signal activity detector output state).

The demodulated and unscrambled TCF signal (originally a series of binary "zeros") is transmitted to the re-modulating FIU over the satellite channel, preceded by transmitting the "Message Connection" line control packet. To compensate for the possibility that the demodulating V.27ter modem interprets the end of the modem Turn-On sequence as TCF data, the FIU insures that the first 6 data cells (48 bits) of the TCF data transmitted over the satellite consist of binary "zeros", no matter what was actually demodulated by the V.27ter modem. The "Message Connection" line control packet and subsequent TCF data is delayed by the same amount as that introduced to the "Synchronizing Signal Connection" line control packet defined in paragraph 17 above, and is further aligned to make the first bit of the line control packet coincident with the first bit of the data cell.

The end of the TCF signal is determined by the FIU, and the tail of the signal is discarded if the number of bits is insufficient to fill the data cell. An "Idle" line control packet shall then be transmitted to the distant FIU in the following data cell.

The re-modulating FIU receives the data stream for the 300 bit/s binary coded procedural signals or the TCF signals (preceded by the "Binary Coded Signal Connection" or "Message Connection" line control packet, respectively) which are transmitted over the satellite by the demodulating FIU. The re-modulating FIU generates the voice-band data signals for the non-preamble portions of the binary coded procedural signals based on the data stream and the relevant line control packet, and transmits them to the FTE on the outgoing telephone circuit. In generating the modulated signals, no manipulation of the data is performed by the re-modulating FIU. If a new Frame Checking Sequence (FCS) is regenerated, and the original signal indicates an FCS error, the sequence computed must be such that it will result in an error condition being detected by the FTE, assuming subsequent error-free transmission.

The modulation applied to the data which have been preceded by the "Binary Coded Signal Connection" line control packet are at 300 bit/s and in accordance with the CCITT Recommendation V.21 modulation system (as specified in CCITT Recommendation T.30). The entire data, after removal of the line control packet, are transmitted to the FTE. The transmission of the 300 bit/s modulated binary coded signal preamble commences immediately after reception of a valid "Preamble Connection" line control packet and continues for as long as no new line state transition in the form of a valid line control packet is received. The Demodulating FIU makes sure that there is at least a 75±20 ms gap between the "Preamble Connection" line state and the preceding line state. The re-modulating FIU must insure that the length of the "Idle" line state indicated on the satellite is correctly reproduced on the analog circuit. If, due to channel errors, the "Preamble Connection" line control packet was not preceded by an "Idle" packet, then the re-modulating FIU must insure that there is 75±20 ms of idle analog line state before the flag sequence begins.

The transmission of the non-preamble 300 bit/s modulated binary coded (non-preamble procedural signals is initiated following the recognition of a line state change from "Preamble Connection" to "Binary Coded Signal Connection" signalled by the reception of a valid "Binary Coded Signal Connection" line control packet from the satellite data channel. The transmission of the non-preamble portion of the 300 bit/s modulated binary coded procedural signals follow the termination of the preamble with no interruption of signal energy on the outgoing telephone circuit. Furthermore, in order to preserve the octet integrity of the preamble being transmitted the 300 bit/s modulated binary coded procedural signals may additionally be delayed by a period of up to 8 data cells.

The transmission of the non-preamble 300 bit/s modulated signals continues until a valid "Idle" line control packet is received from the satellite channel. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Binary Coded Signal Connection" analog line state. In generating the TCF signal, the modulation shall be in accordance with CCITT Recommendation V.27ter.

When the most recently received line control packet indicates "Synchronizing Signal Connection", a modem synchronizing signal (the long sequence with protection against talker echo as specified in CCITT Recommendation V.27 ter) shall be generated by the re-modulating FIU. Transmission of the modem synchronizing signal is initiated only after the line state change from "Idle" to "Synchronizing Signal Connection" has been detected by the reception of a valid "Synchronizing Signal Connection" line control packet. If the Synchronizing Signal has been preceded by a signal encoded according to the V.21 modulation scheme in the same direction of transmission(i.e. DCS), the demodulating FIU has made sure that the duration of the "Idle" line state between the last flag of the "DCS" message and the start of the "Synchronizing Signal Connection" line state is at least 75±20 ms. The re-modulating FIU must insure that the duration of this "Idle" line state is accurately reproduced on the analog circuit. If, due to channel errors, the "Synchronizing Signal Connection" line control packet was not preceded by an "Idle" packet, then the re-modulating FIU insures that there is 75±20 ms of idle analog line state before the flag sequence begins.

The synchronizing signal is followed, without an interruption of signal energy, by a signal modulated by the received TCF data (after removal of the "Message Connection" line control packet which will take an additional 60 ms). The received data is delayed as appropriate, to allow the first effective bit of data preceded by the "Message Connection" indication to coincide with the first bit which follows the synchronizing signal in the modulated signal. Ideally, the FIU will insure that data consisting of binary "zeros" is modulated in the event that v.27ter modem training completes before the "Message Connection" line control packet is received over the satellite. This situation could occur because of the tolerance allowed in V.27ter for the modem Turn-On sequence. Once the "Message Connection" line control packet is received, TCF data is modulated without modification by the FIU.

The TCF signal is almost immediately terminated upon reception of a valid "Idle" line control packet from the satellite channel. The FIU "looks ahead" in the received satellite data stream to identify the "Idle" line control packet as soon as its first bit has been received. The "Idle" line control packet, once so identified, will be almost immediately removed from the satellite data stream and will not contribute an additional 60 ms of time to the existing "Message Connection" analog line state.

The demodulating FIU receives and demodulates facsimile message signals modulated at 2400 bit/s using the CCITT Recommendation V.27 ter modulation system, as defined in CCITT Recommendation T.4. Each transmission of a message is preceded by the modem synchronizing signal specified in the CCITT V.27 ter. The onset of the synchronizing signal portion of the synchronizing facsimile message signal on the incoming telephone circuit is detected by the demodulating FIU and signalled to the re-modulating FIU by transmitting the "Synchronizing Signal Connection" line control packet over the satellite data channel in the first available data cell.

When CCITT V.27ter modem training has completed, the demodulating FIU inserts a "Message Connection" line control packet in the satellite data stream as soon as the first bit of valid demodulated data is available. Transmission of the demodulated data over the satellite is preferably in the same bit order as it was received on the analog circuit. The demodulated facsimile message is not generally manipulated in any way by the demodulating FIU. The tail of the facsimile message signal is detected by the demodulating FIU. The "Idle" line control packet is then transmitted to the re-modulating FIU. The "Idle" line control packet is transmitted to the re-modulating FIU in the data cell following the last bit of the last HDLC frame containing the last bit message data. If insufficient data is demodulated to fill a complete satellite data cell, it will be padded with binary "zeroes" in order reach a data cell boundary.

The re-modulating FIU receives the facsimile message data stream which is transmitted over the satellite channel by the demodulating FIU, preceded by a "Message Connection" line control packet. When the most recently received line control packet indicates "Synchronizing Signal Connection" the long modem synchronizing sequence with protection against talker echo specified in CCITT Recommendation V.27ter is generated by the re-modulating FIU. The re-modulating FIU generates a voice-band data signal for the facsimile message signal, based on the received data stream, and transmits it to the FTE using 2.5 kbit/s modulation in accordance with CCITT Recommendation V.27ter.

The synchronizing signal is followed, without an interruption of signal energy, by a signal modulated by the received data, which is introduced by the "Message Connection" line control packet. Modulation of this data may be delayed to allow the first bit of data to coincide with the first bit which follows the modem synchronizing signal. It may also happen that local modem V.27ter training takes less time than that experienced at the demodulating FIU, as indicated by the local V.27ter modem completing its synchronizing phase before the arrival of the "Message Connection" line control packet. In this case, the FIU insures that binary data consisting of all "ones" should be inserted in the modulated data stream as fill until the arrival of the "Message Connection" line control packet. Then, insertion of fill will cease and the relevant data cells received over the satellite will be modulated on the analog circuit starting with the next available bit position in the modulated data stream.

The Message signal is almost immediately terminated on completion of the last bit of data as indicated by receipt of the "Idle" line control packet. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Message Connection" analog line state.

The FIUs, in the course of performing the processing tasks (e.g. signal detection, elastic buffering, signal buffering, line control packet generation and "look ahead") may introduce additional delays along the signal path from one FTE to another. The total throughout delay introduced by each FIU is implementation dependent but must not be greater than 1 second end-to-end. That is, the sum of the delay through the originating FIU plus the delay through the destination FIU must not exceed this value in either direction of data flow. This figure includes delays associated with the modulator and demodulator, the FIU itself and the FIU-to-modem interface. It does not include satellite transmission delay or delay through the PSTN network.

Delays due to satellite transmission and PSTN transmission should not exceed 0.5 seconds. This may require the selection of low-delay PSTN connections at the FES. The total delay, therefore, between FTEs should not exceed 1.5 seconds in either direction of data flow.

When the FES detects that a facsimile call is in progress, it will "switch-in" the FES FIU and signal to it whether this is a fixed or mobile-originated call. When the FES FIU has been switched-in with a fixed-originated call, it may receive a CNG tone from the FTE but this is ignored. It may also eventually receive a V.21 message from the FTE containing a DCN frame in the event that the FTE times out while waiting for a message from the MET FTE. Primarily, the FES FIU will be awaiting a signal from the MET FTU.

When the FES FIU has been switched-in with a mobile-originated call, it will start generating CNG tone on the analog circuit to the FTE. It will also be prepared to detect either CED tone or the onset of V.21 preamble. In either case, it will cease generation of the CNG tone as soon as either of these two signals has been detected.

The FES will "switch-out" the FES FIU when it detects that the satellite or PSTN call has cleared. The FIU will immediately cease operations both on the satellite and analog connections. Since there maybe significant buffering of satellite or analog data both inside and outside the FIU, the FES will delay implementing the switch-out operation until it is certain that all buffered data has been delivered to the appropriate channel (and thus to either the MET or the analog FTE).

When the MET detects that a facsimile call is in progress, it will "switch-in" the MET FIU and signal to it whether this is a fixed or mobile-originated call. When the MET FIU has been switched-in with a mobile-originated call, it may receive a CNG tone from the FTE but this is ignored. It may also eventually receive a V.212 message from the FTE containing a DCN frame in the event that the FTE times out while waiting for a message from the FES FTE. Primarily the MET FIU will be awaiting a signal from the FES FIU. When the MET FIU has been switched-in with a fixed-originated call, it will start generating CNG tone on the analog circuit to the FTE. It will also be prepared to detect either CED tone or the onset of V.21 preamble. In either case, it will cease generation of the CNG tone as soon as either of these two signals has been detected.

In accordance with the fraud detection and user validation system for a mobile communication system, the components of the satellite communication system perform the following functions described below.

For the basic fraud detection and user validation system, the following process is implemented. A MET authenticates its identity upon each commissioning event, performance verification event, and call setup event. The authentication process is based upon the use of an encryption function and a MET Access Security Key (ASK) to form an authorization code (the Access Security Check Field) from a random variable (the MET transmit and receive frequency assignments) at the beginning of each event.

Figure 28:
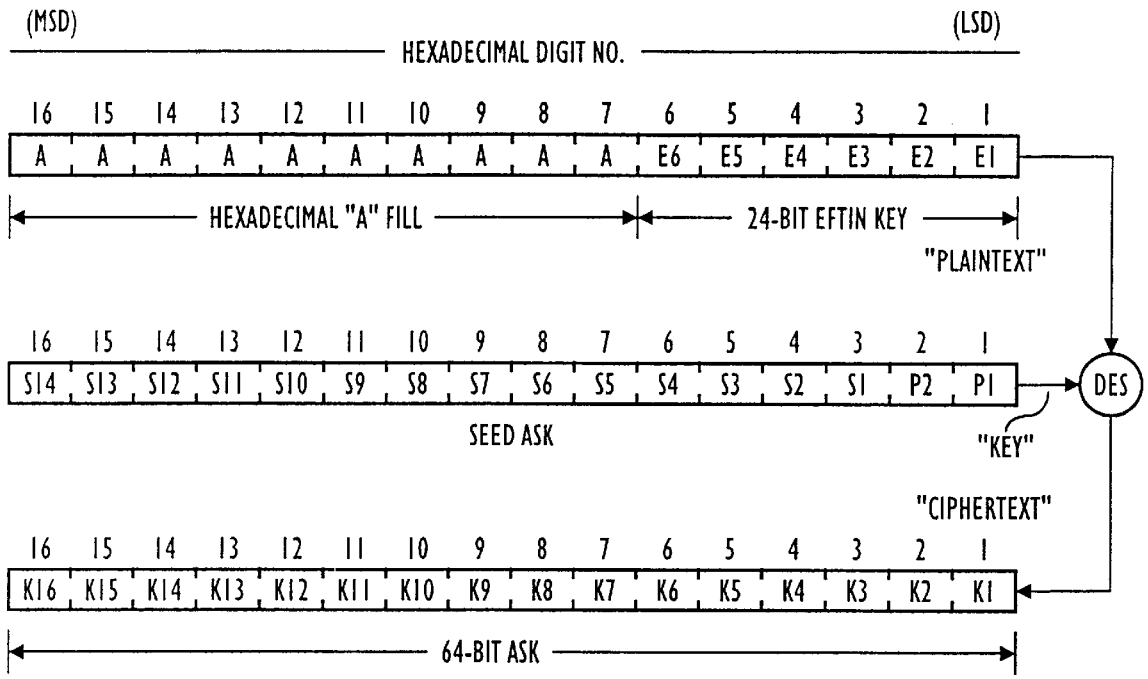
FIG. 28 is a diagram of the Authentication Security Key generation process.

The encryption algorithm is preferably the Data Encryption Standard (DES) defined by ANSI X3.92-1981/R1987, used in the Electronic Codebook Mode (ECB) and is built into both the MET and the NCC. The ASK for each MET is generated by the MSS system operator. FIG. 28 illustrates the ASK generation process using a Seed ASK (SASK) provided by the MSS system operator, and a random number (EFTIN). The CRC-8 parity check algorithm is used to protect the integrity of the ASK. The parity check is generated over all of the hexadecimal digits comprising the ASK. The NOC provides a logically separate master database for the METID numbers (the MET electronic serial numbers) and the MET ASKs. The NCCs maintain slave ASK databases, and also provide protection from access by NCC processing functions other than the legitimate authorization processes.

The MET SASK is supplied to the MET user prior to commissioning. The MET provides a "user friendly" means, using alphanumeric prompted, audible tones, and key strokes, for the user to enter the SASK into the MET and verify its correctness. The MET verifies the correctness of the SASK via the CRC-B parity check. The MET uses the process detailed in FIG. 28 to generate the ASK from the inputted SASK. The MET stores the ASK in NVRAM. There is no means provided to read out or display the ASK once it is entered. Any attempted access to the ASK will preferably render the MET inoperable. It is possible, however, to enter or reenter the SASK at will.

Figure 29:
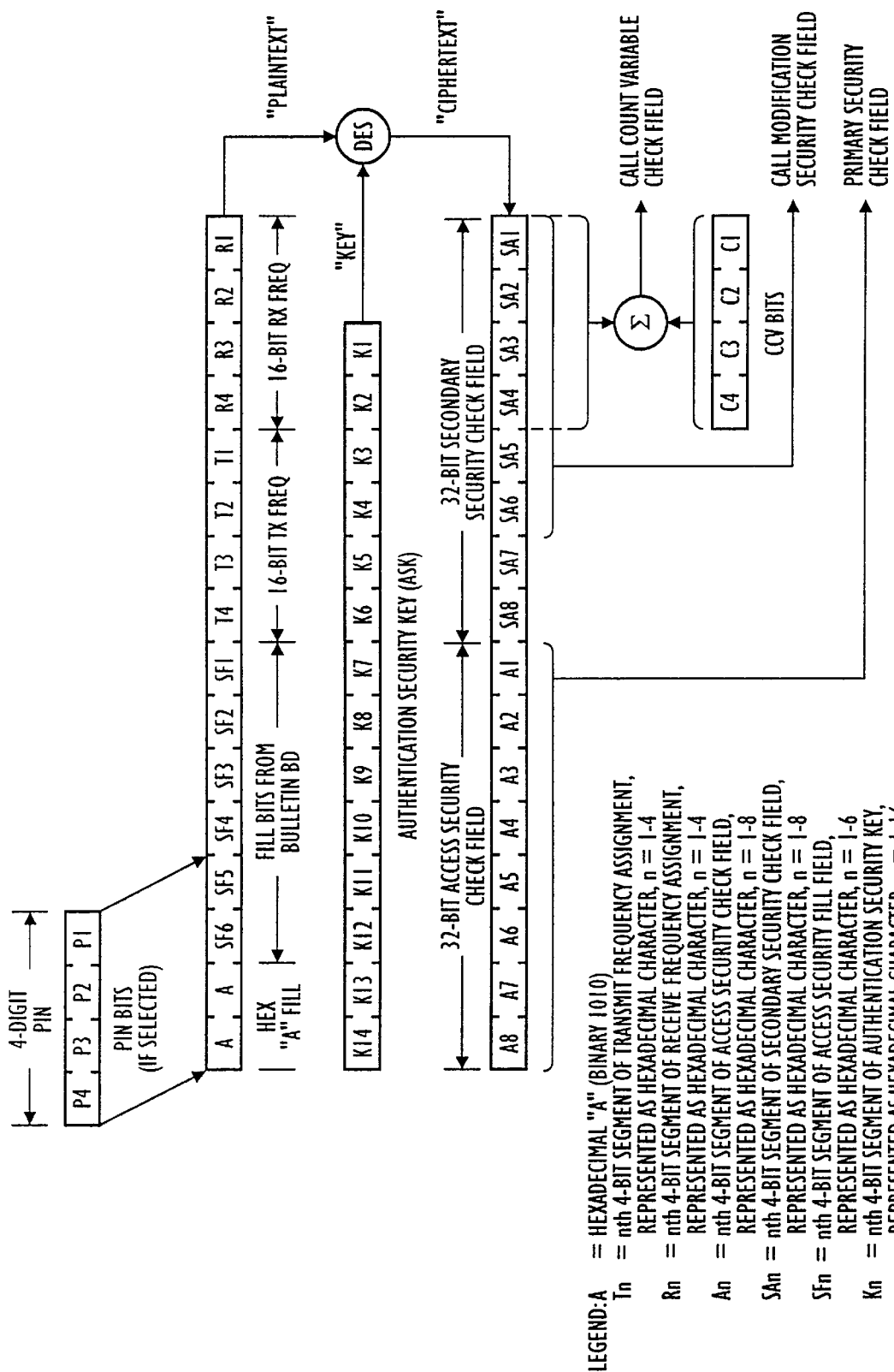
FIG. 29 is a diagram of the Access Security Check Field and Secondary Security Check Field generation process.

For either MET originated or terrestrial network originated calls, the NCC compute a 64-bit cipher text block by using the ASK stored in its secure database and the DES algorithm in the ECB mode to encode a 64-bit input variable comprised of the 16-bit receive frequency assignment in the least significant bit positions, the 16-bit transmit frequency assignment in the next least significant positions, the 24 Access Security Fill Bits, and the 8 most significant positions filled with the hexadecimal "A"(1010) characters. The most significant 32 bits of the resulting cipher text block are designated the Access Security Check Field (ASCF). The least significant 32 bits are designated the Secondary Security Check Field (SSCF). The Access Security Check Field and the Secondary Security Check Field generation process is depicted in FIG. 29. The Access Security Check Field is transmitted from the GC to the terminating FES in the SU.

The MET independently generates the Access Security Check Field using an identical process to encode the transmit and receive frequency assignments received in the MET Channel Assignment SU received from the NCC. Following the establishment of the MET-FES communication link, the MET transmits the Access Security Check Field to the FES in the scrambling Vector SU.

The FES compares the MET and NCC generated Access Security Check Fields on a bit-by-bit basis. If the values are identical, the MET is declared authenticated, and the call setup is completed normally. If the values are not identical, the MET identity is declared non-authenticated, and the FES terminates the call process. The FES sends a channel release message to the NCC, as well as the call record, with authentication failure indicated as the call clearing reason.

During commissioning or PVT, the MET generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not compare, the MET identity is declared non-authenticated, and the NCC terminates the process, declare PVT failure, and sends an authentication failure alert message to the NOC.

A "clear mode" is provided to facilitate system troubleshooting on an individual MET basis. This mode is invoked at the NCC (with suitable password control), and causes the authentication system to accept and complete all calls for the specific MET, with or without a valid Access Security Check Field.

An "override mode" is provided that permits system operation without authentication, in case of failure or other problems. This mode is invoked at the NCC through operation of a hardware or software switch, with suitable protection (i.e., physical key, password).

The "Authentication Subsystems" at the NOC (which maintains the master MET ASK database), and at the NCC (which maintains the slave MET ASK database and generates the Access Security Check Field) are preferably both logically and physically separated from other NOC and NCC processors, and provide both physical and password security to prevent unauthorized access to the MET ASK databases. The NCC processors access the NCC Authentication Subsystem with the MET ID and the transmit and receive frequency assignments, and the NCC Authorization Subsystem returns only the MET ID and the Access Security Check Field.

A MET generally authenticates its identity upon each commissioning event, performance verification event, and call setup event. The authentication process is based upon the use of an encryption function and MET Access Security Key (ASK) to form an authorization code (the Access Security Check Field) from a random variable (the MET transmit and receive frequency assignments) at the beginning of each event.

The encryption algorithm is preferably the Data Encryption Standard (DES) defined by ANSI X3.92-1981/R1987, used in the Electronic Codebook Mode (ECB), and is built into both the MET and the NCC. DES is well known, well documented, and is in the public domain. Its performance is also well known, and is generally approved for U.S. Government application. The algorithm is defined in Federal Information processing Standard (FIPS) Publication 46-1, Jan. 15, 1977, Reaffirmed Jan. 22, 1988 (Approved as American National Standard X3.92-1981/R1987), incorporated herein by reference. While a purely software implementation of DES would require significant processing power for a continuous stream encryption, we have discovered that for the MET, only the generation of a single "codeword" is needed. Thus, for the MET system, the software implementation is feasible and not processing intensive. Additional discussion of the DES algorithm can be found in the following references, all of which are incorporated by reference herein: Federal Information Processing Standards Publication 74, Apr. 1, 1981; Federal Information Processing Standards Publication 81, Dec. 2, 1981; Robert V. Meushaw, "The Standard Data Encryption Algorithm, Part 1: An Overview", BYTE Magazine, March 1979; and "The Standard Data Encryption Algorithm, Part 2: Implementing the Algorithm", BYTE Magazine, April 1979.

The following relates to an enhanced or more detailed version of the fraud detection and user validation process. The ASK for each MET is independently generated at both the MET and the NOC/NCC using the DES algorithm. The inputs to the generation process is a Seed ASK (SASK) provided by the MSS system operator, and a random number (EFTIN KEY) generated by the MET at the time of commissioning and used to encrypt the FTIN. The SASK for each MET will be generated by the CMIS at the time of MET registration. As indicated above, FIG. 28 illustrates the ASK generation process using the SASK and EFTIN variables. A standard CRC-8 parity check algorithm will be used to protect the integrity of the SASK. The parity check is generated over all of the hexadecimal digits and incorporated into the SASK.

The NMS provides the processing capability necessary to generate the SASK and any needed parity check. Note that inclusion of the parity check bits as part of the SASK yields a 64 bit binary word which is the length of key required by the DES. The SASK parity check sequence is generated by the polynomial $G(X)=X^8+X^7+X^4+X^3+X+1$. The input to the parity checker is the information portion of the SASK. The SASK is supplied to the MET subscriber prior to commissioning. The key distribution scheme is not a requirement of this specification. The MET provides a "user friendly" means, using alphanumeric prompts, audible tones, and key strokes, for the user to enter the SASK into the MET. The MET verifies the correctness of the SASK as described below. If the SASK is incorrect, the user is prompted to enter the SASK again. The MET does not enter the "Ready for Commissioning" state prior to entry of a valid SASK.

At the time of commissioning, the MET uses the DES algorithm in the ECB mode to generate the "active" ASK. The EFTIN KEY is extended to additional bits by filling the leading positions and is used as the plain text input to the algorithm. The SASK is used as the key. The resulting cipher text block is from the ASK. The forms of the elements used in the key generation process are shown in FIG. 28. It is impossible for the MET to initiate recommissioning either with or without reentry of the SASK. Importantly, the CGS can selectively command at will a MET that has been detected as potentially fraudulent to reinitiate the commissioning process, thereby creating a new ASK and CCV. Therefore, if a fraudulent MET has gained access to CGS, the CGS can selectively "remove" the fraudulent MET upon detection. The MET stores the SASK and the ASK in NVRAM. There is no means provided to read out or display either the SASK, or the ASK once it is generated and stored.

Figure 30A:
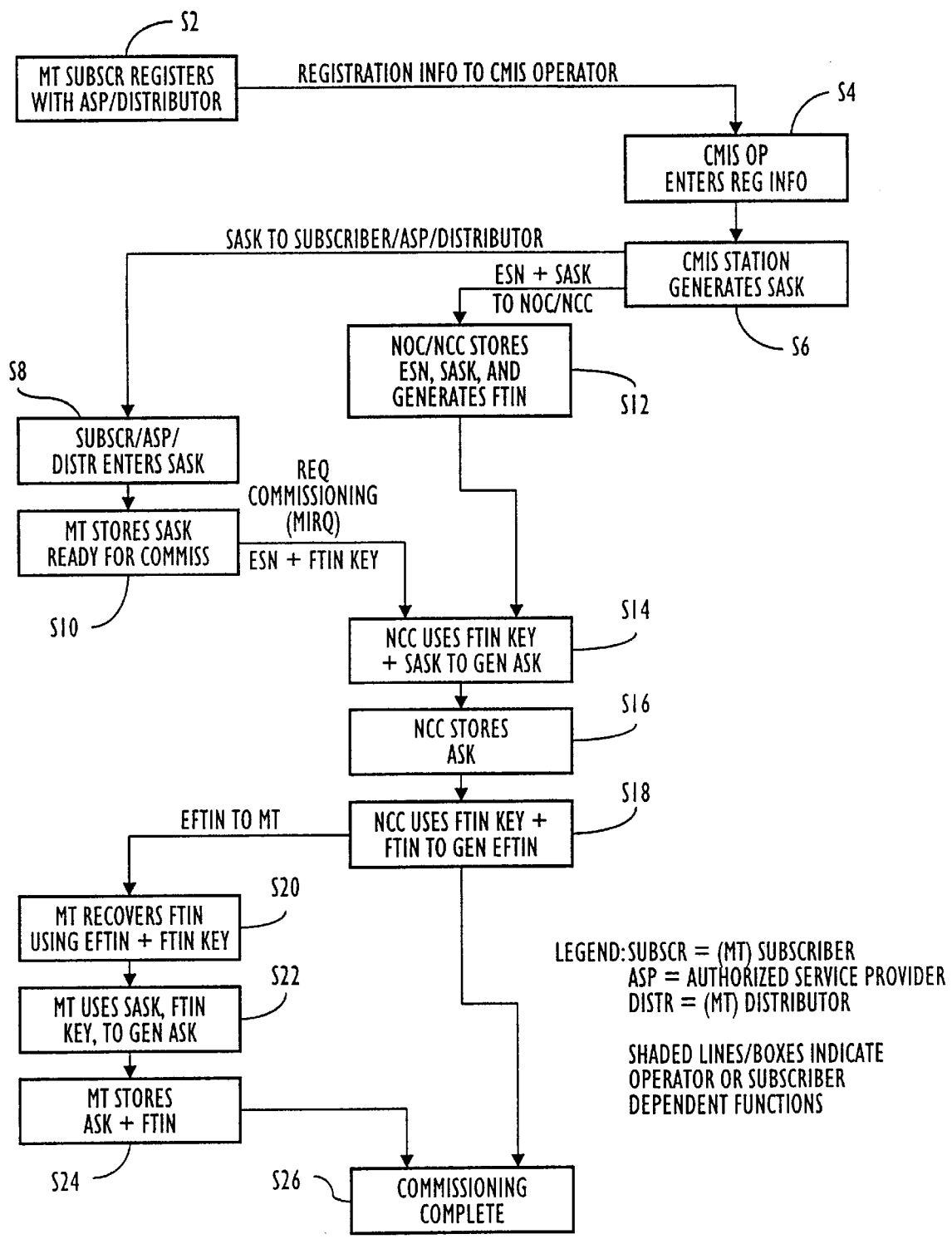
FIG. 30a is a flow chart of the keying process.
Figure 30B:
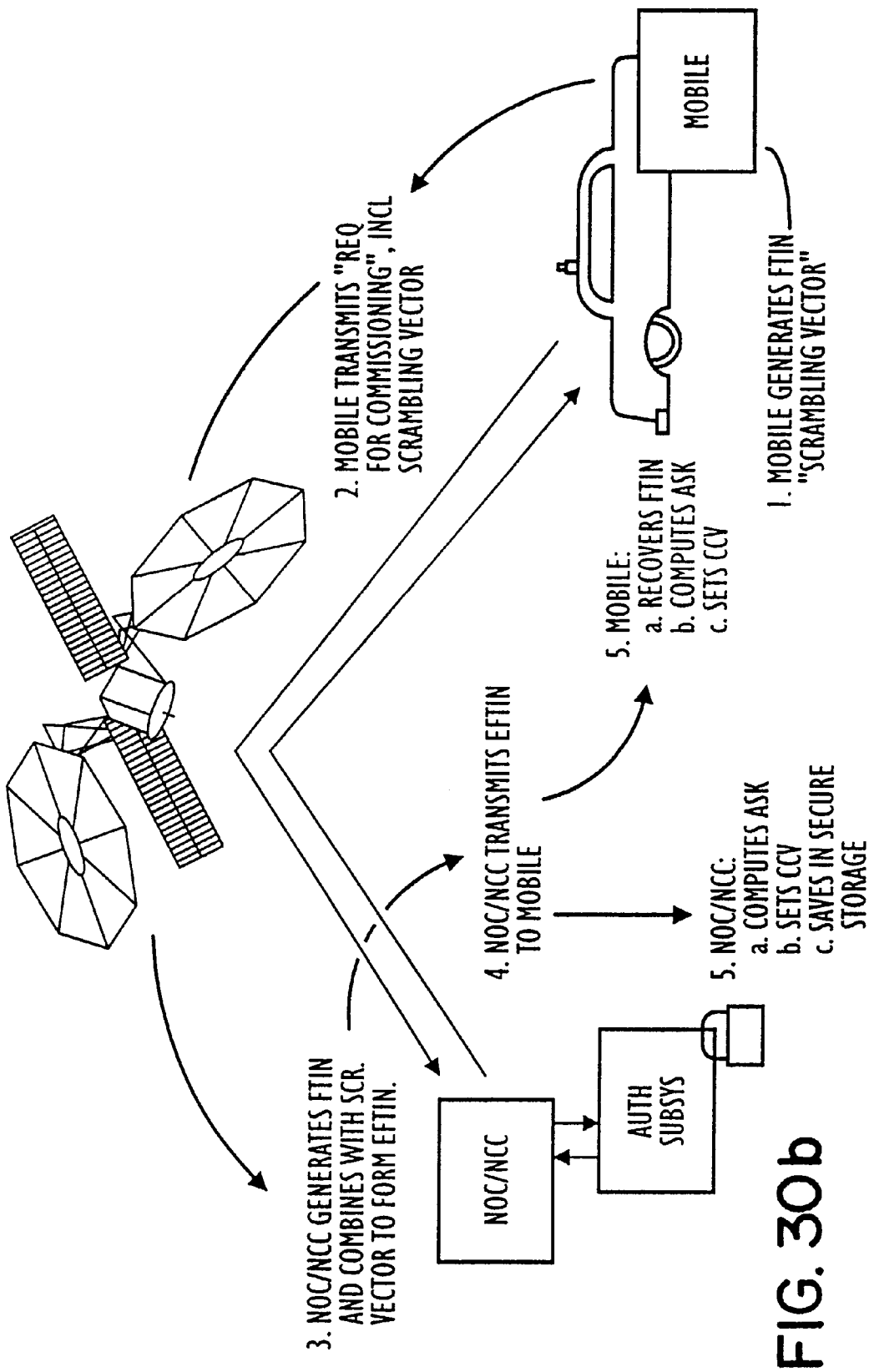
FIG. 30b is an illustration of the keying process in the satellite communication system.
Figure 30C:
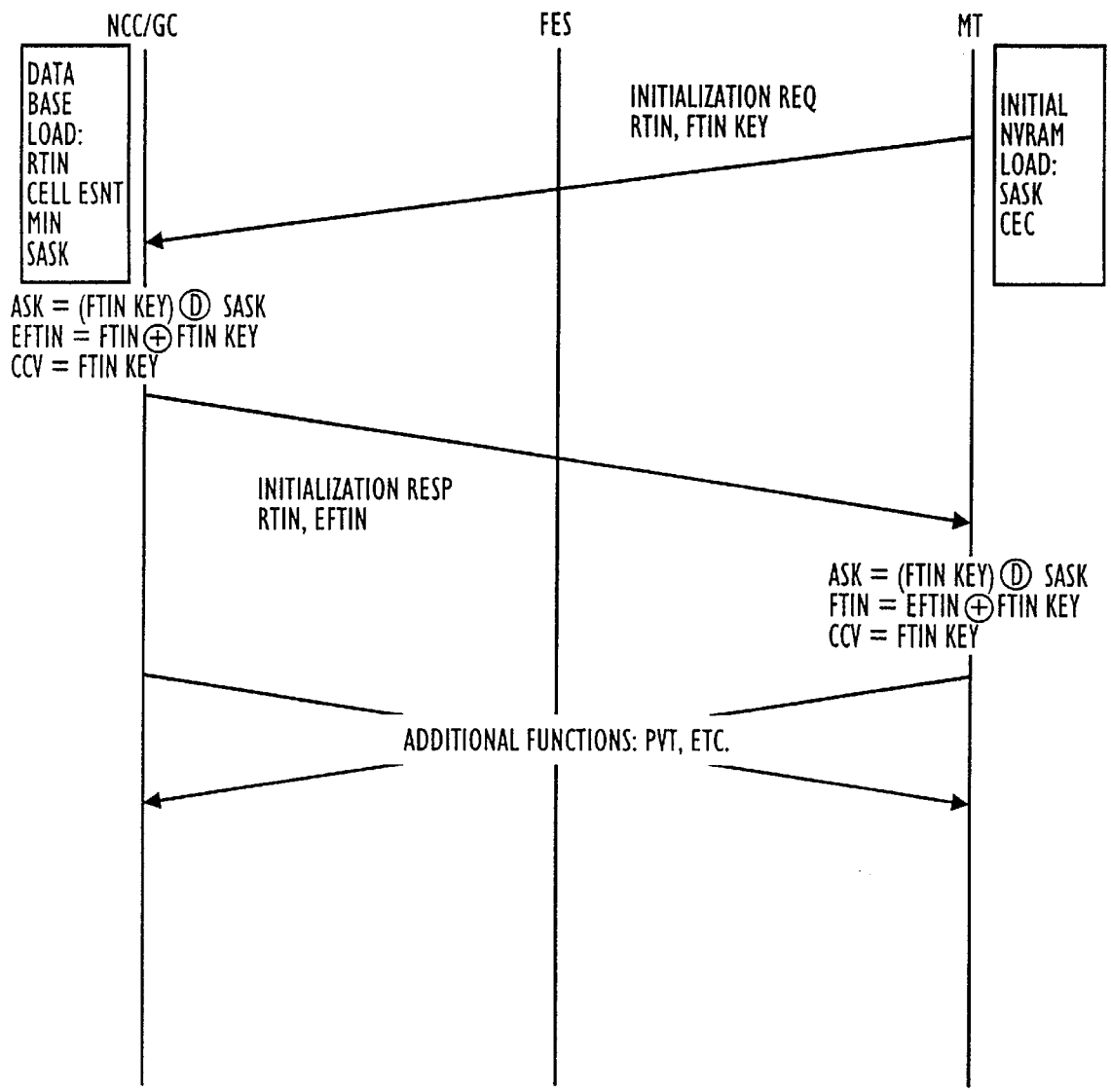
FIG. 30c is a signal/data diagram of the keying process.

The keying process is illustrated in FIGS. 30a–30c. FIG. 30a is a flow chart of the keying process, FIG. 30b is an illustration of the keying process in the satellite communication system, and FIG. 30c is a signal/data diagram of the keying process. In FIG. 30a, the MET subscriber registers or requests to become a subscriber of the satellite communication system in step S2. Registration information is sent to CMIS and a customer service representative enters the registration information in the CMIS system that handles subscriber billing, contact and the like, in step S4. CMIS then generates the Seed ASK which is supplied to the NOC/NCC and the subscriber/distributor of the MET prior to commissioning in step S6. The subscriber/distributor enters the SASK into the MET in step S8, and the MET stores the SASK for commissioning in step S10.

The NOC/NCC stores the ESN and SASK and assigns a Forward Terminal ID (FTIN) for each MET in step S12. The NOC/NCC also receives an FTIN Key from the MET which is a random number generated by the MET when the MET requests to be commissioned, and uses the FTIN key and the SASK to generate the ASK in step S14. The NCC stores the ASK in step S16. The NCC uses the FTIN Key and the FTIN to generate the EFTIN in step S18 and transmits the EFTIN to the MET. The MET uses the EFTIN and the FTIN key to recover the FTIN in step S20. The MET also uses the SASK and the FTIN Key to generate the ASK in step S20. The MET then stores the ASK and FTIN in step S24 to be used later during the registration or call connect process. The commissioning process is then completed in step S26, providing the necessary security codes in the MET associated with a specific ESN and in the NCC/NOC. Also, at the time of MET commissioning, the NCC duplicates the process of MET ASK generation. The NCC process is entirely automatic, and is protected from access by, the MSS system operators.

The NCC computes a cipher text block (see FIG. 29) by using the ASK stored in its secure database and the DES algorithm to encode an input variable comprised of the receive frequency assignment in the least significant positions, the transmit frequency assignment in the next least significant positions, the Access Security Fill Bits (transmitted in the Bulletin Board, see, for example, FIG. 31), and the most significant positions filled with predesignated characters. The 32 most significant bits of the resulting cipher text block are designated the Access Security Check Field, and the least significant is designated the Secondary Security Check Field. The MET also generates the Access Security Check Field from the transmit and receive frequency assignments included in the Set Loopback Request SU received from the NCC, and returns it to the NCC in the scrambling vector SU. The NCC compares the locally generated value of the Access Security Check Field with the value returned by the MET on a bit-by-bit basis. If the values are identical, the MET identity is declared authenticated, and commissioning or PVT continues. If the values do not coincide, the MET identity is declared non-authenticated, and the NCC terminates the process, declares PVT failure, and sends an authentication failure alert message to the NOC.

Following the commissioning process, the MET is ready to gain access to CGS for voice/data communication using the real-time authentication process described hereinafter. In accordance with the fraud detection and user validation system, the Access Security Fill Bits are transmitted in the MET bulletin board. The NOC operator can manually change this field to any desired pattern. It is recognized that when the Access Security Fill Bits are changed there will be a short period during which METs will attempt to access the system with Authentication Codes generated using the "old" fill bits, which may result in those METs being denied service. As one option to prevent this problem, the NOC operator will have the option to disable the access security check for a short time when the fill bits are changed. The NCC computes a cipher text block (see FIG. 29) by using the ASK stored in its secure database and the DES algorithm to encode an input variable comprised of the receive frequency assignment in the least significant positions, the transmit frequency assignment in the next least significant positions, the Access Security Fill Bits (transmitted in the Bulletin Board, see, for example, FIG. 31), and the most significant positions filled with predesignated characters. The 32 most significant bits of the resulting cipher text block are designated the Access Security Check Field, and the least significant is designated the Secondary Security Check Field. The Access Security Check Field and the Secondary Security Check Field are transmitted to the terminating FES in the Channel Assignment SU.

The MET independently generates the Access Security Check Field and the Secondary Security Check Field using an identical process to encode the transmit and receive frequency assignments received in the MET Channel Assignment SU received from the NCC. Following the establishment of the MET-FES communication link, the MET transmits the Access Security Check Field in the Scrambling Vector SU.

The FES compares the MET and NCC generated Access Security Check Fields on a bit-by-bit basis. If the values are identical, the MET identity is declared authenticated, and the call setup shall be completed normally. If the values are not identical, the MET identity is declared non-authenticated. If nonauthenticated, the FES terminates the call process, and sends a channel release message to the NCC with authentication failure indicated as the call clearing reason. Upon receiving the channel release message with authentication failure as the call clearing reason, the GC generate an authentication failure event. The NCC treats this as an alarm condition. The NCC provides a real time display to the MSS operator console indicating that the call was failed due to authentication failure.

A "clear mode" is provided to facilitate system troubleshooting on an individual basis. This mode is invoked at the NCC (with suitable password control), and causes the authentication system to accept and complete all calls for the specific MET with or without a valid Secondary Security Check Field.

An "override mode" is also provided which permits system operation without authentication, in case of failure or other problems. This mode is invoked at the NCC through operation of a hardware or software, with suitable protection (i.e., physical key, password).

An option is provided in which the "Authentication Subsystem" at the NOC/NCC (which maintains the MET ASK database) is both logically and physically separated from mother NOC and NCC processors, and which provides both physical and password security to prevent unauthorized access to the MET ASK databases. The NCC processors access the NCC Authentication Subsystem with the MET ESN (RTIN) and the transmit and receive frequency assignments and fill bits. The NCC Authorization Subsystem returns only the MET ESN, the Access Security Check Field and the Secondary Security Check Field.

A MET is required to authenticate its identity upon each request to invoke an advanced calling feature which redirects the source or destination of a call or adds participants. To effectuate authentication, the MET includes the least significant ("right most") bits of the Secondary Security Check Field in the AFR SU ("Hook Flash") transmitted in an Advanced Features Request Sequence. The serving FES compares the these least significant bits of the Secondary Security Check Field received from the NCC in the Channel Assignment SU. If the values are identical, the MET identity is declared reauthenticated, and the advanced features request is processed normally. If the values are not identical, the MET identity is declared non-reauthenticated, and the FES denies the advanced features request, and provides a suitable indication, such as a tone or recorded voice announcement, to the MET subscriber. The FES sends a reauthentication failure alert message to the NCC.

The MSS system provides for a Call Count Variable (CCV) in the authentication process. The CCV is a count of calls made by each MET, and is separately and independently maintained by the individual METs and the NCC. The CCV is a 16 bit binary number, and is set equal to the value of the least significant 16 bits of random EFTIN KEY when the MET is commissioned or recommissioned. The CCV is incremented at the completion of each call setup. The CCV is also incremented at the MET when the change from transmission of the Scrambling Vector SU to voice/data frames is made. The CCV is also incremented at the NCC when the call Setup Complete SU is received from the serving FES.

At the time of call initiation, the NCC adds (i.e., the logical XOR operation) the CCV to the least significant bits of the Secondary Security Check Field. The resulting CCV Check Field is included in the Channel Assignment SU sent to the serving FES. The MET independently generates a CCV Check Field using an identical process, and includes the result in the Scrambling Vector SU sent to the serving FES during call setup.

Figure 32A:
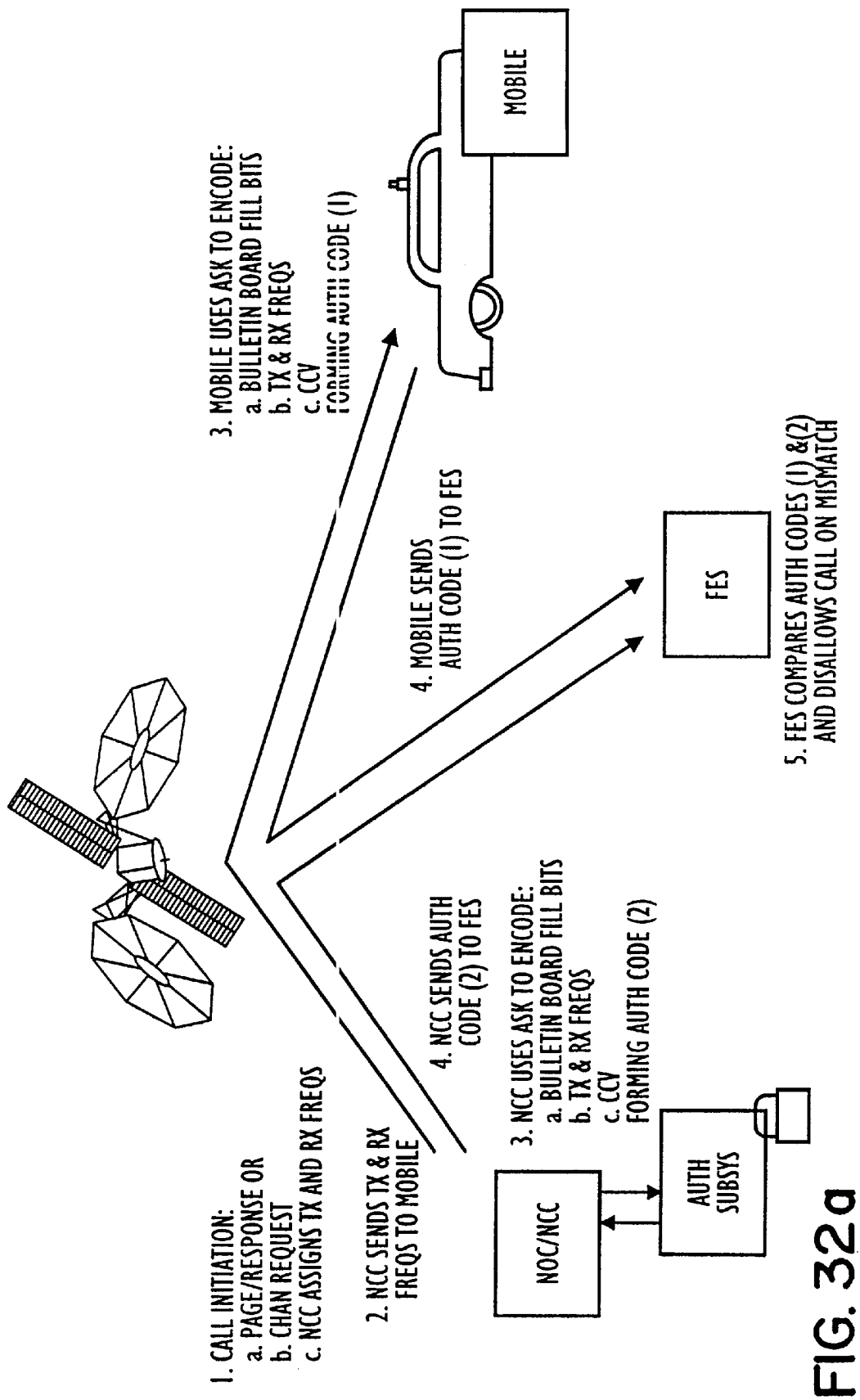
FIGS. 32a and 32b are diagrams of the authentication process using the authentication security key generated by the process described in FIGS. 30a–30c.
Figure 32B:
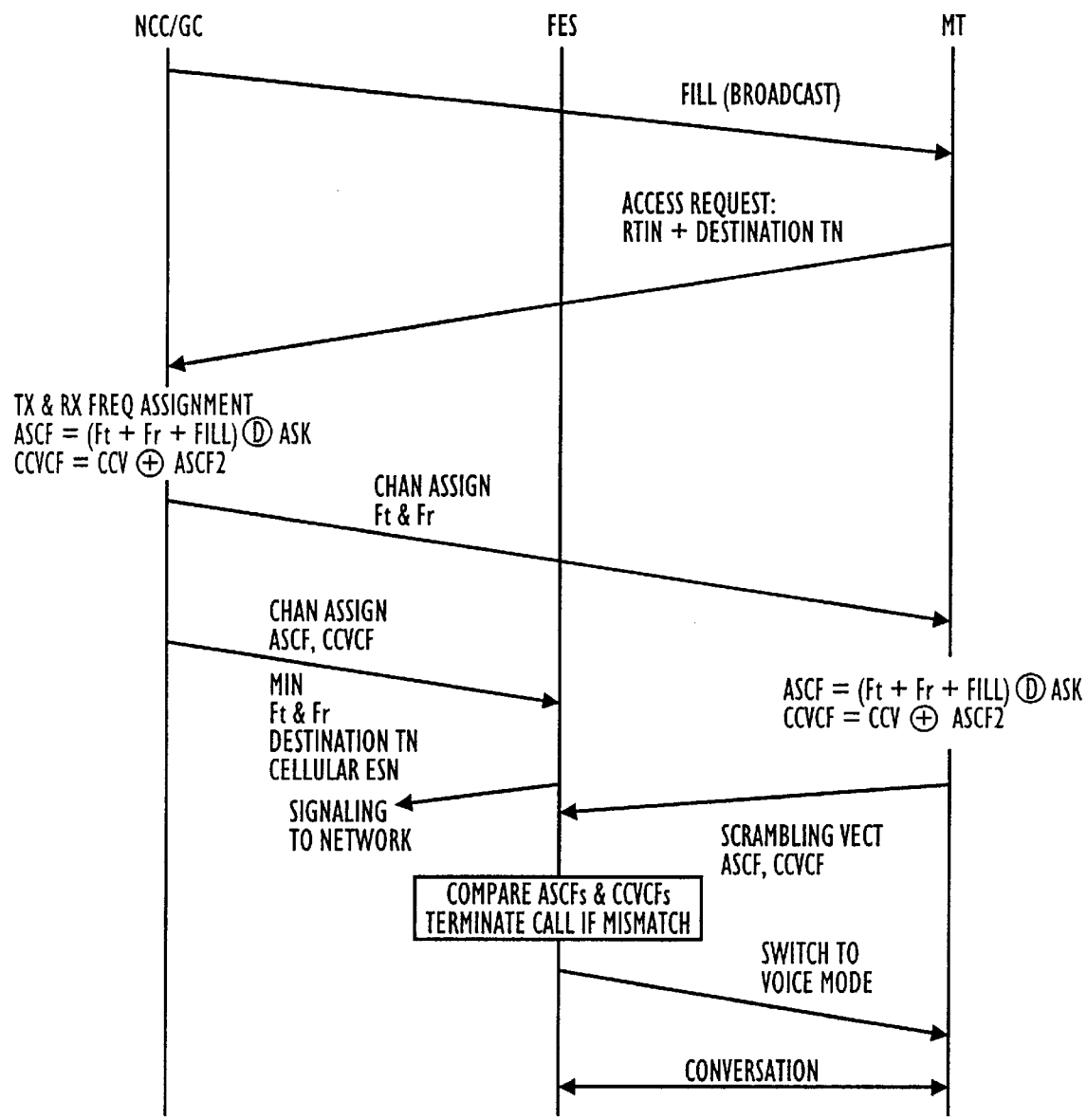

The FES verifies the MET CCV. The FES declares the CCV to be authenticated if the absolute value of the error is equal to or less than a configurable threshold. Provision is made for selection of the error threshold by the NOC/NCC operators. The nominal value of the threshold is zero, and the range is at least zero to 15 (decimal). If the absolute value of the error is greater than the threshold, the FES declares the CCV non-authenticated. The FES terminates the call process, and sends a channel release message to the NCC, with CCV authentication failure indicated as the call clearing reason. Upon receiving the channel release message with authentication failure as the call clearing reason, the GC generates an authentication failure event. The NCC treats this as an alarm condition. The NCC provides a real time display on the MSS operator console indicating that the call was failed due to authentication failure. FIGS. 32a and 32b are diagrams of this described authentication process using the authentication security key generated by the process described in FIGS. 30a –30c.

Advantageously, the fraud detection and user validation system optionally includes an enhanced MET authentication process through the use of a Personal Identification Number (PIN) entered by the MET subscriber at the initiation of each call. The PIN is not to be used for MET terminated calls. The PIN is provided to the MET subscriber by the MSS operator and must be entered whenever the MET initiates a call. The NOC/NCC makes provision to enter and store the PIN in the MET ASK secure database.

The NOC/NCC software architecture makes provision for a "PIN REQUIRED" Flag to be included in the data base for each MET, and in the calling sequence and software used to invoke generation of the Access Security Check Field by the Authentication Subsystem. The PIN Required flag can be set by CMIS or the NOC operator. If the use of the PIN is required, the NCC authentication subsystem replaces the most significant Access Security Fill Bits with the PIN characters. Generation of the cipher text block comprising the Access Security Check Field and the Secondary Security Check Field and subsequent actions is then proceeded as described above.

Figure 33:
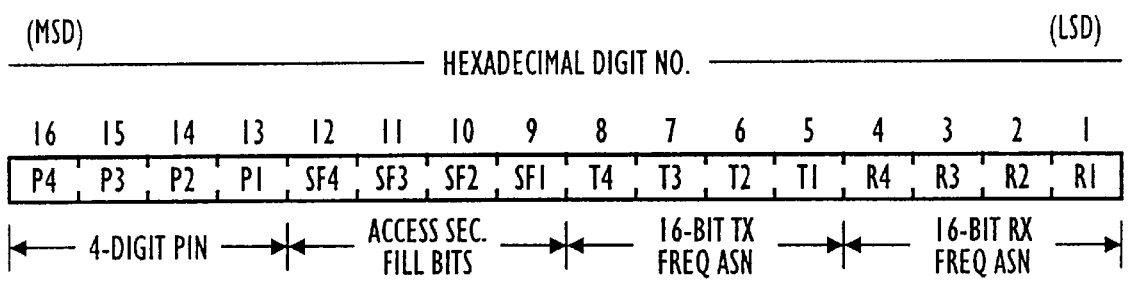
FIG. 33 is a diagram of the form of the "plain text input" used in the PIN-inclusive ASCF generation process.

Generation of the cipher text block comprising the Access Security Check Field and the Secondary Security Check Field and subsequent actions is then performed as described above. The form of the "plain text input" used in the PIN-inclusive ASCF generation process is shown in FIG. 33. Transmission and verification of the various Security Check Fields, and subsequent actions, is implemented as described above.

A channel assignment message (CHA) is also used by the NCC to inform FESs of frequency assignments for both MET and fixed originated calls. The CHA message conveys information relating to the transmit power, transmission equipment, and interface equipment required to support the call. For MET originated calls the CHA message also conveys the dialed digits. The CHA message generally comprises the data illustrated in FIG. 34. A scrambling vector SU is also provided that is sent by the MET to initialize the descrambler at the FES and for call security. The Scrambling Vector SU generally comprises the data illustrated in FIG. 35.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

GLOSSARY

| | |
|---|---|
| A | Availability |
| AC | Alternating Current |
| AFC | Automatic Frequency Control |
| AGC | Automatic Gain Control |
| AWGN | Additive White Gaussian Noise |
| BER | Bit Error Rate |
| BITE | Built-In Test Equipment |
| bps | bits per second |
| CCIR | International Radio Consultative Committee |
| CCITT | International Telegraph and Telephone Consultative Committee |
| CM | Configuration Management |

-continued

GLOSSARY

| | |
|---|---|
| CRC | Cyclic Redundancy Check |
| DAMA | Demand Assignment Multiple Access |
| dB | decibels |
| dBm | decibels relative to 1 milliwatt |
| dBW | decibels relative to 1 watt |
| DC | Direct Current |
| DOC | Department of Communications |
| DSP | Digital Signal Processing |
| EMC | Electromagnetic Compatibility |
| FCC | Federal Communications Commission |
| FEC | Forward Error Correction |
| FES | Feederlink Earth Station |
| FES-C | Communications and In-band signaling channel from FES to MET |
| FIU | Fax Interface Unit |
| GC | Group Controller |
| GC-S | Outband TDM signaling channel from GC to MET |
| HDP | Hardware Development Plan |
| Hz | Hertz |
| IEEE | Institute of Electrical and Electronics Engineers |
| kHz | Kilohertz |
| MDS | Mobile Data Service |
| MET | Mobile Earth Terminal |
| MET-C | Communications and in-band signaling channel from MET to FES |
| MET-SR | Random access signaling channel from MET to GC |
| MET-ST | TDMA signaling channel from MET to GC |
| MGSP | MET-GC Signaling Protocol |
| MHz | Megahertz |
| MIS | MET Interface Simulator |
| MRI | Minimum Request Interval |
| ms | millisecond |
| MSS | Mobile Satellite Services |
| MTBF | Mean Time Between Failures |
| MTTR | Mean Time to Repair |
| NCS | Network Control System |
| NCC | Network Control Centre |
| ppm | Parts per million |
| PSDN | Packet Switched Data Network |
| PSTN | Public Switched Telecommunications Network |
| PVT | Performance Verification Test |
| QA | Quality Assurance |
| RAM | Random Access Memory |
| RF | Radio Frequency |
| ROM | Read-Only Memory |
| Rx | Receive |
| SDP | Software Development Plan |
| SU | Signaling Unit |
| TDM | Time Division Multiplex |
| TDMA | Time Division Multiple Access |
| TLS | Top Level Specification |
| TPP | Test Plan and Procedure |
| Tx | Transit |
| UW | Unique Word |

What is claimed is:

1. In a mobile satellite system including a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system, a method of preventing a mobile communication system from fraudulently commissioning in the satellite communication system, said method comprising the steps of:

(a) requesting, by a user, to become a subscriber in a communication system;

(b) generating a first security key using a first data encryption algorithm having first and second input signals generated by respective first and second random number generating methods;

(c) generating a second security key using a second data encryption algorithm having third and fourth input signals, the third input signal comprising the first security key and the fourth input signal comprising data from at least one of the transmit and receive frequencies utilized by the mobile communication system; and (d) verifying that the mobile communication system is authorized to utilize the communication system using the second security key.

2. A method according to claim 1, wherein said first data encryption algorithm comprises the DES algorithm.

3. A method according to claim 1, wherein said second data encryption algorithm comprises the DES algorithm.

4. A method according to claim 1, wherein the fourth input signal further comprises data from the transmit and receive frequencies utilized by the mobile communication system.

5. A method according to claim 1, wherein the fourth input signal further comprises data from the transmit and receive frequencies utilized by the mobile communication system and fill bits from a satellite communication bulletin board.

6. A method according to claim 1, wherein the fourth input signal further comprises data from the transmit and receive frequencies utilized by the mobile communication system, fill bits from a satellite communication bulletin board, and a personal identification number entered by the user each time the mobile communication system initiates a call.

7. A method according to claim 1, wherein the second security key comprises primary and secondary check fields for verification of the mobile communication system.

8. The method according to claim 7, wherein at least part of one of the primary and secondary check is combined with a call count variable to generate another check field for authentication.

9. In a mobile satellite system including a satellite communication switching office having a satellite antenna for receiving/transmitting a satellite message via a satellite from/to a vehicle using a mobile communication system, a satellite interface system, a central controller receiving/transmitting the satellite message from/to the satellite communication switching office issued from the vehicle via the satellite and the satellite interface system, a fraud prevention system for preventing a mobile communication system from fraudulently commissioning in a communication system, comprising:

means for requesting to become a subscriber in a communication system;

means for generating a first security key using a first data encryption algorithm having first and second input signals generated by respective first and second random number generating methods;

means for generating a second security key using a second data encryption algorithm having third and fourth input signals, the third input signal comprising the first security key and the fourth input signal comprising data from at least one of the transmit and receive frequencies utilized by the mobile communication system; and means for verifying that the mobile communication system is authorized to utilize the communication system using the second security key.

10. A fraud prevention system according to claim 9, wherein said first data encryption algorithm comprises the DES algorithm.

11. A fraud prevention system according to claim 9, wherein said second data encryption algorithm comprises the DES algorithm.

12. A fraud prevention system according to claim 9, wherein the fourth input signal further comprises data from the transmit and receive frequencies utilized by the mobile communication system.

13. A fraud prevention system according to claim 9, wherein the fourth input signal further comprises data from the transmit and receive frequencies utilized by the mobile communication system and fill bits from a satellite communication bulletin board.

14. A fraud prevention system according to claim 9, wherein the fourth input signal further comprises data from the transmit and receive frequencies utilized by the mobile communication system, fill bits from a satellite communication bulletin board, and a personal identification number entered by the user each time the mobile communication system initiates a call.

15. A fraud prevention system according to claim 9, wherein the second security key comprises primary and secondary check fields for verification of the mobile communication system.

16. The system according to claim 15, wherein at least part of one of the primary and secondary check fields is combined with a call count variable to generate another check field for authentication.

* * * * *